United States Patent [19]

Matsukawa et al.

[11] Patent Number: 5,707,718
[45] Date of Patent: Jan. 13, 1998

[54] POROUS-PLASTIC BEARING AND METHOD OF MANUFACTURING POROUS-PLASTIC BEARING

[75] Inventors: Koei Matsukawa; Katsunori Sato, both of Tokyo; Toshihisa Imai, Saitama, all of Japan

[73] Assignees: Mitsubishi Electric Home Appliance Co., Ltd., Saitama; Mitsubishi Denki Kabushiki Kaisha, Tokyo, both of Japan

[21] Appl. No.: 598,546

[22] Filed: Feb. 8, 1996

[30] Foreign Application Priority Data

Sep. 12, 1995 [JP] Japan ................... 7-234252

[51] Int. Cl.[6] ............... B32B 5/14; B32B 7/02; F16C 33/02; F16C 33/10
[52] U.S. Cl. ............... 428/218; 384/108; 384/291; 384/316; 384/385; 384/902; 384/903; 384/909; 428/306.6; 428/310.5; 428/313.5; 428/320.2; 428/321.1
[58] Field of Search ............... 428/310.5, 313.5, 428/321.1, 306.6, 308.4, 218, 320.2; 384/100, 108, 291, 316, 385, 902, 903, 909

[56] References Cited

U.S. PATENT DOCUMENTS

| | | | |
|---|---|---|---|
| 4,923,761 | 5/1990 | Shindo | 428/550 |
| 5,108,833 | 4/1992 | Noguchi et al. | 428/310.5 |
| 5,282,688 | 2/1994 | Kanezaki et al. | 384/279 |

FOREIGN PATENT DOCUMENTS

| | | |
|---|---|---|
| 368 098 | 5/1990 | European Pat. Off. . |
| 55-137718 | 2/1979 | Japan . |
| 61-153059 | 7/1986 | Japan . |
| 64-43223 | 3/1989 | Japan . |
| 64-55422 | 3/1989 | Japan . |
| 2289333 | 11/1990 | Japan . |
| 1 321 983 | 7/1973 | United Kingdom . |
| 1 557 327 | 12/1979 | United Kingdom . |

OTHER PUBLICATIONS

High Polymer Tribo–Material, by High Polymer Congress, Kyoritsu Printing Co. Ltd. (1990).

*Primary Examiner*—Marion E. McCamish
*Assistant Examiner*—Blaine R. Copenheaver
*Attorney, Agent, or Firm*—Sughrue, Mion, Zinn, Macpeak & Seas, PLLC

[57] ABSTRACT

A porous-plastic bearing comprises a porous-plastic sliding bearing member which is formed by gathering a cluster of plastic particles each having a volume in the range of from about 0.004 mm$^3$ to about 4 mm$^3$ and sintering the cluster of plastic particles while setting its porosity at a selected value in the range of from about 10% to about 30%. Furthermore, the sliding bearing member comprises a plurality of plastic particles in any longitudinal or cross section. Pores formed within the sliding bearing member are impregnated with or filled with a lubricating agent.

16 Claims, 39 Drawing Sheets

POROUS-PLASTIC BEARING AND METHOD OF MANUFACTURING POROUS-PLASTIC BEARING

BACKGROUND OF THE INVENTION

1. Field of the Invention

The present invention relates to a bearing made of plastic and a method of manufacturing a plastic bearing and more particularly to a porous-plastic bearing formed by sintering and a method of manufacturing a porous-plastic bearing.

2. Description of the Prior Art

Referring now to FIG. 77, it illustrates a cross-sectional view of a prior art plastic bearing used widely. In the figure, reference numeral 1 denotes a shaft (an axis of rotation), and 44 denotes a sliding bearing made of plastic for rotatably supporting the shaft 1. Such a plastic sliding bearing indicated by reference numeral 44 has been widely used because it needs no oil supply and it is excellent in resistance to corrosion and chemicals. As an example of such a bearing, there has been provided a plastic sliding bearing which is formed by heating a plastic material such as polyamide or polyacetal at a temperature higher than the melting point of the plastic material and impregnating it with lubricating oil by utilizing the compatibility of the plastic material.

Examples of a prior art porous sliding bearing are porous sliding bearings made of metal as disclosed in for example Japanese Patent Application Laid Open (KOKAI) No. 61-153059 entitled "Belt Pulley Apparatus" and Japanese Utility Model Application Laid Open (KOKAI) No. 55-137718 entitled "Bearing Apparatus".

FIG. 78 shows a cross-sectional view of a prior art porous sliding bearing made of metal as disclosed in Japanese Patent Application Laid Open (KOKAI) No. 61-153059 and FIG. 79 shows a cross-sectional view of a prior art porous sliding bearing made of metal as disclosed in Japanese Utility Model Application Laid Open (KOKAI) No. 55-137718. In these figures, reference numeral 1 denotes a shaft, and 45 denotes a porous sliding bearing made of metal. In such porous sliding bearings made of metal, a pumping action is generated as the shaft 1 is rotated and hence the oil which has impregnated into the bearing is drawn to a gap between the metallic porous sliding bearing 45 and the shaft 1. As a result, an oil film is formed between the sliding bearing 45 and the shaft 1. Therefore, the metallic porous sliding bearing 45 can offer a small frictional resistance since it cannot come into contact with the shaft 1.

Referring now to FIG. 80, it illustrates a cross-sectional view of a prior art porous-plastic sliding bearing as disclosed in Japanese Patent Application Laid Open (KOKAI) No. 64-55422. In the figure, reference numeral 46 denotes a hole of the bearing made of resin in which oil is impregnated, and 47 denotes a hole in which oil is not impregnated. In the porous-plastic sliding bearing having these holes 46 and 47, the lubricating oil flows from the holes 46, in which oil has been impregnated, to a gap between the shaft and the bearing in accordance with the mechanism similar to that of the metallic porous sliding bearing mentioned above. Therefore, the porous-plastic sliding bearing can offer a small frictional resistance.

Furthermore, as another prior art porous-plastic sliding bearing, there has been provided a porous structural unit as disclosed in for example Japanese Patent Application Laid Open (KOKAI) No. 2-289333. In accordance with the porous structural unit, the diameter of pores in the porous layer of the bearing is made minimum at the surface portion of the bearing and the diameter of pores is made continuously and gradually increased toward the bottom portion of the bearing. Accordingly, the pressure of the oil film can be increased and the longevity of the bearing is increased.

Referring now to FIG. 81, it illustrates a cross-sectional view of a prior art oilless rolling bearing as disclosed in Japanese Utility Model Application Laid Open (KOKAI) No. 1-43223. FIG. 82 shows a cross-sectional view taken along the line 82—82 of FIG. 81. In the figures, reference numeral 33 denotes an outer ring member, 34 denotes an inner ring member, 48 denotes a ball made of zirconium boride ceramic, 49 denotes a recess, and 50 denotes a groove formed on the outer surface of the outer ring 33. The grooves 50 formed on the outer ring cause a coat in glass form to be produced without the supply of lubricating oil. Accordingly, the frictional resistance and electrical resistance of the bearing can be reduced.

However, the aforementioned plastic sliding bearing shown in FIG. 77 suffers from a disadvantage that it cannot be used when loaded heavily and it wears out with time and seizes up because the shaft 1 is constantly in contact with the inner surface of the sliding bearing 44.

The prior art plastic oil impregnated sliding bearing suffers from a disadvantage that the oil content is only in the range of from 3% to 5% as disclosed in "High Polymer Tribo-Material" (edited by Japan High polymer Society, 1990, Kyoritsu Syuppan), and hence the lubricating effect of the oil infiltrated into the bearing is not achieved to a sufficient degree.

While the conventional metallic porous sliding bearings shown in FIGS. 78 and 79 rarely wear out with time and seize up, they suffer from a disadvantage that they are heavy because they are made of metal and hence its specific gravity is big.

The prior art porous-plastic sliding bearing shown in FIG. 80 suffers from a disadvantage that the oil content is small because there exist some holes 47 having no oil and therefore the longevity of the bearing is decreased, and the shapes of holes are nonuniform and therefore a difference in the quality of bearings is increased.

In the conventional porous-plastic sliding bearing wherein the diameter of pores is made continuously and gradually increased from the surface portion of the bearing to the bottom portion of the bearing (i.e. the porous structural unit disclosed in Japanese Patent Application Laid Open (KOKAI) No. 2-289333), since the porosity in all the inner peripheral portion of the bearing is small, the oil which has impregnated into the bearing can be easily held and hence the pressure of the oil film is increased. However, it suffers from a disadvantage that the oil which has impregnated into the bearing cannot be easily drawn into the inner surface of the bearing and hence the frictional resistance is increased.

Furthermore, the above-mentioned prior art plastic sliding bearing and metallic porous sliding bearing suffer from a disadvantage that since the material of the bearing is different from that of a supporting member for supporting the bearing such as a bearing housing, casing, or cabinet or box, the supporting member and bearing cannot be made in one piece and hence the number of components which construct equipment including such a bearing is increased, with the result that the assembling cost of equipment is increased.

The prior art oilless rolling bearing shown in FIGS. 81 and 82 suffers from a disadvantage that the frictional resistance of the bearing is greater than that of a typical rolling bearing device, as shown in FIG. 83, using lubricating oil.

SUMMARY OF THE INVENTION

The purpose of the present invention is to overcome these disadvantages. More precisely, an object of the present invention is to provide a lightweight and maintenance-free porous-plastic bearing wherein wear and seizure rarely occur, a low-cost porous-plastic bearing integrally molded together with a box or the like, and a method of manufacturing such a bearing.

In accordance with one aspect of the present invention, there is provided a porous-plastic bearing comprising a sliding bearing member which is constructed of porous plastic and which is formed by gathering a cluster of plastic particles each having a volume in the range of from about 0.004 $mm^3$ to about 4 $mm^3$ and sintering the cluster of plastic particles while setting its porosity at a selected value in the range of from about 10% to about 30%, wherein the sliding bearing member comprises a plurality of plastic particles in any longitudinal and cross sections, and wherein pores formed within the sliding bearing member are impregnated with or filled with a lubricating agent. The lubricating agent can be a liquid lubricating oil. Alternatively, the lubricating agent can be a solid lubricating agent.

In accordance with one aspect of the present invention, the sliding bearing member comprises a first low-porosity plastic particle layer formed in at least one region within an inner peripheral portion of the bearing member and a second high-porosity plastic particle layer, and the summation of the area of a projection of low-porosity particles in the first layer, which are located just under the surface of the inner peripheral portion, i.e., the inner surface of the sliding bearing, on the inner surface of the sliding bearing member is less than the total area of the inner surface of the sliding bearing member.

In accordance with one aspect of the present invention, the porosity of an outer peripheral portion of the sliding bearing member is lower than the porosity of other plastic layers of the sliding bearing member.

In accordance with one aspect of the present invention, the sliding bearing member comprises a first plastic particle layer formed in at least one region within an inner peripheral portion of the bearing member and a second plastic particle layer formed in an outer peripheral portion of the bearing member, the porosities of the first and second plastic particle layers being lower than that of the other portion of the sliding bearing member, and the summation of the area of a projection of low-porosity particles in the first layer, which are located just under the surface of the inner peripheral portion, i.e., the inner surface of the sliding bearing, on the inner surface of the sliding bearing member is less than the total area of the inner surface of the sliding bearing member.

In accordance with another aspect of the present invention, there is provided a mark disposed on the outer surface of the bearing member for marking the position of the first plastic particle layer.

In accordance with another aspect of the present invention, there is provided at least a cavity formed within the sliding bearing member for circulating the lubricating oil.

In accordance with another aspect of the present invention, an oil holding member such as a felt is inserted into the cavity.

In accordance with another aspect of the present invention, the bearing further comprises a dynamic pressure groove bearing member disposed on an end surface thereof.

In accordance with another aspect of the present invention, the bearing member further comprises at least a groove formed on an outer surface thereof for holding the liquid lubricating oil.

In accordance with another aspect of the present invention, the bearing member further comprises at least a radiating fin formed on an outer surface thereof.

In accordance with another aspect of the present invention, the bearing includes a bearing housing, a casing and a cabinet which are integrally molded and made of porous plastic.

In accordance with another aspect of the present invention, there is provided a porous-plastic bearing including a bearing ring, a rolling element and a ball holder which is constructed of porous plastic and which is formed by gathering a cluster of plastic particles each having a volume in the range of from about 0.004 $mm^3$ to about 4 $mm^3$, the total volume of the cluster being in the range of from about 70% to about 90% of the total volume of the ball holder, and then sintering the cluster of plastic particles. Furthermore, pores formed within the ball holder are impregnated with or filled with a lubricating agent. The lubricating agent can be a liquid lubricating oil. Alternatively, the lubricating agent can be a solid lubricating agent.

In accordance with another aspect of the present invention, there is provided a method of manufacturing a porous-plastic bearing, comprising the steps of: introducing at least a first group of plastic particles and a second group of plastic particles into a mold, either the per-particle volume or the softening temperature of the plastic particles in the first group being different from that of the plastic particles in the second group; arranging the first group of plastic particles in the mold during the introduction of the plastic particles so that they are located in at least a region in an inner peripheral portion of a bearing to be molded; and pressurizing, heating, sintering and then cooling the mold containing at least the first and second groups of plastic particles.

In accordance with another aspect of the present invention, there is provided a method of manufacturing a porous-plastic bearing, comprising the steps of: introducing at least a first group of plastic particles and a second group of plastic particles into a mold, either the per-particle volume or the softening temperature of the plastic particles in the first group being different from that of the plastic particles in the second group; arranging the first group of plastic particles in the mold during the introduction of the plastic particles so that they are located in at least a region in an outer peripheral portion of a bearing to be molded; and pressurizing, heating, sintering and then cooling the mold containing at least the first and second groups of plastic particles.

In accordance with another aspect of the present invention, the per-particle volume of one plastic particle in the first group is smaller than that of one plastic particle in the second group.

In accordance with another aspect of the present invention, the softening temperature of the plastic particles in the first group is lower than that of the plastic particles in the second group. Furthermore, another group of plastic particles, the softening temperature of which is lower than that of the plastic particles in the second group, is arranged within the mold so that it is located in an outer peripheral portion of the bearing to be molded.

Further objects and advantages of the present invention will be apparent from the following description of the preferred embodiments of the invention as illustrated in the accompanying drawings.

DETAILED DESCRIPTION OF THE PREFERRED EMBODIMENTS

Figure 1:
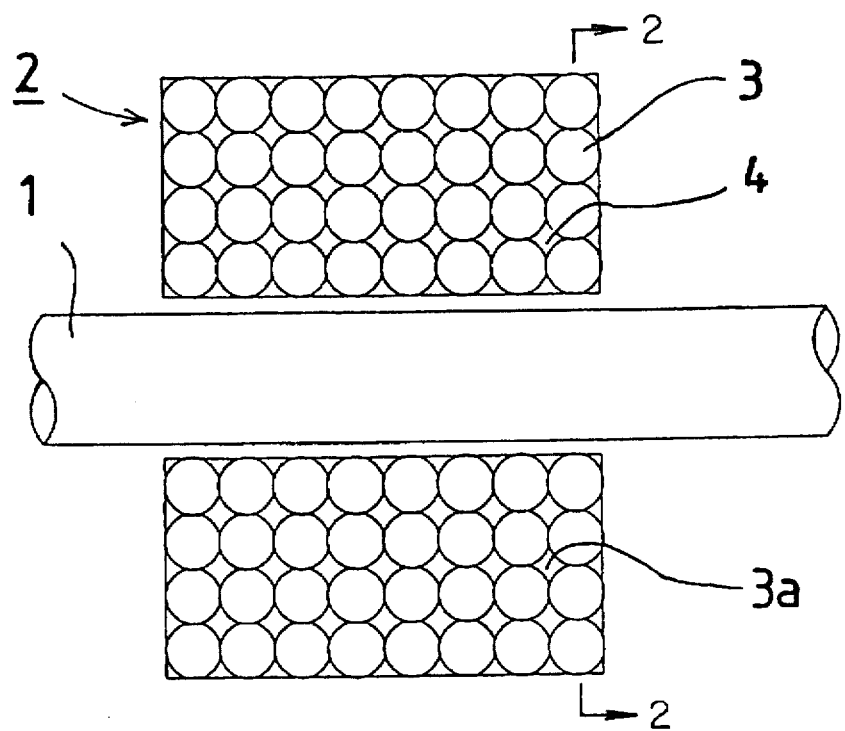
FIG. 1 is a cross-sectional view of a porous plastic bearing according to an embodiment of the present invention.
Figure 2:
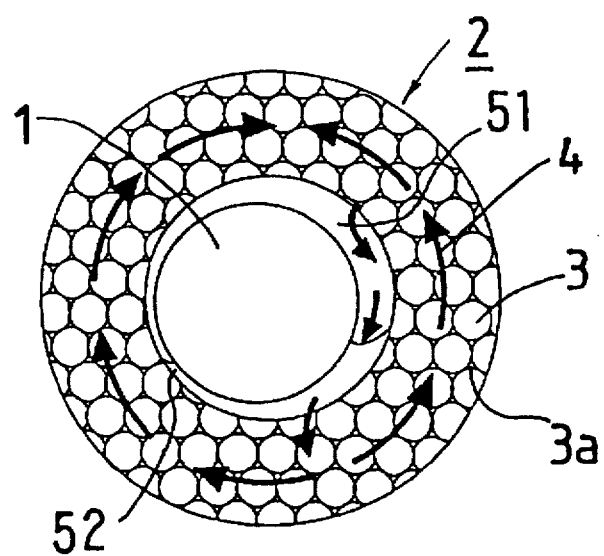
FIG. 2 is a cross-sectional view taken along the line 2—2 of FIG. 1.

Referring now to FIG. 1, it illustrates a cross-sectional view showing a porous plastic bearing according to an embodiment of the present invention. Furthermore, FIG. 2 is a cross-sectional view taken along the line 2—2 of FIG. 1. In the figures, reference numeral 1 denotes a shaft (an axis of rotation), and 2 denotes a sliding bearing made of porous plastic for rotatably supporting the shaft 1. The sliding bearing 2 is constructed from a sintered body including a cluster of plastic particles 3 made of ABS (acrylonitrile-butadiene-styrene) resin and liquid lubricating oil 4 with which the cluster sintered body has been impregnated. Furthermore, reference numeral 3a denotes a pore formed between the plastic particles 3. The liquid lubricating oil 4 can flow through the pores 3a and it can exude to the inner surface of the sliding bearing 2 from the pores 3a.

To go into details of the sliding bearing 2, it can be formed by gathering a number of plastic particles 3 each having a volume in the range of from about 0.004 mm$^3$ to about 4 mm³ and sintering the cluster of plastic particles 3 with the percentage of porosity of the bearing, which corresponds to the ratio of the total volume of the pores formed between the plastic particles 3 to the volume of the bearing, which is in the range of from about 10% to about 30%.

Next, the description will be directed to operation of the porous plastic bearing according to this embodiment. When the shaft 1 is rotated, a negative pressure is produced in a gap 51 or in the vicinity of the gap 51, which is opposite to a load-side gap 52, between the shaft 1 and the inner surface of the sliding bearing 2. As a result, the liquid lubricating oil 4 which has infiltrated between the plastic particles 3 exudes to the inner surface of the sliding bearing 2 and then flows toward a load-side region in the vicinity of the gap 52 where the distance between the inner surface of the sliding bearing 2 and the shaft 1 is the shortest. A positive pressure is therefore produced in the load-side region. Thus, any contact between the shaft 1 and the sliding bearing 2 can be prevented and hence the frictional resistance between the shaft 1 and the sliding bearing 2 can be reduced.

As can be seen from the arrows in FIG. 2, the liquid lubricating oil 4 enters into the interior of the sliding bearing 2 from the inner surface of the sliding bearing 2 in the vicinity of the load-side gap 52 and then circulates through the interior of the sliding bearing 2 while the oil exudes to between the shaft 1 and the sliding bearing 2 on the side opposite to the load-side gap 52.

As previously explained, during rotation of the shaft 1, the liquid lubricating oil 4 continues to be supplied into the inner surface of the sliding bearing 2 in the vicinity of the gap 51 opposite to the load-side gap 52 while the oil is circulated within the sliding bearing 2. Therefore, wearing and seizure of the sliding bearing 2 can be prevented. Furthermore, since the sliding bearing 2 is made of porous plastic, it is lightweight.

In order to hold the liquid lubricating oil 4 within the sliding bearing 2 made of porous plastic during the above-mentioned operation, there must exist a plurality of plastic particles 3 in any longitudinal or cross section within the sliding bearing 2, as shown in FIG. 2.

Figure 3:
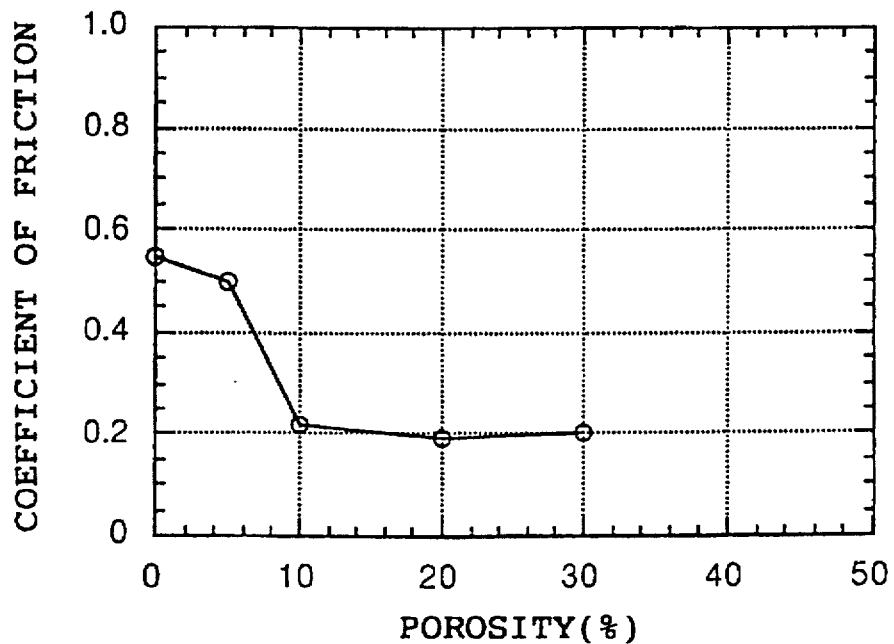
FIG. 3 is a graphical representation of experimental results showing a relationship between the porosity and the coefficient of friction of the porous-plastic sliding bearing according to the embodiment shown in FIG. 1.

Referring now to FIG. 3, it illustrates a graphical representation of experimental results showing a relationship between the porosity and the coefficient of friction of the porous-plastic sliding bearing according to this embodiment. The description will be made as to a relationship between the porosity and the coefficient of friction of the porous-plastic sliding bearing 2 containing the liquid lubricating oil 4, which is sintered by using plastic particles 3 made of ABS resin, each having a volume of 0.065 mm³, with reference to the experimental results. As used herein, the term "porosity" refers to the ratio of the total volume of the pores 3a except the plastic particles 3 to the total volume of the sliding bearing 2. In this embodiment, the total volume of the pores 3a is obtained by subtracting the total volume of the plastic particles 3 used for sintering the sliding bearing 2 from the total volume of the sliding bearing 2, and the porosity is therefore obtained by dividing the total volume of the pores 3a by the total volume of the sliding bearing 2. The porosity is also obtained by subtracting the ratio of the total weight of the sliding bearing 2 to the specific gravity of the plastic particles within the total volume of the sliding bearing 2 from one. VG46 mineral oil can be used as the liquid lubricating oil 4. A shaft made of SUS304 stainless-steel with a diameter of 8 mm and JIS standard surface roughness of 0.1 S can be used as the shaft 1. Using the sliding bearing 2 with a bore diameter of 8 mm, an outside diameter of 16 mm, and a bearing width of 16 mm, the experiment was carried out at a bearing load of 1 kgf, and at a shaft revolutions of 1000 rpm. The experimental results shows that the coefficient of friction is decreased with increasing the porosity and reaches the minimum value as the porosity exceeds 10%, as can be seen from FIG. 3.

Therefore, when the sliding bearing 2 is formed by gathering a number of plastic particles 3, the total volume of which is equal to or less than about 90% of the total volume of the sliding bearing 2 and then sintering the cluster of the plastic particles 3, there can be provided the bearing 2 with a small coefficient of friction, wherein wear and seizure rarely occur.

Furthermore, the experimental results shows that the mechanical strength of the sliding bearing 2 is decreased when the total volume of the plastic particles 2 is equal to or less than about 70% of the total volume of the sliding bearing 2. Therefore, it is clear that the sliding bearing 2 should be formed by sintering a cluster of plastic particles 3, the total volume of which is in the range of from about 70% to about 90% of the total volume of the sliding bearing 2 (i.e. the porosity in the range of from about 10% to about 30%).

Figure 4:
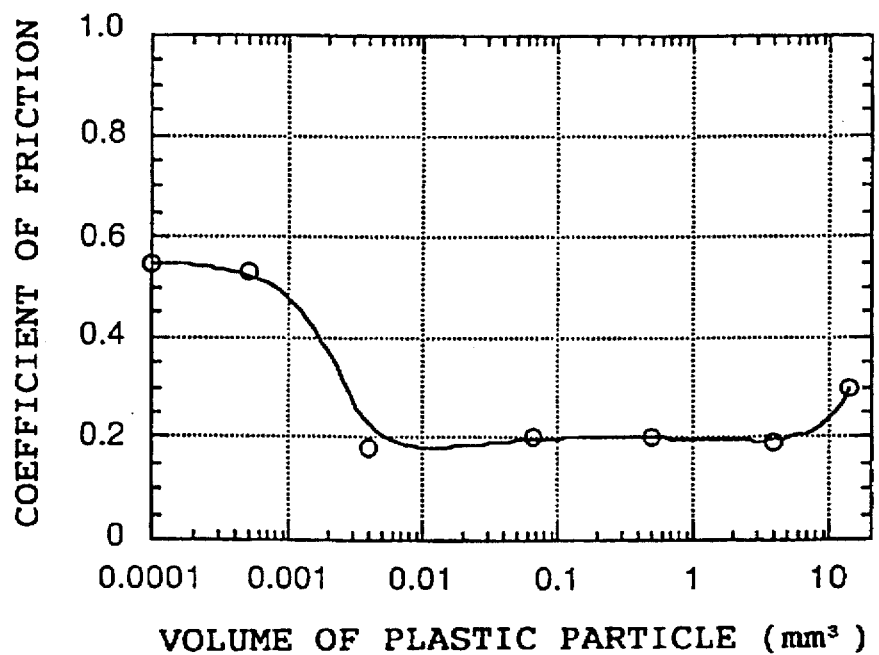
FIG. 4 is a graphical representation of experimental results showing a relationship between the volume of one plastic particle and the coefficient of friction of the porous-plastic sliding bearing according to the embodiment shown in FIG. 1.

Referring now to FIG. 4, it illustrates a graphical representation of experimental results showing a relationship between the volume of one plastic particle and the coefficient of friction of the porous-plastic sliding bearing according to the above-mentioned embodiment. In the figure, experimental results in the case of a porosity of 20% are shown. The other experimental conditions in this case are the same as those in the case shown in FIG. 3.

According to this experiment, as can be seen from FIG. 4, in the case that the volume of one plastic particle 3 is equal to or less than about 0.004 mm³, since the plastic particles 3 melt excessively when gathering the cluster of the plastic particles 3 and sintering it to produce the porous-plastic sliding bearing 2 as shown in FIGS. 1 and 2, the liquid lubricating oil 4 is prevented from entering between the shaft 1 and the sliding bearing 2, whereby the coefficient of friction of the sliding bearing 2 is increased. On the other hand, the experimental results shows that, in the case that the volume of one plastic particle 3 is equal to or more than about 4 mm³, since the pores 3a formed between the plastic particles 3 are too big to hold the liquid lubricating oil 4 therein, the coefficient of friction of the sliding bearing 2 is increased. Therefore, if the sliding bearing 2 is formed by gathering a number of plastic particles 3, the volume of each of which is in the range of from about 0.004 mm³ to about 4 mm³, and then sintering the cluster of the plastic particles 3, there can be provided the sliding bearing 2 with a small coefficient of friction, wherein wear and seizure rarely occur.

In this embodiment, the liquid lubricating agent 4 is oil. Alternatively, the liquid lubricating agent 4 can be grease.

Next, the description will be directed to another embodiment of the present invention. Only the difference between this embodiment and the aforementioned embodiment shown in FIG. 1 will be explained hereinafter.

As previously mentioned, the plastic particles 3 are made of ABS resin in the aforementioned embodiment shown in FIG. 1. Alternatively, in this embodiment, the plastic particles 3 can be constructed of resin such as polyacetal (POM), polypropylene (PP), polyamide (PA), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE). When the plastic particles are made of such an alternative resin, the same advantages as those provided by the aforementioned embodiment shown in FIG. 1 can be offered regardless of the thermal plasticity and thermohardening of the selected resin.

Figure 5:
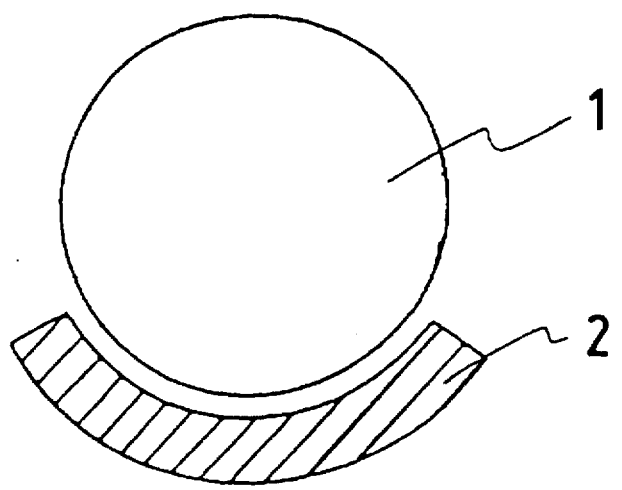
FIG. 5 is a cross-sectional view of a porous plastic bearing according to another embodiment of the present invention.

Referring now to FIG. 5, it illustrates a cross-sectional view of a porous-plastic sliding bearing according to a third embodiment of the present invention. Only the difference between this embodiment and the aforementioned embodiment shown in FIG. 1 will be explained hereinafter.

The sliding bearing 2 according to this embodiment is constructed by a partial bearing portion which can support the lower peripheral surface of the shaft 1 as shown in FIG. 5 by contrast with the sliding bearing 2 according to the aforementioned embodiment shown in FIG. 1 constructed by a full cylindrical bearing portion as shown in FIG. 2. Like the bearing comprised of the full cylindrical bearing portion, a wedge film constructed of lubricating oil is formed in the sliding bearing comprised of this partial bearing portion due to movements of the shaft center, whereby the coefficient of friction of the bearing is reduced. Thus, wear and seizure rarely occur in the bearing. The sliding bearing according to this embodiment can offer the same advantages as those provided by the aforementioned embodiment shown in FIG. 1.

Figure 6:
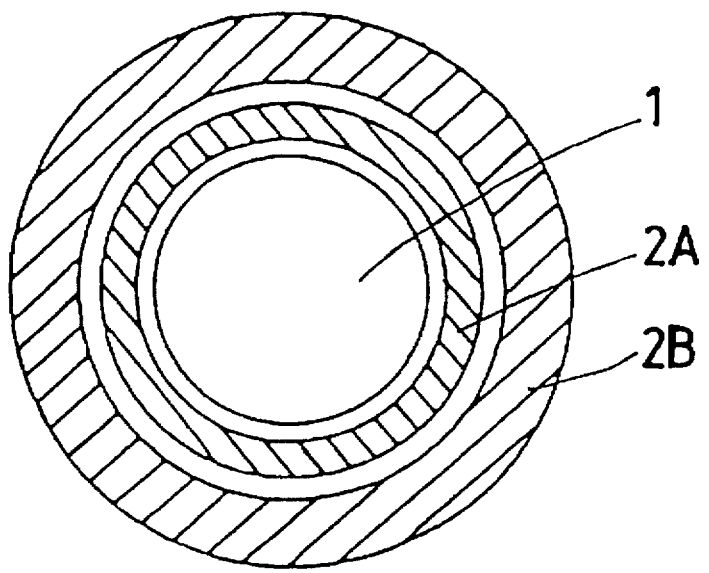
FIG. 6 is a cross-sectional view of a porous plastic bearing according to another embodiment of the present invention.

Referring now to FIG. 6, it illustrates a cross-sectional view of a porous-plastic sliding bearing according to another embodiment of the present invention. Only the difference between this embodiment and the aforementioned embodiment shown in FIG. 1 will be explained hereinafter.

In FIG. 6, reference character 2A denotes a floating bush made of porous plastic, and 2B denotes a outer bearing portion made of porous plastic. In operation, oil films constructed of lubricating oil, which has infiltrated into the floating bush 2A and outer bearing portion 2B, are produced between the shaft 1 and the floating bush 2A and between the floating bush 2A and the outer bearing portion 2B, whereby the coefficient of friction of the bearing is reduced. Thus, wear and seizure rarely occur in the bearing. The sliding bearing according to this embodiment can offer the same advantages as those provided by the aforementioned embodiment shown in FIG. 1.

Figure 7:
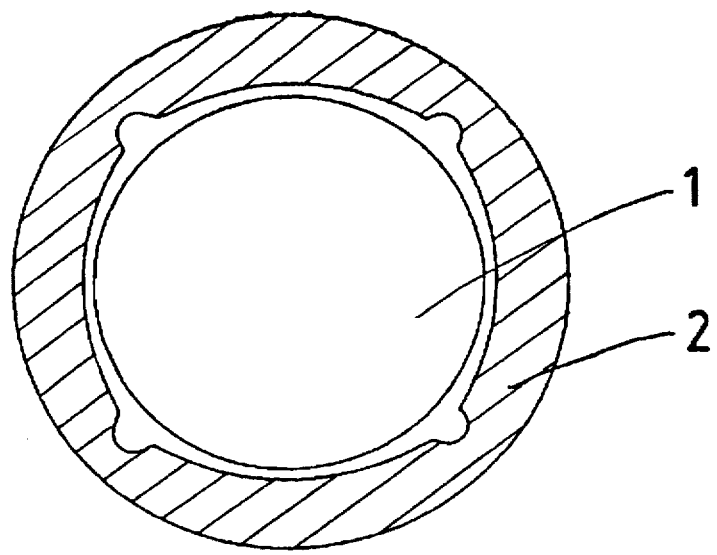
FIG. 7 is a cross-sectional view of a porous plastic bearing according to another embodiment of the present invention.

Referring now to FIG. 7, it illustrates a cross-sectional view of a porous-plastic sliding bearing according to another embodiment of the present invention. Only the difference between this embodiment and the aforementioned embodiment shown in FIG. 1 will be explained hereinafter.

The sliding bearing 2 according to this embodiment is constructed by a multi-lobe bearing portion made of porous plastic and provided with a plurality of grooves formed on the inner lateral surface thereof. As a result, there exists a plurality of oil films due to exudation of the liquid lubrication oil. Therefore, the sliding bearing of this embodiment offers high damping. Furthermore, the reduction of the coefficient of friction of the bearing due to the oil films can prevent the sliding bearing from wearing and seizing up.

Figure 8:
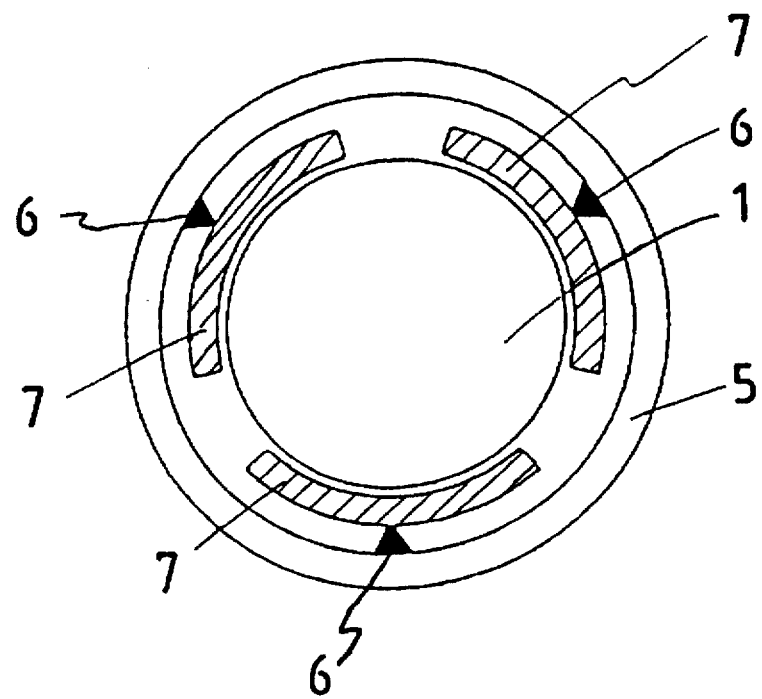
FIG. 8 is a cross-sectional view of a porous plastic bearing according to another embodiment of the present invention.

Referring now to FIG. 8, it illustrates a cross-sectional view of a porous-plastic sliding bearing according to another embodiment of the present invention. Only the difference between this embodiment and the aforementioned embodiment shown in FIG. 1 will be explained hereinafter.

In FIG. 8, reference numeral 5 denotes a bearing outer ring, 6 denotes a pivot, and 7 denotes a pad made of porous plastic. The sliding bearing 2 according to this embodiment is constructed as a tilting pad bearing provided with a plurality of pads 7 which can be tilted freely and a plurality of pivots 6 each supporting a corresponding pad 7. As a result, there exists a plurality of oil films due to exudation of the liquid lubrication oil. Therefore, the sliding bearing of this embodiment offers high damping. Furthermore, the reduction of the coefficient of friction of the bearing due to the oil films can prevent the sliding bearing from wearing and seizing up.

Figure 9:
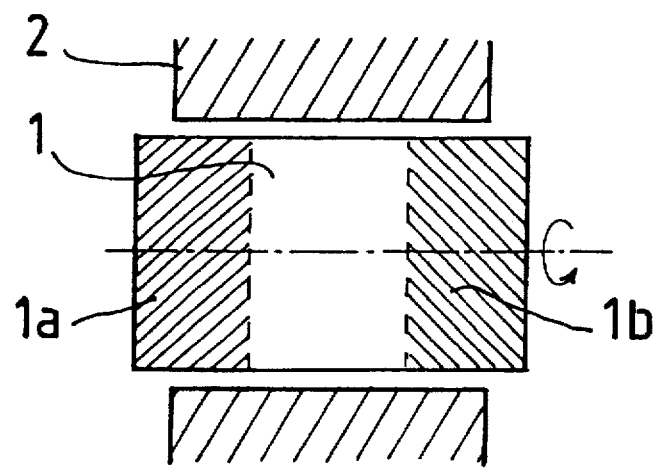
FIG. 9 is a cross-sectional view of a porous plastic bearing according to another embodiment of the present invention.

Referring now to FIG. 9, it illustrates a cross-sectional view of a porous-plastic sliding bearing according to another embodiment of the present invention. Only the difference between this embodiment and the aforementioned embodiment shown in FIG. 1 will be explained hereinafter.

In FIG. 9, reference numerals 1a and 1b denote spiral grooves formed on the lateral surface of the shaft 1. In this embodiment, the shaft 1 is provided with the plural spiral grooves and the porous-plastic sliding bearing 2 is provided with a plurality of grooves. Rotation of the shaft 1 provided with the plural spiral grooves causes the lubricating oil to enter into the plural grooves 1a and 1b. The flows of the lubricating oil, which has flown into the grooves, are dammed up by the ends of the grooves 1a and 1b. As a result, the pressure of the lubricating oil between the shaft 1 and the sliding bearing 2 is increased. Therefore, the coefficient of friction of the bearing is reduced and hence the bearing is not susceptible to wear and seize up.

As previously mentioned, the plastic particles 3, which construct the bearings according to the above-mentioned embodiments shown in FIGS. 5 to 9, are made of ABS resin. Alternatively, the plastic particles 3 can be constructed of resin such as polyacetal (POM), polypropylene (PP), polyamide (PA), polyimide (PI), polyethylene (PE), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE). It is needless to say that the same advantages can be offered when the plastic particles are made of such an alternative resin.

Figure 10:
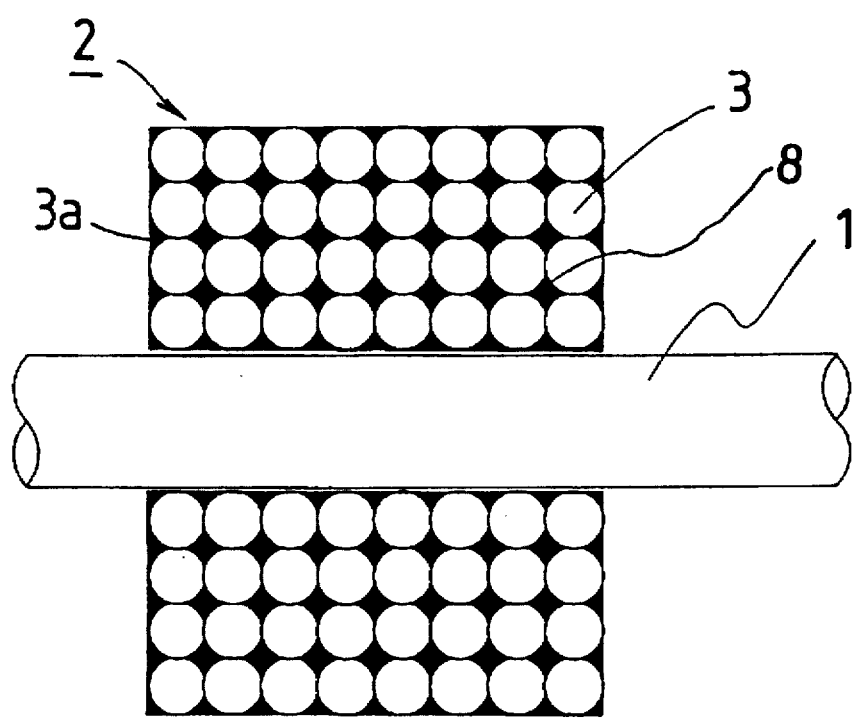
FIG. 10 is a cross-sectional view of a porous plastic bearing according to another embodiment of the present invention.

Referring now to FIG. 10, it illustrates a cross-sectional view of a porous-plastic sliding bearing according to another embodiment of the present invention. In the figure, reference numeral 8 denotes a solid lubricating agent. In this embodiment, the pores 3a formed between the plastic particles 3 are filled with the solid lubricating agent 8 instead of the liquid lubricating oil 4 in the aforementioned first embodiment shown in FIG. 1. The plastic particles 3 are made of ABS resin.

In this embodiment, when the shaft 1 is rotated, the shaft 1 and inner lateral surface of the sliding bearing 2 are brought into contact with each other. The solid lubricating agent 8 inserted between the plastic particles 3 exudes to the inner lateral surface of the sliding bearing, where the bearing and shaft 1 are in contact with each other, at all times. Therefore, the coefficient of friction of the bearing is reduced and hence the bearing is not susceptible to wear and seize-up. Furthermore, the sliding bearing made of porous plastic is lightweight. The solid lubricating agent 8 can be a solid agent which can be inserted into the pores 3a, such as graphite, molybdenum disulfide, tungsten disulfide, boron nitride, or graphite fluoride.

Figure 11:
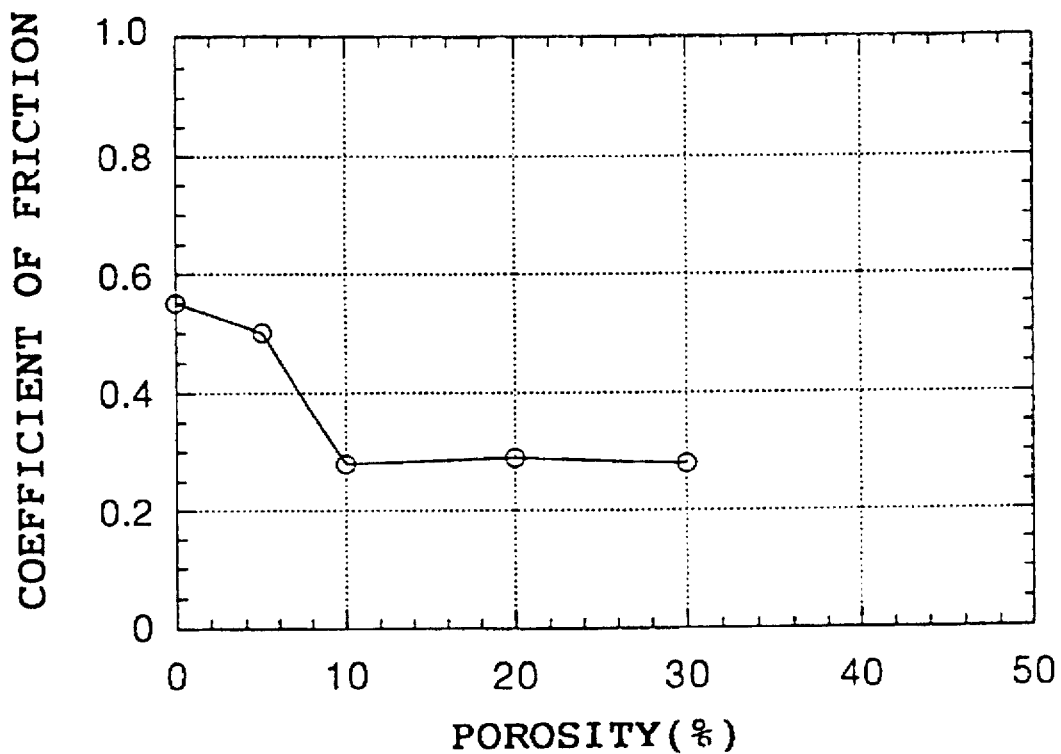
FIG. 11 is a graphical representation of experimental results showing a relationship between the porosity and the coefficient of friction of the porous-plastic sliding bearing according to the embodiment shown in FIG. 10.

Referring now to FIG. 11, it illustrates a graphical representation of experimental results showing a relationship between the porosity and the coefficient of friction of the porous-plastic sliding bearing according to this embodiment. The description will be made as to experimental results showing a relationship between the porosity and the coefficient of friction of the porous-plastic sliding bearing 2 containing the solid lubricating agent 8, which is sintered by using plastic particles 3 made of ABS resin, each having a volume of 0.065 mm³. The solid lubricating agent 8 made of molybdenum disulfide can be used. A test shaft made of SUS304 stainless-steel with a diameter of 8 mm and JIS standard surface roughness of 0.1 S can be used as the shaft 1. Using the sliding bearing 2 with a bore diameter of 8 mm, an outside diameter of 16 mm, and a bearing width of 16 mm, the experiment was carried out at a bearing load of 1 kgf, and at a shaft revolutions of 1000 rpm. The experimental results shows that the coefficient of friction is decreased with increasing the porosity and reaches the minimum value as the porosity exceeds 10%, as can be seen from FIG. 11.

Therefore, when the sliding bearing 2 is formed by gathering a number of plastic particles 3, the total volume of which is equal to or less than about 90% of the total volume of the sliding bearing 2, and then sintering the cluster of the plastic particles 3, there can be provided the bearing 2 with a small coefficient of friction, wherein wear and seizure rarely occur.

The experimental results also shows that the mechanical strength of the sliding bearing 2 is decreased when the total volume of the plastic particles 2 is equal to or less than about 70% of the total volume of the sliding bearing 2. Therefore, it becomes evident that the sliding bearing 2 should be formed by sintering a cluster of plastic particles 3, the total volume of which is in the range of from about 70% to about 90% of the total volume of the sliding bearing 2 (i.e. the porosity in the range of from about 10% to about 30%).

It is clear from the experimental results that, in the case that the volume of one plastic particle 3 is equal to or less than about 0.004 mm³, since such the plastic particles 3 melt excessively when gathering the cluster of plastic particles 3 and sintering it to produce the porous-plastic sliding bearing 2, it is difficult to impregnate the bearing with the solid lubricating agent 8 and hence such a cluster of plastic particles is not suitable for the bearing.

Furthermore, in the case that the volume of one plastic particle 3 is equal to or more than about 4 mm³, the pores 3a formed between the plastic particles 3 are too big to hold the solid lubricating agent 8 therein. Therefore, if the sliding bearing 2 is formed by gathering a number of plastic particles 3, the volume of each of which is in the range of from about 0.004 mm³ to about 4 mm³, and then sintering the cluster of the plastic particles 3, there can be provided the bearing 2 with a small coefficient of friction, wherein wear and seizure rarely occur.

Next, the description will be directed to another embodiment of the present invention. As previously mentioned, the plastic particles 3 are made of ABS resin in the aforementioned embodiment shown in FIG. 10. Alternatively, the plastic particles 3 can be constructed of resin such as polyacetal (POM), polypropylene (PP), polyamide (PA), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE). When the plastic particles are made of such an alternative resin, the same advantages as those provided by the aforementioned embodiment shown in FIG. 10 can be offered regardless of the thermal plasticity and thermohardening of the selected resin.

Next, the description will be directed to another embodiment of the present invention. As can be seen from FIG. 10, the sliding bearing 2 of the above-mentioned embodiment is in the form of an all-around bearing. The sliding bearing 2 of this embodiment is in the form of a dynamic pressure journal bearing such as a partial bearing as shown in FIG. 5, a combination of a floating bush and an outer bearing as shown in FIG. 6, a multi-lobe bearing as shown in FIG. 7, a tilting-pad bearing as shown in FIG. 8, or a bearing with spiral recesses as shown in FIG. 9, instead of a full cylindrical bearing according to the aforementioned embodiment shown in FIG. 10. In all cases, this embodiment can offer the same advantages as those provided by the aforementioned embodiment shown in FIG. 10.

Like the aforementioned embodiment shown in FIG. 10, the plastic particles 3 are made of ABS resin in this embodiment. Alternatively, the plastic particles 3 can be constructed of resin such as polyacetal (POM), polypropylene (PP), polyamide (PA), polyimide (PI), polyethylene (PE), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE). It is needless to say that this variant of the present invention can offer the same advantages.

Figure 12:
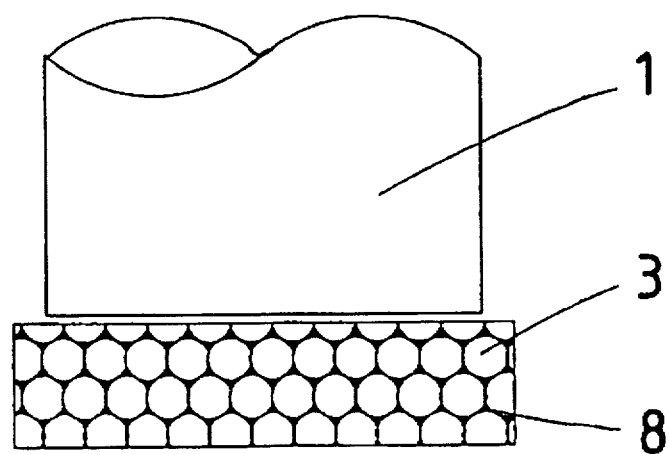
FIG. 12 is a cross-sectional view of a porous plastic bearing according to another embodiment of the present invention.

Referring now to FIG. 12, it illustrates a cross-sectional view of a porous-plastic sliding bearing according to another embodiment of the present invention. Only the difference between this embodiment and the aforementioned embodiment shown in FIG. 10 will be explained hereinafter.

As previously explained, the sliding bearing 2 according to the aforementioned embodiment shown in FIG. 10 can carry a load in the radial direction of the shaft 1. On the contrary, the sliding bearing according to this embodiment is adapted to carry a load in the thrust direction of the shaft 1. This embodiment can offer the same advantages as those provided by the aforementioned embodiment shown in FIG. 10.

Next, the description will be directed to another embodiment of the present invention. In the aforementioned embodiment shown in FIG. 12, the plastic particles 3 are made of ABS resin. Alternatively, the plastic particles 3 can be constructed of resin such as polyacetal (POM), polypropylene (PP), polyamide (PA), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE). When the plastic particles are made of such an alternative resin, the same advantages as those provided by the above-mentioned embodiment shown in FIG. 12 can be offered regardless of the thermal plasticity and thermohardening of the selected resin.

The structure of the bearing of this embodiment, which is formed by sintering a cluster of the plastic particles 3, is the same as that of the aforementioned embodiment shown in FIG. 12.

Figure 13:
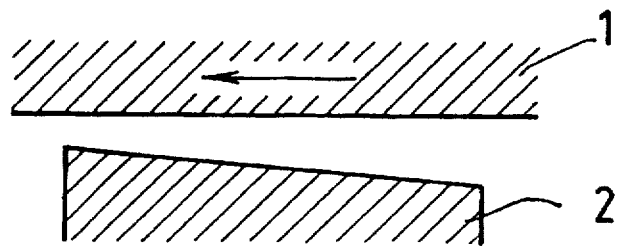
FIG. 13 is a cross-sectional view of a porous plastic bearing according to another embodiment of the present invention.

Referring now to FIG. 13, it illustrates a cross-sectional view of a porous-plastic sliding bearing according to another embodiment of the present invention. Only the difference between this embodiment and the aforementioned embodiment shown in FIG. 12 will be explained hereinafter.

The sliding bearing 2 according to the aforementioned embodiment is in the shape of a circular cylinder having parallel surfaces, as shown in FIG. 12. On the contrary, the sliding bearing 2 according to this embodiment is shaped into a cylinder having an inclined surface. This embodiment can offer the same advantages as those provided by the above-mentioned embodiment shown in FIG. 12.

Figure 14:
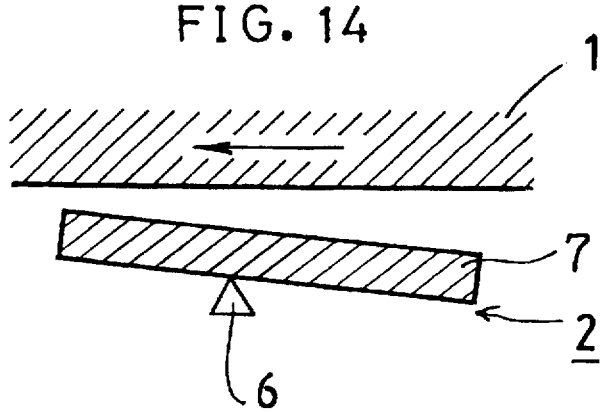
FIG. 14 as a cross-sectional view of a porous plastic bearing according to another embodiment of the present invention.

Referring now to FIG. 14, it illustrates a cross-sectional view of a porous-plastic sliding bearing according to another embodiment of the present invention. Only the difference between this embodiment and the aforementioned embodiment shown in FIG. 12 will be explained hereinafter.

In FIG. 14, reference numeral 6 denotes a pivot, and 7 denotes a pad made of porous plastic. In accordance with this embodiment, the sliding bearing 2 is in the form of a tilting pad bearing including the pivot 6 and pad 7. The same advantages as those provided by the aforementioned embodiment shown in FIG. 12 can also be offered by using the tilting pad bearing 2.

Figure 15:
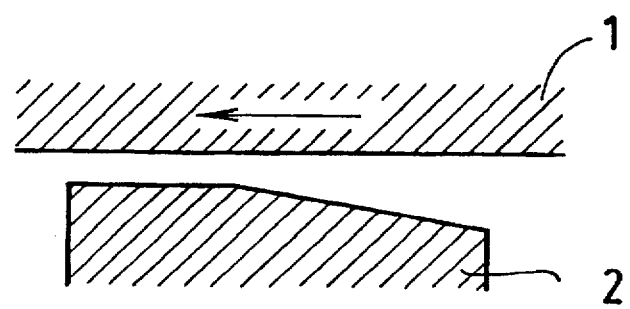
FIG. 15 as a cross-sectional view of a porous plastic bearing according to another embodiment of the present invention.

Referring now to FIG. 15, it illustrates a cross-sectional view of a porous-plastic sliding bearing according to another embodiment of the present invention. Only the difference between this embodiment and the aforementioned embodiment shown in FIG. 12 will be explained hereinafter.

In accordance with this embodiment, the sliding bearing 2 is in the form of a tapered land bearing. The same advantages as those provided by the aforementioned embodiment shown in FIG. 12 can also be offered by using the tapered land bearing 2.

Figure 16:
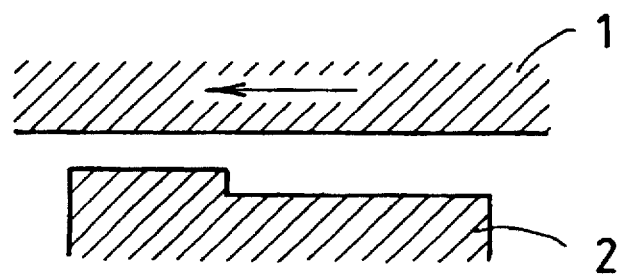
FIG. 16 is a cross-sectional view of a porous plastic bearing according to another embodiment of the present invention.

Referring now to FIG. 16, it illustrates a cross-sectional view of a porous-plastic sliding bearing according to another embodiment of the present invention. Only the difference between this embodiment and the aforementioned embodiment shown in FIG. 12 will be explained hereinafter.

In accordance with this embodiment, the sliding bearing 2 is in the form of a tapered land bearing. The same advantages as those provided by the aforementioned embodiment shown in FIG. 12 can also be offered by using the tapered land bearing 2.

Figure 17:
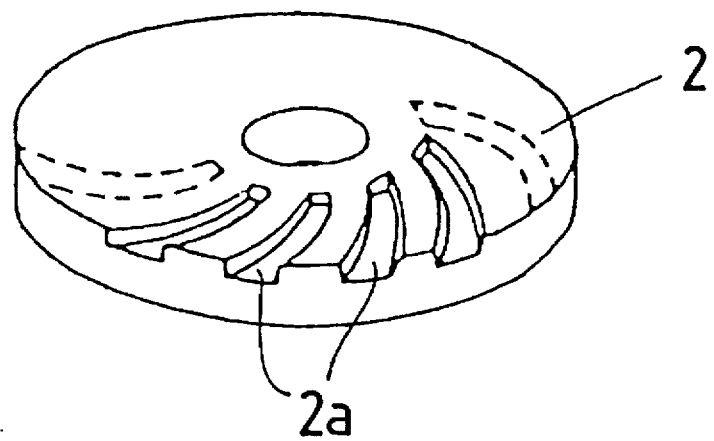
FIG. 17 as a cross-sectional view of a porous plastic bearing according to another embodiment of the present invention.

Referring now to FIG. 17, it illustrates a cross-sectional view of a porous-plastic sliding bearing according to another embodiment of the present invention. Only the difference between this embodiment and the aforementioned embodiment shown in FIG. 12 will be explained hereinafter.

In FIG. 17, reference numeral 2a denotes a spiral groove. In accordance with this embodiment, the sliding bearing 2 is in the form of a bearing with a plurality of spiral grooves 2a. The same advantages as those provided by the aforementioned embodiment shown in FIG. 12 can also be offered.

Figure 18:
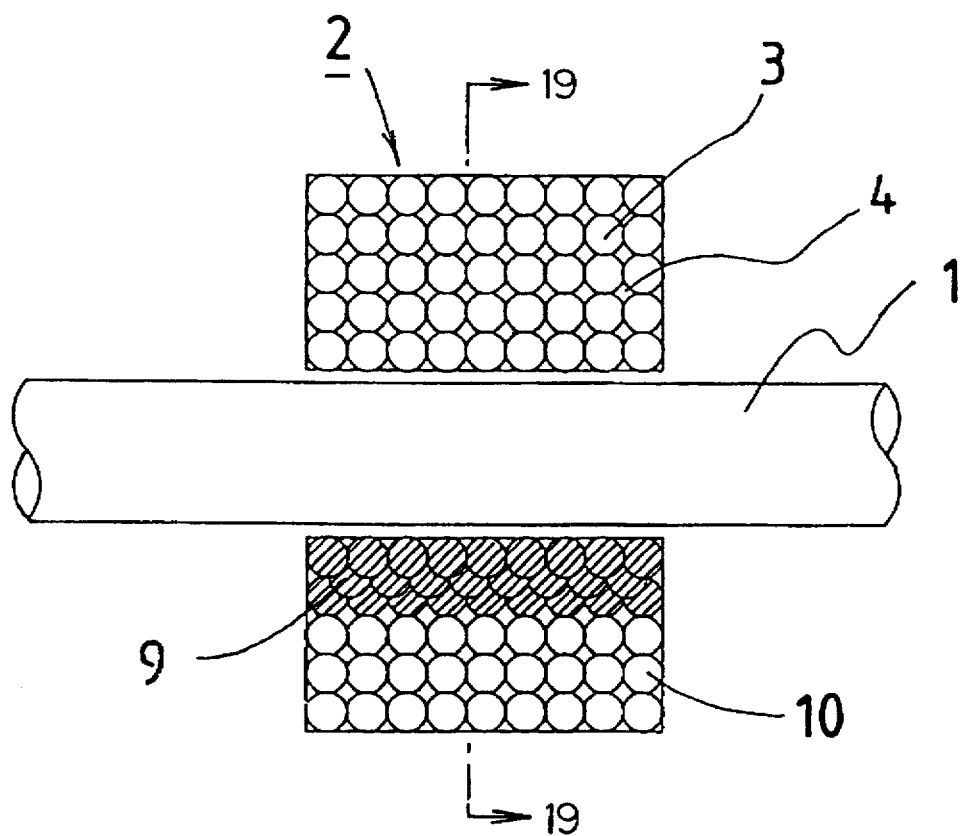
FIG. 18 is a cross-sectional view of a porous plastic bearing according to another embodiment of the present invention.
Figure 19:
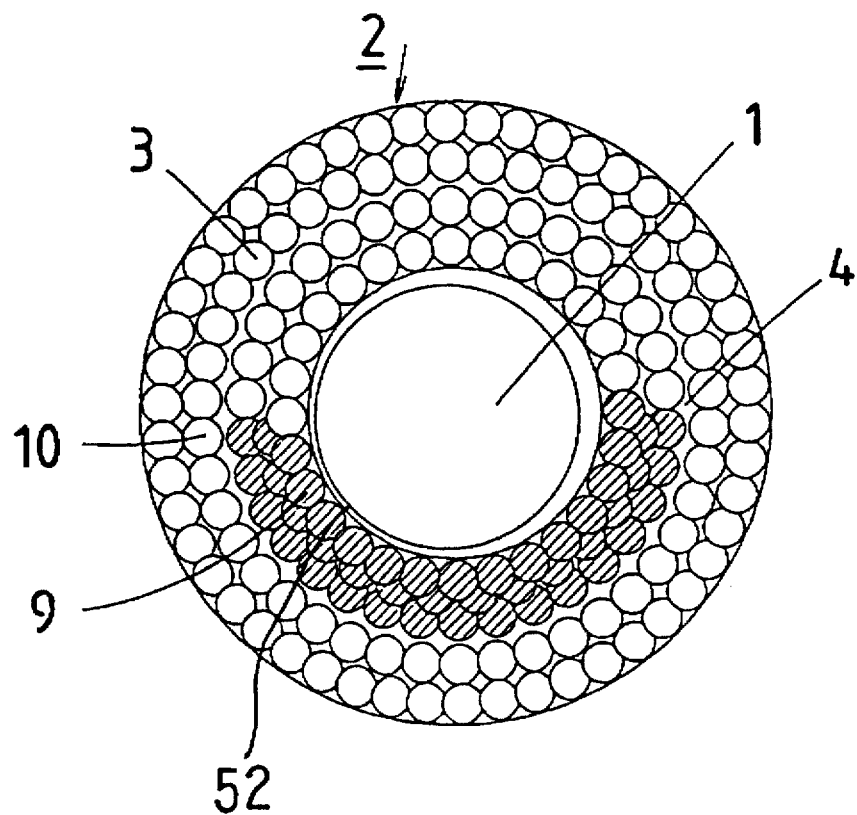
FIG. 19 as a cross-sectional view taken along the line 19—19 of FIG. 18.

Referring now to FIG. 18, it illustrates a cross-sectional view of a porous-plastic sliding bearing according to another embodiment of the present invention. FIG. 19 shows a cross-sectional view taken along the line B—B of FIG. 18. In these figures, reference numeral 9 denotes a plastic particle layer with a low porosity, and 10 denotes a plastic particle layer with a high porosity.

In this embodiment, the plastic particles are made of ABS resin. The low-porosity plastic particle layer 9, which is formed in the inner peripheral portion of the bearing 2, is arranged so that it extends through all the bearing width and it is located only in the lower part of the inner peripheral portion of the sliding bearing which can be brought into contact with the shaft 1 when the shaft 1 is stopped. The summation of the area of a projection of low-porosity particles in the layer 9, which are located just under the inner surface of the sliding bearing 2, on the inner surface of the sliding bearing is less than the total area of the inner surface of the sliding bearing 2.

In order to form the low-porosity plastic particle layer 9 when manufacturing the sliding bearing 2 by sintering, it is preferable to maintain the temperature of the surface of a mold which faces the low-porosity part of the bearing at a temperature which is higher than that of the other part of the mold. Thereby, the low-porosity plastic particle layer 9 can be formed easily.

Next, the description will be directed to the operation of the sliding bearing according to this embodiment. When the shaft 1 is rotated, a negative pressure is produced between the shaft 1 and the high-porosity plastic particle layer 10 in the inner peripheral portion of the sliding bearing 2. As a result, the liquid lubricating oil 4 which has infiltrated within the sliding bearing 2 exudes to the inner surface of the sliding bearing 2 and then flows toward a load-side region in the vicinity of the gap 52 where the distance between the inner surface of the sliding bearing 2 and the shaft 1 is the shortest. A positive pressure is therefore produced in the load-side region. Thus, any contact between the shaft 1 and the sliding bearing 2 can be prevented and hence the frictional resistance between the shaft 1 and the sliding bearing 2 can be reduced.

The liquid lubricating oil 4 tends to enter into the interior of the sliding bearing 2 from the inner surface of the sliding bearing 2 in the vicinity of the load-side gap 52; however, in this case, it cannot enter easily because it is blocked by the low-porosity plastic particle layer 9. Therefore, the oil film formed between the shaft 1 and the inner surface of the sliding bearing 2 can be retained easily. Thus, wearing and seizure of the bearing 2 can be prevented more effectively. Furthermore, since the sliding bearing is made of porous plastic, it is lightweight.

As previously mentioned, in this embodiment, the low-porosity plastic particle layer 9 extends through all the bearing width and is located in the lower half of the inner peripheral portion of the bearing 2 which can be brought into contact with the shaft 1 when the shaft 1 is stopped. Alternatively, the bearing can be provided with one or more low-porosity plastic particle layers 9 in the vicinity of the part thereof which is nearest to the shaft 1 during rotation of the shaft 1. In this case, the same advantages can be provided to one degree or another.

Next, the description will be directed to another embodiment of the present invention. Only the difference between this embodiment and the aforementioned embodiment shown in FIG. 18 will be explained hereinafter.

In the aforementioned embodiment shown in FIG. 18, the plastic particles 3 are made of ABS resin. Alternatively, the plastic particles 3 can be constructed of resin such as polyacetal (POM), polypropylene (PP), polyamide (PA), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE). When the plastic particles are made of such an alternative resin, the same advantages as those provided by the above-mentioned embodiment shown in FIG. 18 can be offered regardless of the thermal plasticity and thermohardening of the selected resin.

Next, the description will be directed to another embodiment of the present invention. Only the difference between this embodiment and the aforementioned embodiment shown in FIG. 18 will be explained hereinafter.

The bearing according to the aforementioned embodiment shown in FIG. 18 is in the form of an all-round bearing. The sliding bearing of this embodiment is in the form of a dynamic pressure journal bearing such as a partial bearing as shown in FIG. 5, a multi-lobe bearing as shown in FIG. 7, a tilting pad bearing as shown in FIG. 8, or a bearing with spiral grooves as shown in FIG. 9. In all cases, this embodiment can offer the same advantages as those provided by the aforementioned embodiment shown in FIG. 18.

The plastic particles 3 within the bearing according to this embodiment can be constructed of the same ABS resin as in the aforementioned embodiment shown in FIG. 8, or resin such as polyacetal (POM), polypropylene (PP), polyamide (PA), polyimide (PI), polyethylene (PE), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE). It is needless to say that when the plastic particles are made of such an alternative resin, the same advantages as those provided by the above-mentioned embodiment shown in FIG. 18 can be offered regardless of the thermal plasticity and thermohardening of the selected resin.

Figure 20:
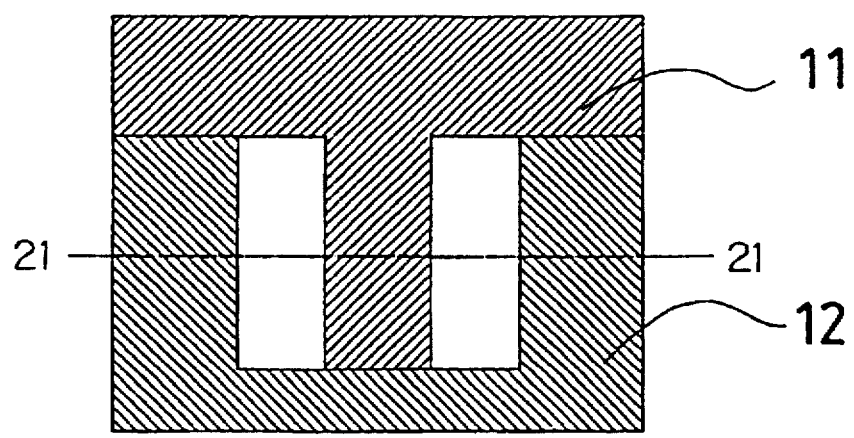
FIG. 20 is a cross-sectional view of a mold used for the manufacture of a porous plastic bearing according to another embodiment of the present invention.

Referring now to FIG. 20, it illustrates a cross-sectional view of a mold used for the manufacture of a porous plastic bearing according to another embodiment of the present invention. In the figure, reference numeral 11 denotes a convex metal mold, and 12 denotes a concave metal mold. These convex and concave mold halves 11 and 12 are made of for example a thermal conductive material such as aluminum.

Figure 21:
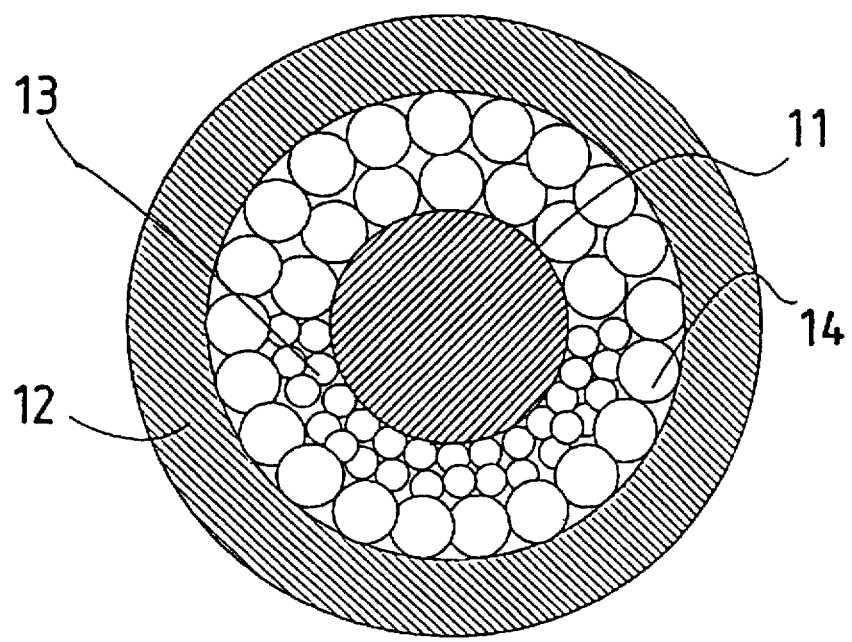
FIG. 21 is a cross-sectional view taken along the line 21—21 of FIG. 20.

Referring now to FIG. 21, it illustrates a cross-sectional view taken along the line 21—21 of FIG. 20. In the figure, reference numeral 13 denotes a small-volume plastic particle, and 14 denotes a large-volume plastic particle. The plastic particles 13 and 14 are made of ABS resin. The small-volume plastic particles 13 in the inner peripheral portion of the bearing 2 are arranged so that they extend through all the bearing width and are located only in the lower half of the inner peripheral portion of the sliding bearing 2 which can be brought into contact with the shaft 1 when the shaft 1 is stopped.

In accordance with this embodiment, the cylindrical sliding bearing is formed by inserting the convex metal mold 11 under pressure into the concave metal mold 12 containing the plastic particles 13 and 14.

For example, by introducing a cluster of small-volume plastic particles 13 into a part, in the vicinity of the convex metal mold 11, of the lower half of the cylindrical space produced between the concave metal mold 12 and the convex metal mold 11 and introducing a cluster of large-volume plastic particles 14 into the other part of the cylindrical space when introducing the plastic particles 13 and 14 made of ABS resin into the concave metal mold 12, heating, pressurizing and sintering the plastic particles 13 and 14 within the mold at a temperature equal to or more than the softening temperature of ABS resin and equal to or less than the thermal decomposition temperature of ABS resin, and cooling the sintered plastic particles in the atmosphere, the porous plastic bearing device wherein the low-porosity plastic particle layer 9 is located in the lower half of the inner peripheral portion of the bearing and the other part of the bearing is occupied by the high-porosity plastic particle layer 10 can be obtained. It became evident by experiment that in the case that the particles are made of ABS resin, the bearing can be manufactured at a temperature in the range of from about 150° C. to about 220° C.

As previously mentioned, in this embodiment, the small-volume plastic particles 13 extend through all the bearing width and are arranged in the lower half of the inner peripheral portion of the bearing 2 which can be brought into contact with the shaft 1 when the shaft 1 is stopped. Alternatively, the bearing can be provided with one or more cluster of small-volume plastic particles 13 in the vicinity of the part thereof which is nearest to the shaft 1 during rotation of the shaft 1. In this case, the same advantages can be provided to one degree or another.

Next, the description will be directed to another embodiment of the present invention. Only the deference between this embodiment and the aforementioned embodiment shown in FIG. 21 will be described hereinafter. Both of the small-volume plastic particles 13 and large-volume plastic particles 14 are made of ABS resin in the aforementioned embodiment shown in FIG. 21. Alternatively, they can be constructed of resin such as polyacetal (POM), polypropylene (PP), polyamide (PA), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE). When the plastic particles are made of such an alternative resin, the same advantages as those provided by the above-mentioned embodiment shown in FIG. 21 can be offered regardless of the thermal plasticity and thermohardening of the selected resin.

Figure 22:
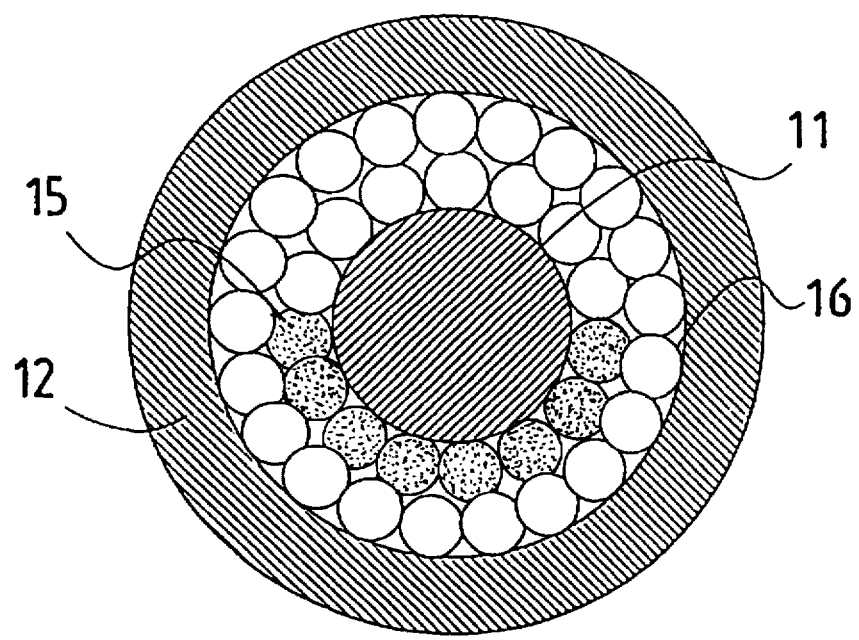
FIG. 22 is a cross-sectional view of a mold used for the manufacture of a porous plastic bearing according to another embodiment of the present invention.

Referring now to FIG. 22, it illustrates a cross-sectional view of a mold used for the manufacture of a porous plastic bearing according to another embodiment of the present invention. The figure corresponds to an illustration in cross section taken along the line 21—21 of FIG. 20.

In FIG. 22, reference numeral 15 denotes a plastic particle having a low softening temperature characteristics, and 16 denotes a plastic particle having a high softening temperature characteristics. In this embodiment, the plastic particle 15 having a low softening temperature characteristics are made of ABS resin, and the plastic particles 16 having a high softening temperature characteristics are made of polytetrafluoroethylene resin. The low-softening-temperature plastic particles 15 extend through all the bearing width and are arranged in the lower half of the inner peripheral portion of the bearing 2 which can be brought into contact with the shaft 1 when the shaft 1 is stopped.

In accordance with this embodiment, the cylindrical sliding bearing device is formed by inserting the convex metal mold 11 under pressure into the concave metal mold 12 after the introduction of the plastic particles 15 and 16 into the concave metal mold 12. In the molding process, by introducing a cluster of low-softening-temperature plastic particles 15 into a part of the lower half of the cylindrical space produced between the concave metal mold 12 and the convex metal mold 11 in the vicinity of the convex metal mold 11 and introducing a cluster of high-softening-temperature plastic particles 16 into the other part of the cylindrical space when introducing the plastic particles 15 and 16 into the concave metal mold 12, heating, pressurizing and sintering the plastic particles 15 and 16 within the mold at a temperature not less than the softening temperatures of the plastic particles 15 and 16 and not more than the thermal decomposition temperatures of the plastic particles 15 and 16, and cooling the sintered plastic particles in the atmosphere, the porous plastic bearing device wherein the low-porosity plastic particle layer 9 is located in the lower half of the inner peripheral portion of the bearing and the other part of the bearing is occupied by the high-porosity plastic particle layer 10 can be obtained.

As previously mentioned, in this embodiment, the low-softening-temperature plastic particles 15 extend through all the bearing width and are arranged in the lower half of the inner peripheral portion of the bearing 2 which can be brought into contact with the shaft 1 when the shaft 1 is stopped. Alternatively, the bearing can be provided with one or more cluster of low-softening-temperature plastic particles 15 in the vicinity of the part thereof which is nearest to the shaft 1 during rotation of the shaft 1. In this case, the same advantages can be provided to one degree or another.

Next, the description will be directed to another embodiment of the present invention. Only the deference between this embodiment and the aforementioned embodiment shown in FIG. 22 will be described hereinafter. The lowsoftening-temperature plastic particles 15 are made of ABS resin and the high-softening-temperature plastic particles 16 are made of polytetrafluoroethylene resin in the aforementioned embodiment shown in FIG. 22. Alternatively, the low-softening-temperature plastic particles 15 can be constructed of polyacetal resin. Furthermore, the low-softening-temperature plastic particles 15 and high-softening-temperature plastic particles 16 can be made of respective materials, which are different from each other, selected from the group consisting of ABS, polyacetal (POM), polypropylene (PP), polyamide (PA), polybutylene terephthalate (PBT), polyphenylene sulfide (PPS), polyether ether ketone (PEEK), polyether sulfone (PES), polyarylate (PAR), polyamide-imide (PAI), and polytetrafluoroethylene (PTFE) resins, and the selected one with a low-softening-temperature characteristics is used as the material of the plastic particles 15 and the other selected one with a high-softening-temperature characteristics is used as the material of the plastic particles 16. These variants can offer the same advantages as those provided by the above-mentioned embodiment shown in FIG. 22.

Figure 23:
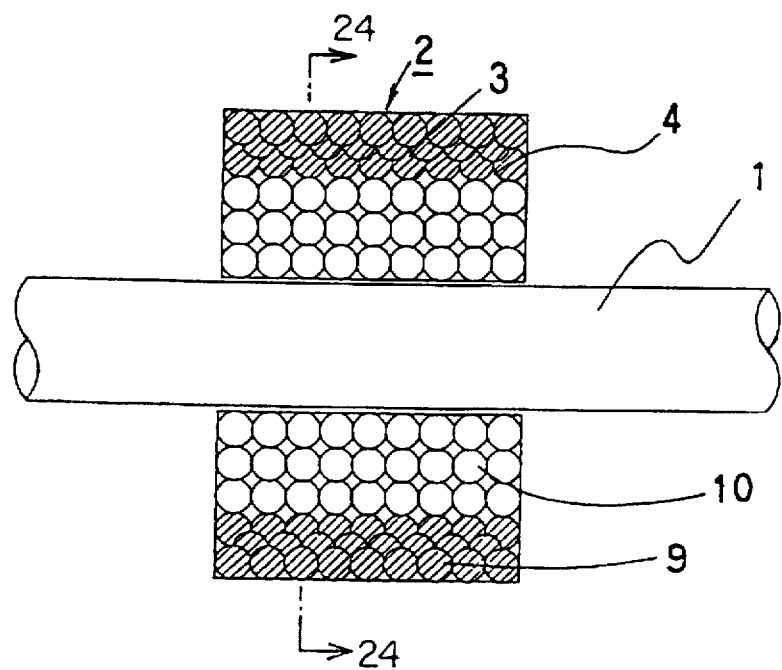
FIG. 23 is a cross-sectional view of a porous plastic bearing according to another embodiment of the present invention.
Figure 24:
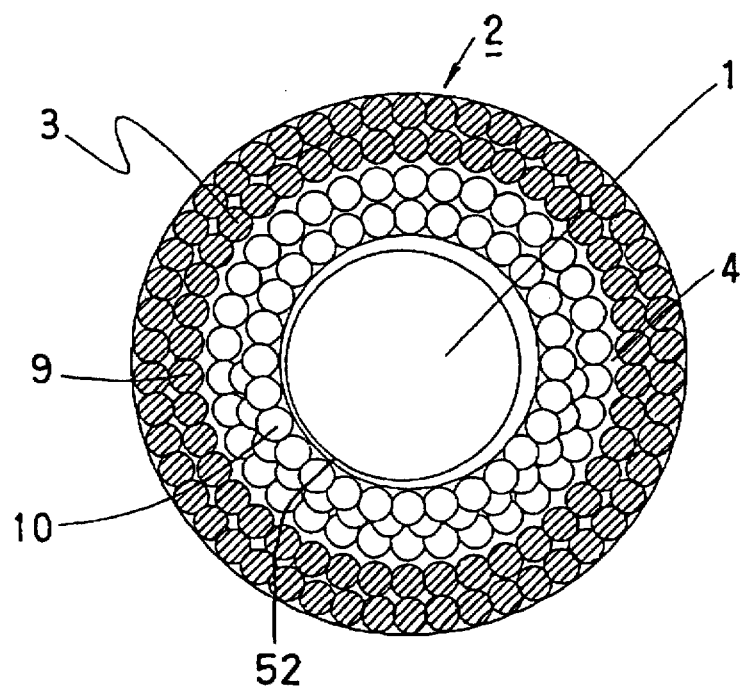
FIG. 24 is a cross-sectional view taken along the line 24—24 of FIG. 23.

Referring now to FIG. 23, it illustrates a cross-sectional view of a porous-plastic sliding bearing according to another embodiment of the present invention. FIG. 24 shows a cross-sectional view taken along the line 24—24 of FIG. 23. Only the deference between this embodiment and the aforementioned embodiment shown in FIG. 18 will be described hereinafter.

In the aforementioned embodiment shown in FIG. 18, the low-porosity plastic particle layer 9 is located in the inner peripheral portion of the bearing 2 and the other part of bearing is occupied by the high-porosity plastic particle layer 10. On the contrary, according to this embodiment, the low-porosity plastic particle layer 9 is located in the outer peripheral portion of the bearing 2 and the high-porosity plastic particle layer 10 is located in the inner peripheral portion of the bearing 2.

In this embodiment, the plastic particles in the low-porosity plastic particle layer 9 and high-porosity plastic particle layer 10 are made of ABS resin. When manufacturing the sliding bearing 2 by sintering, the low-porosity plastic particle layer 9 can be formed easily by maintaining the temperature of the surface of a mold which faces the low-porosity part of the bearing at a temperature which is higher than that of the other part of the mold.

Next, the description will be directed to the operation of the sliding bearing according to this embodiment. When the shaft 1 is rotated, a negative pressure is produced in the gap 51 or in the vicinity of the gap 51, which is opposite to the load-side gap 52, between the shaft 1 and the inner surface of the bearing 2. As a result, the liquid lubricating oil 4 which has infiltrated within the sliding bearing 2 exudes to the inner surface of the sliding bearing 2 and then flows toward a load-side region in the vicinity of the gap 52 where the distance between the inner surface of the sliding bearing 2 and the shaft 1 is the shortest. A positive pressure is therefore produced in the load-side region. Thus, any contact between the shaft 1 and the sliding bearing 2 can be prevented and hence the frictional resistance between the shaft 1 and the sliding bearing 2 can be reduced.

The liquid lubricating oil 4 enters into the interior of the sliding bearing 2 from the inner surface of the sliding bearing 2 in the vicinity of the load-side gap 52 as shown in FIG. 2 and then circulates through the interior of the sliding bearing 2 while the oil exudes to between the shaft 1 and the sliding bearing 2 on the side opposite to the load-side gap 52.

If the shaft 1 is rotated at a higher speed, the liquid lubricating oil 4 circulated within the bearing 2 tends to go out from the outer surface of the bearing 2 due to the centrifugal force exerted on it; however, it cannot burst out of the bearing 2 because the porosity of the outer peripheral portion of the bearing 2 is too small for the oil to flow to outside the bearing 2 through the outer peripheral portion.

Thus, during rotation of the shaft 1 the liquid lubricating oil 4 continues to be supplied into the load-side gap 52 between the inner surface of the bearing 2 and the shaft 1 without itself being consumed due to the dispersion of the oil to outside the bearing 2 while the oil is circulated within the interior of the bearing 2. Therefore, wearing and seizure of the bearing 2 can be prevented for a protracted period. Furthermore, since the sliding bearing device 2 is made of porous plastic, it is lightweight.

In order to hold the liquid lubricating oil 4 within the plastic bearing, there must exist a plurality of plastic particles in any longitudinal or cross section within the bearing 2, as shown in FIG. 2. The liquid lubricating agent 4 is oil. Alternatively, the liquid lubricating agent 4 can be grease.

Next, the description will be directed to another embodiment of the present invention. Only the difference between this embodiment and the aforementioned embodiment shown in FIG. 23 will be explained hereinafter. In the embodiment shown in FIG. 23, the plastic particles in the layers 9 and 10 are constructed of ABS resin. Alternatively, the plastic particles in the layers 9 and 10 can be constructed of resin such as polyacetal (POM), polypropylene (PP), polyamide (PA), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE). When the plastic particles are made of such an alternative resin, the same advantages as those provided by the aforementioned embodiment shown in FIG. 23 can be offered regardless of the thermal plasticity and thermohardening of the selected resin.

Next, the description will be directed to another embodiment of the present invention. Only the difference between this embodiment and the aforementioned embodiment shown in FIG. 23 will be explained hereinafter. As previously mentioned, in the aforementioned embodiment shown in FIG. 23, the bearing is in the form of an all-round bearing. On the other hand, the sliding bearing of this embodiment can be in the form of a dynamic pressure journal bearing such as a partial bearing as shown in FIG. 5, a combination of a floating bush and an outer bearing as shown in FIG. 6, a multi-lobe bearing as shown in FIG. 7, a tilting pad bearing as shown in FIG. 8, or a bearing provided with spiral grooves as shown in FIG. 9. In all cases, this embodiment can offer the same advantages as those provided by the aforementioned embodiment shown in FIG. 23.

Like the aforementioned embodiment shown in FIG. 23, the plastic particles 3 are made of ABS resin in this embodiment. Alternatively, the plastic particles 3 can be constructed of resin such as polyacetal (POM), polypropylene (PP), polyamide (PA), polyimide (PI), polyethylene (PE), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE). It is needless to say that when the plastic particles are made of such an alternative resin, the same advantages can be offered regardless of the thermal plasticity and thermohardening of the selected resin.

Figure 25:
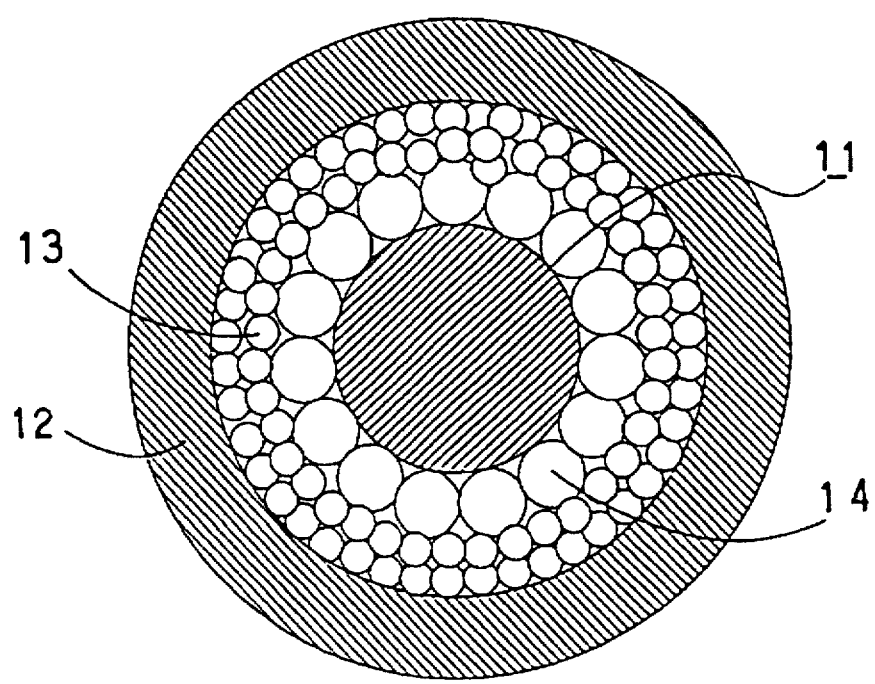
FIG. 25 is a cross-sectional view of a mold used for the manufacture of a porous plastic bearing according to another embodiment of the present invention.

Referring now to FIG. 25, it illustrates a cross-sectional view of a mold used for the manufacture of a porous plastic bearing according to another embodiment of the present invention. The figure corresponds to an illustration in cross section taken along the line C—C of FIG. 20.

In FIG. 25, reference numeral 13 denotes a small-volume plastic particle, and 14 denotes a large-volume plastic particle. The plastic particles 13 and 14 are made of ABS resin.

In accordance with this embodiment, the cylindrical sliding bearing is formed by inserting the convex metal mold 11 under pressure into the concave metal mold 12 after the introduction of the plastic particles 13 and 14 into the concave metal mold 12.

For example, by introducing a cluster of small-volume plastic particles 13 into the outer peripheral portion of the cylindrical space, as shown in FIG. 24, produced between the concave metal mold 12 and the convex metal mold 11 and introducing a cluster of large-volume plastic particles 14 into the inner peripheral portion of the cylindrical space when introducing the plastic particles 13 and 14 made of ABS resin into the concave metal mold 12, heating, pressurizing and sintering the plastic particles 13 and 14 within the mold at a temperature equal to or more than the softening temperature of ABS resin and equal to or less than the thermal decomposition temperature of ABS resin, and cooling the sintered plastic particles in the atmosphere, the porous plastic bearing device wherein the low-porosity plastic particle layer 9 is located in the outer peripheral portion of the bearing and the high-porosity plastic particle layer 10 is located in the inner peripheral portion of the bearing can be obtained. It became evident by experiment that in the case that the particles are made of ABS resin, the bearing can be manufactured at a temperature in the range of from about 150° C. to about 220° C.

Next, the description will be directed to another embodiment of the present invention. Only the deference between this embodiment and the aforementioned embodiment shown in FIG. 25 will be described hereinafter. Both of the small-volume plastic particles 13 and large-volume plastic particles 14 are made of ABS resin in the aforementioned embodiment shown in FIG. 25. Alternatively, they can be constructed of resin such as polyacetal (POM), polypropylene (PP), polyamide (PA), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE). When the plastic particles are made of such an alternative resin, the same advantages as those provided by the above-mentioned embodiment shown in FIG. 25 can be offered regardless of the thermal plasticity and thermohardening of the selected resin.

Figure 26:
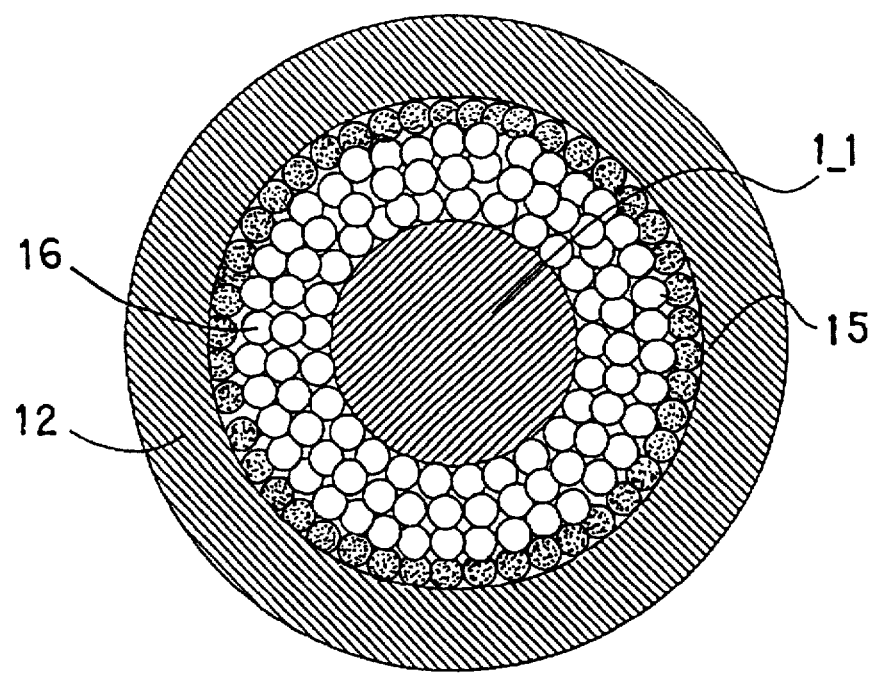
FIG. 26 is a cross-sectional view of a mold used for the manufacture of a porous plastic bearing according to another embodiment of the present invention.

Referring now to FIG. 26, it illustrates a cross-sectional view of a mold used for the manufacture of a porous plastic bearing according to another embodiment of the present invention. The figure corresponds to an illustration in cross section taken along the line 21—21 of FIG. 20.

In FIG. 26, reference numeral 15 denotes a plastic particle having a low softening temperature characteristics, and 16 denotes a plastic particle having a high softening temperature characteristics. In this embodiment, the plastic particles 15 having a low softening temperature characteristics are made of ABS resin, and the plastic particles 16 having a high softening temperature characteristics are made of polytetrafluoroethylene resin.

In accordance with this embodiment, the cylindrical sliding bearing device is formed by inserting the convex metal mold 11 under pressure into the concave metal mold 12 after the introduction of the plastic particles 15 and 16 into the concave metal mold 12. In the molding process, by introducing a cluster of low-softening-temperature plastic particles 15 into the outer peripheral portion of the cylindrical space produced between the concave metal mold 12 and the convex metal mold 11 and introducing a cluster of high-softening-temperature plastic particles 16 into the inner peripheral portion of the cylindrical space when introducing the plastic particles 15 and 16 into the concave metal mold 12, heating, pressurizing and sintering the plastic particles 15 and 16 within the mold at a temperature not less than the softening temperatures of the plastic particles 15 and 16 and not more than the thermal decomposition temperatures of the plastic particles 15 and 16, and cooling the sintered plastic particles in the atmosphere, the porous plastic bearing device wherein the low-porosity plastic particle layer 9 is located in the outer peripheral portion of the bearing can be obtained.

Next, the description will be directed to another embodiment of the present invention. Only the deference between this embodiment and the aforementioned embodiment shown in FIG. 26 will be described hereinafter. The low-softening-temperature plastic particles 15 are made of ABS resin and the high-softening-temperature plastic particles 16 are made of polytetrafluoroethylene resin in the aforementioned embodiment shown in FIG. 26. Alternatively, the low-softening-temperature plastic particles 15 can be constructed of polyacetal resin. Furthermore, the low-softening-temperature plastic particles 15 and high-softening-temperature plastic particles 16 can be made of respective materials, which are different from each other, selected from the group consisting of ABS, polyacetal (POM), polypropylene (PP), polyamide (PA), polybutylene terephthalate (PBT), polyphenylene sulfide (PPS), polyether ether ketone (PEEK), polyether sulfone (PES), polyarylate (PAR), polyamide-imide (PAI), and polytetrafluoroethylene (PTFE) resins, and the selected one with a low-softening-temperature characteristics is used as the material of the plastic particles 15 and the other selected one with a high-softening-temperature characteristics is used as the material of the plastic particles 16. The variants can offer the same advantages as those provided by the above-mentioned embodiment shown in FIG. 26.

Figure 27:
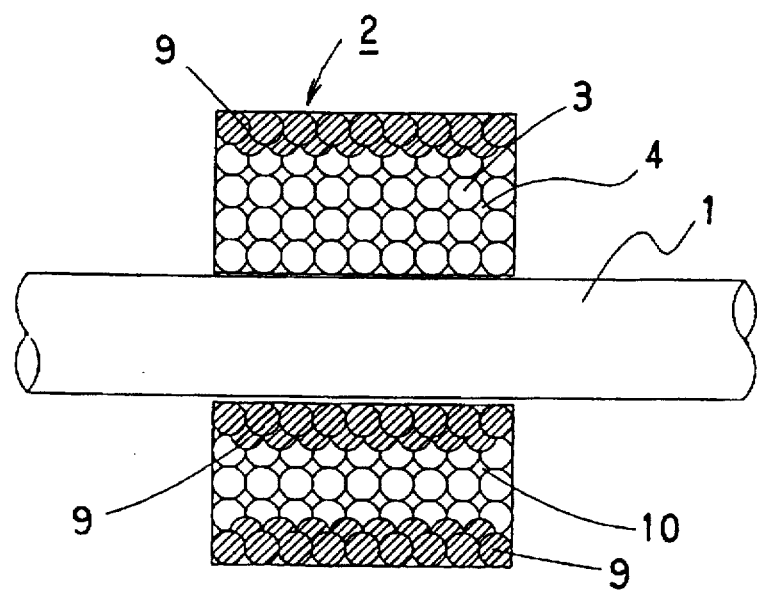
FIG. 27 is a cross-sectional view of a porous plastic bearing according to another embodiment of the present invention.

Referring now to FIG. 27, it illustrates a cross-sectional view of a porous-plastic sliding bearing according to another embodiment of the present invention. In the figure, reference numeral 9 denotes a plastic particle layer with a low porosity, and 10 denotes a plastic particle layer with a high porosity. The plastic particles in the layers 9 and 10 are made of ABS resin. The low-porosity plastic particle layer 9, which is formed in the inner peripheral portion of the bearing 2, is arranged so that it extends through all the bearing width and it is located only in a half portion of the inner peripheral portion of the bearing 2 which can be brought into contact with the shaft 1 when the shaft 1 is stopped.

In accordance with this embodiment, when manufacturing the sliding bearing 2 by sintering, the low-porosity plastic particle layer 9 can be easily formed by maintaining the temperature of the surface of a mold which faces the low-porosity part of the bearing at a temperature which is higher than that of the other part of the mold.

Next, the description will be directed to the operation of the bearing according to this embodiment. When the shaft 1 is rotated, a negative pressure is produced in the gap 51 or in the vicinity of the gap 51, which is opposite to the load-side gap 52, between the shaft 1 and the inner surface of the bearing 2. As a result, the liquid lubricating oil 4 which has infiltrated within the bearing 2 exudes to the inner surface of the bearing 2 and then flows toward a load-side region in the vicinity of the gap 52 where the distance between the inner surface of the sliding bearing 2 and the shaft 1 is the shortest. A positive pressure is therefore produced in the load-side region. Thus, any contact between the shaft 1 and the bearing 2 can be prevented and hence the frictional resistance between the shaft 1 and the bearing 2 can be reduced.

The liquid lubricating oil 4 tends to enter into the interior of the bearing 2 from the inner surface of the bearing 2 in the vicinity of the load-side gap; however, in this case, it cannot enter easily because it is blocked by the low-porosity plastic particle layer 9. Therefore, the oil film formed between the shaft 1 and the inner surface of the bearing 2 can be retained easily. The liquid lubricating oil 4 also enters into the interior of the bearing 2 from the inner surface of the bearing 2 in the vicinity of the load-side gap 52 as shown in FIG. 2 and then circulates through the interior of the bearing 2 while the oil exudes to the gap 51 opposite to the load-side gap 52 between the shaft 1 and the sliding bearing 2.

If the shaft 1 is rotated at a higher speed, the liquid lubricating oil 4 circulated within the bearing 2 tends to go out from the outer surface of the bearing 2 due to the centrifugal force exerted on it; however, it cannot burst out of the bearing 2 because the outer peripheral portion of the bearing 2 is constructed by the low-porosity plastic layer 9.

Thus, during rotation of the shaft 1 the liquid lubricating oil 4 continues to be supplied into the load-side gap 52 between the inner surface of the bearing 2 and the shaft 1 without itself being consumed due to the dispersion of the oil to outside the bearing 2 while the oil is circulated within the interior of the bearing 2. Therefore, wearing and seizure of the bearing 2 can be prevented for a protracted period. Furthermore, since the sliding bearing device 2 is made of porous plastic, it is lightweight.

In order to hold the liquid lubricating oil 4 within the plastic bearing device, there must exist a plurality of plastic particles in any longitudinal or cross section within the bearing device. The liquid lubricating agent 4 is oil. Alternatively, the liquid lubricating oil 4 can be grease.

As previously mentioned, in this embodiment, the low-porosity plastic particle layer 9 extends through all the bearing width and is located in the half of the inner peripheral portion of the bearing 2 which can be brought into contact with the shaft 1 when the shaft 1 is stopped. Alternatively, the bearing can be provided with one or more low-porosity plastic particle layers 9 in the vicinity of the part thereof which is nearest to the shaft 1 during rotation of the shaft 1. In this case, the same advantages can be provided to one degree or another.

Next, the description will be directed to another embodiment of the present invention. Only the difference between this embodiment and the aforementioned embodiment shown in FIG. 27 will be explained hereinafter. In the embodiment shown in FIG. 27, the plastic particle in the layers 9 and 10 are constructed of ABS resin. Alternatively, the plastic particles in the layers 9 and 10 can be constructed of resin such as polyacetal (POM), polypropylene (PP), polyamide (PA), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE). When the plastic particles are made of such an alternative resin, the same advantages as those provided by the aforementioned embodiment shown in FIG. 27 can be offered regardless of the thermal plasticity and thermohardening of the selected resin.

Next, the description will be directed to another embodiment of the present invention. Only the difference between this embodiment and the aforementioned embodiment shown in FIG. 27 will be explained hereinafter. The bearing according to the aforementioned embodiment shown in FIG. 27 is in the form of an all-round bearing. The bearing of this embodiment is in the form of a dynamic pressure journal bearing such as a partial bearing as shown in FIG. 5, a multi-lobe bearing as shown in FIG. 7, a tilting pad bearing as shown in FIG. 8, or a bearing provided with spiral grooves as shown in FIG. 9. In all cases, this embodiment can offer the same advantages as those provided by the aforementioned embodiment shown in FIG. 27.

The plastic particles in the layers 9 and 10 within the bearing according to this embodiment can be constructed of ABS resin, like the aforementioned embodiment shown in FIG. 27. Alternatively, the plastic particles in the layers 9 and 10 can be made of resin such as polyacetal (POM), polypropylene (PP), polyamide (PA), polyimide (PI), polyethylene (PE), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE). It is needless to say that when the plastic particles are made of such an alternative resin, the same advantages can be offered.

Figure 28:
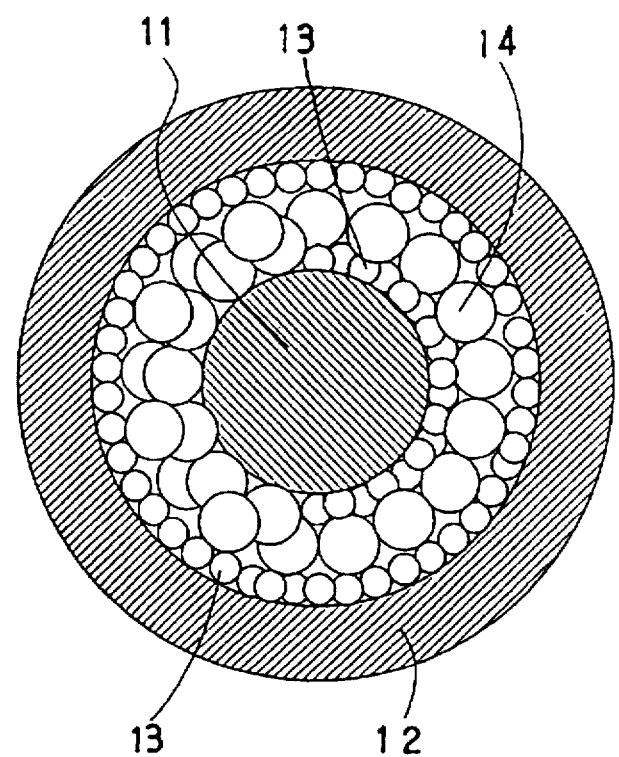
FIG. 28 is a cross-sectional view of a mold used for the manufacture of a porous plastic bearing according to another embodiment of the present invention.

Referring now to FIG. 28, it illustrates a cross-sectional view of a mold used for the manufacture of a porous-plastic bearing according to another embodiment of the present invention. The figure corresponds to an illustration taken along the line 21—21 of FIG. 20.

In FIG. 28, reference numeral 13 denotes a small-volume plastic particle, and 14 denotes a large-volume plastic particle. The plastic particles 13 and 14 are made of ABS resin. The small-volume plastic particles 13 in the inner peripheral portion of the bearing 2 are arranged so that they extend through all the bearing width and are located only in a half of the inner peripheral portion of the sliding bearing 2 which can be brought into contact with the shaft 1 when the shaft 1 is stopped.

In accordance with this embodiment, the cylindrical sliding bearing is formed by inserting the convex metal mold 11 under pressure into the concave metal mold 12 containing the plastic particles 13 and 14, as shown in FIG. 20.

In the molding process, by introducing a cluster of small-volume plastic particles 13 into both of the outer peripheral portion and the lower half of the inner peripheral portion of the cylindrical space formed between the concave metal mold 12 and the convex metal mold 11 and introducing a cluster of large-volume plastic particles 14 into the other part of the cylindrical space when introducing the plastic particles 13 and 14 made of ABS resin into the concave metal mold 12, heating, pressurizing and sintering the plastic particles 13 and 14 within the mold at a temperature equal to or more than the softening temperature of ABS resin and equal to or less than the thermal decomposition temperature of ABS resin, and cooling the sintered plastic particles in the atmosphere, the porous plastic bearing device wherein the low-porosity plastic particle layers 9 are located in both of the outer peripheral portion and the lower half of the inner peripheral portion of the bearing and the other part of the bearing is constructed by the high-porosity plastic particle layer 10 can be obtained easily. It became evident by experiment that in the case that the particles are made of ABS resin, the bearing can be manufactured at a temperature in the range of from about 150° C. to about 220° C.

As previously mentioned, in this embodiment, the small-volume plastic particles 13 extend through all the bearing width and are arranged in the lower half of the inner peripheral portion of the bearing 2 which can be brought into contact with the shaft 1 when the shaft 1 is stopped. Alternatively, the bearing can be provided with one or more cluster of small-volume plastic particles 13 in the vicinity of the part thereof which is nearest to the shaft 1 during rotation of the shaft 1. In this case, the same advantages can be provided to one degree or another.

Next, the description will be directed to another embodiment of the present invention. Only the deference between this embodiment and the aforementioned embodiment shown in FIG. 28 will be described hereinafter. In the aforementioned embodiment shown in FIG. 28, both of the small-volume plastic particles 13 and large-volume plastic particles 14 are made of ABS resin. Alternatively, they can be constructed of resin such as polyacetal (POM), polypropylene (PP), polyamide (PA), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE). When the plastic particles are made of such an alternative resin, the same advantages as those provided by the above-mentioned embodiment shown in FIG. 28 can be offered regardless of the thermal plasticity and thermohardening of the selected resin.

Figure 29:
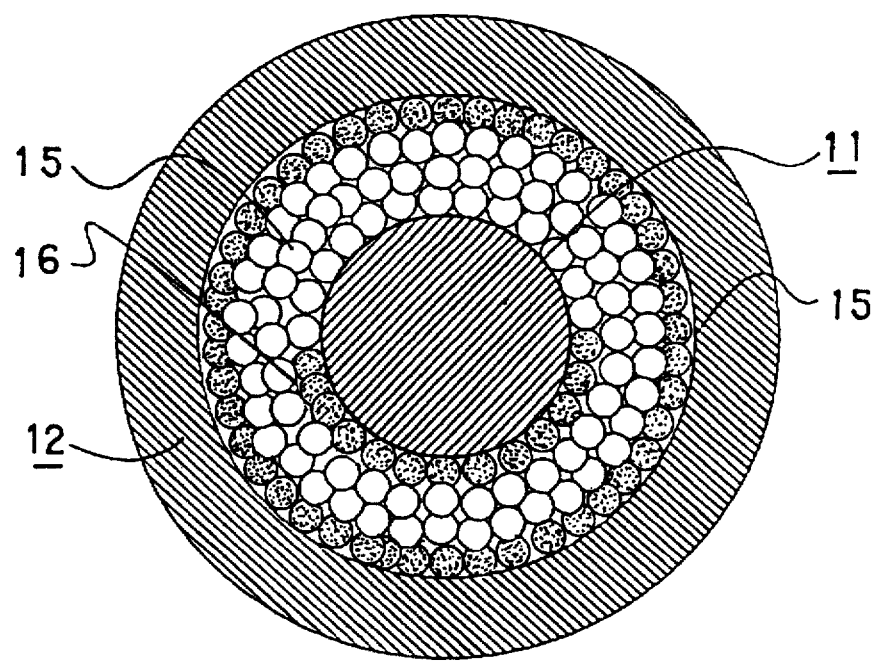
FIG. 29 is a cross-sectional view of a mold used for the manufacture of a porous plastic bearing according to another embodiment of the present invention.

Referring now to FIG. 29, it illustrates a cross-sectional view of a mold used for the manufacture of a porous plastic bearing according to another embodiment of the present invention. The figure corresponds to an illustration in cross section taken along the line C—C of FIG. 20.

In FIG. 29, reference numeral 15 denotes a plastic particle having a low softening temperature characteristics, and 16 denotes a plastic particle having a high softening temperature characteristics. In this embodiment, the plastic particle 15 having a low softening temperature characteristics is constructed of ABS resin, and the plastic particle 16 having a high softening temperature characteristics is constructed of polytetrafluoroethylene resin. The low-softening-temperature plastic particles 15 extend through all the bearing width and are arranged in a half of the inner peripheral portion of the bearing 2 which can be brought into contact with the shaft 1 when the shaft 1 is stopped.

In accordance with this embodiment, the cylindrical sliding bearing device is formed by inserting the convex metal mold 11 under pressure into the concave metal mold 12 containing the plastic particles 15 and 16.

In the molding process, by introducing a cluster of low-softening-temperature plastic particles 15 into both of the outer peripheral portion and the lower half of the inner peripheral portion of the cylindrical space produced between the concave metal mold 12 and the convex metal mold 11 and introducing a cluster of high-softening-temperature plastic particles 16 into the other part of the cylindrical space when introducing the plastic particles 15 and 16 into the concave metal mold 12, heating, pressurizing and sintering the plastic particles 15 and 16 within the mold at a temperature not less than the softening temperatures of the plastic particles 15 and 16 and not more than the thermal decomposition temperatures of the plastic particles 15 and 16, and cooling the sintered plastic particles in the atmosphere, the porous plastic bearing wherein the porosity in the outer peripheral portion of the bearing 2 and porosity in the half of the inner peripheral portion of the bearing 2 are small compared with the other part of the bearing as shown in FIG. 29 can be obtained.

As previously mentioned, in this embodiment, the low-softening-temperature plastic particles 15 extend through all the bearing width and are arranged in the half of the inner peripheral portion of the bearing 2 which can be brought into contact with the shaft 1 when the shaft 1 is stopped. Alternatively, the bearing can be provided with one or more cluster of low-softening-temperature plastic particles 15 in the vicinity of the part thereof which is nearest to the shaft 1 during rotation of the shaft 1. In this case, the same advantages can be provided to one degree or another.

Next, the description will be directed to another embodiment of the present invention. Only the deference between this embodiment and the aforementioned embodiment shown in FIG. 29 will be described hereinafter. The low-softening-temperature plastic particles 15 are made of ABS resin and the high-softening-temperature plastic particles 16 are made of polytetrafluoroethylene resin in the aforementioned embodiment shown in FIG. 29. Alternatively, the low-softening-temperature plastic particles 15 can be constructed of polyacetal resin. Furthermore, the low-softening-temperature plastic particles 15 and high-softening-temperature plastic particles 16 can be made of respective materials, which are different from each other, selected from the group consisting of ABS, polyacetal (POM), polypropylene (PP), polyamide (PA), polybutylene terephthalate (PBT), polyphenylene sulfide (PPS), polyether ether ketone (PEEK), polyether sulfone (PES), polyarylate (PAR), polyamide-imide (PAI), and polytetrafluoroethylene (PTFE) resins, and the selected one with a low-softening-temperature characteristics is used as the material of the plastic particles 15 and the other selected one with a high-softening-temperature characteristics is used as the material of the plastic particles 16. The variants can offer the same advantages as those provided by the above-mentioned embodiment shown in FIG. 29.

Figure 30:
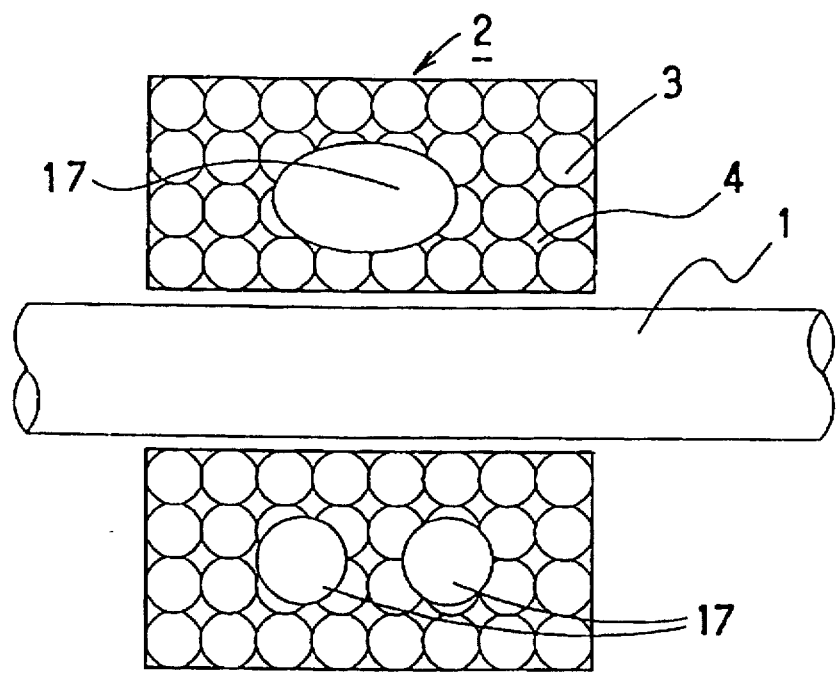
FIG. 30 is a cross-sectional view of a porous plastic bearing according to another embodiment of the present invention.

Referring now to FIG. 30, it illustrates a cross-sectional view of a porous-plastic bearing according to another embodiment of the present invention. In the figure, reference numeral 17 denotes a cavity wherein no plastic particle 3 exists. The plastic particles 3 contained within the bearing are made of ABS resin.

Next, the description will be directed to the operation of the sliding bearing according to this embodiment. When the shaft 1 is rotated, a negative pressure is produced in the gap 51 or in the vicinity of the gap 51, which is opposite to the load-side gap 52, between the shaft 1 and the inner surface of the bearing 2. As a result, the liquid lubricating oil 4 which has infiltrated within the bearing 2 exudes to the inner surface of the bearing 2 and then flows toward a load-side region in the vicinity of the gap 52 where the distance between the inner surface of the sliding bearing 2 and the shaft 1 is the shortest. A positive pressure is therefore produced in the load-side region. Thus, any contact between the shaft 1 and the bearing 2 can be prevented and hence the frictional resistance between the shaft 1 and the bearing 2 can be reduced.

The liquid lubricating oil 4 enters into the interior of the sliding bearing 2 from the inner surface of the sliding bearing 2 in the vicinity of the load-side gap 52 as shown in FIG. 2 and then circulates through the interior of the bearing 2 while the oil exudes to the gap 51 opposite to the load-side gap 52 between the shaft 1 and the bearing 2. The arrows in FIG. 2 show the flow of the liquid lubricating oil 4.

Since the cavities 17 wherein no plastic particle 3 exists are included within the bearing 2 and hence the liquid lubricating oil 4 enters into the cavities 17, the oil content which is the ratio of the volume of the liquid lubricating oil 4 to the volume of the bearing is increased. It is therefore possible to continue to supply the inner surface of the bearing 2 in the vicinity of the load-side gap with the liquid lubricating oil 4 for a protracted period.

Thus, during rotation of the shaft 1 the liquid lubricating oil 4 continues to be supplied into the load-side region in the vicinity of the load-side gap 52 between the inner surface of the bearing 2 and the shaft 1 for a protracted period while the oil is circulated within the interior of the bearing 2. Therefore, wearing and seizure of the bearing 2 can be prevented. Furthermore, since the sliding bearing device is made of porous plastic, it is lightweight.

In this embodiment, in order to hold the liquid lubricating oil 4 within the plastic bearing device, there must exist a plurality of plastic particles 3 in any longitudinal or cross section within the bearing device. The liquid lubricating agent 4 is oil. Alternatively, the liquid lubricating agent 4 can be grease.

Figure 31:
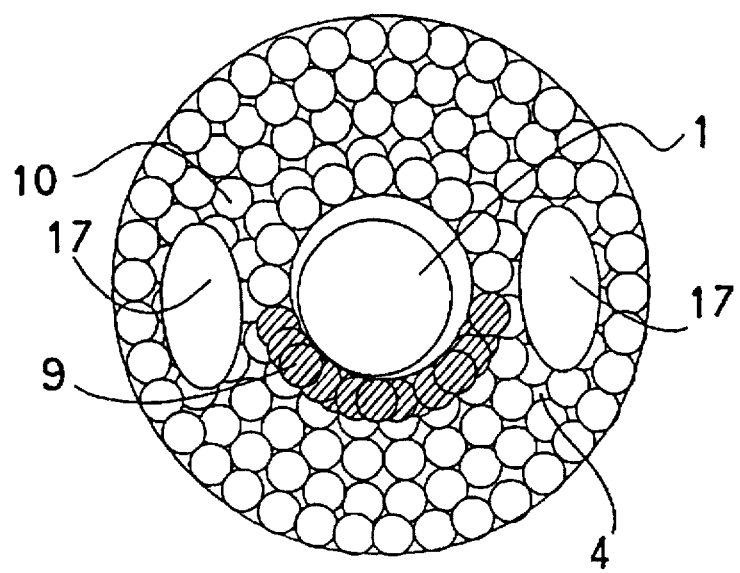
FIG. 31 is a cross-sectional view of a porous plastic bearing according to another embodiment of the present invention.

Referring now to FIG. 31, it illustrates a cross-sectional view of a porous-plastic bearing according to another embodiment of the present invention. Only the deference between this embodiment and the aforementioned embodiment shown in FIG. 30 will be described hereinafter.

In the aforementioned embodiment shown in FIG. 30, the local porosity in the layer containing the plastic particles 3 is uniform in the bearing 2. On the contrary, according to this embodiment, a plastic particle layer with a low porosity is provided in the lower half of the inner peripheral portion of the bearing 2 which can be brought into contact with the shaft 1 when the shaft 1 is stopped. The other structure according to this embodiment is the same as that according to the aforementioned embodiment shown in FIG. 30.

Next, the description will be directed to the operation of the bearing according to this embodiment. When the shaft 1 is rotated, a negative pressure is produced in the gap 51 or in the vicinity of the gap 51, which is opposite to the load-side gap. 52, between the shaft 1 and the inner surface of the bearing 2. As a result, the liquid lubricating oil 4 which has infiltrated within the bearing 2 exudes to the inner surface of the bearing 2 in the vicinity of the gap 51 and then flows toward a load-side region in the vicinity of the gap 52 where the distance between the inner surface of the sliding bearing 2 and the shaft 1 is the shortest. A positive pressure is therefore produced in the load-side region. Thus, any contact between the shaft 1 and the bearing 2 can be prevented and hence the frictional resistance between the shaft 1 and the bearing 2 can be reduced.

The liquid lubricating oil 4 tends to enter into the interior of the bearing 2 from the inner surface of the bearing 2 in the vicinity of the load-side gap; however, in this case, it cannot enter easily because it is blocked by the low-porosity plastic particle layer 9. Therefore, the oil film formed between the shaft 1 and the inner surface of the bearing 2 can be retained easily, whereby wearing and seizure of the bearing can be prevented more effectively.

Figure 32:
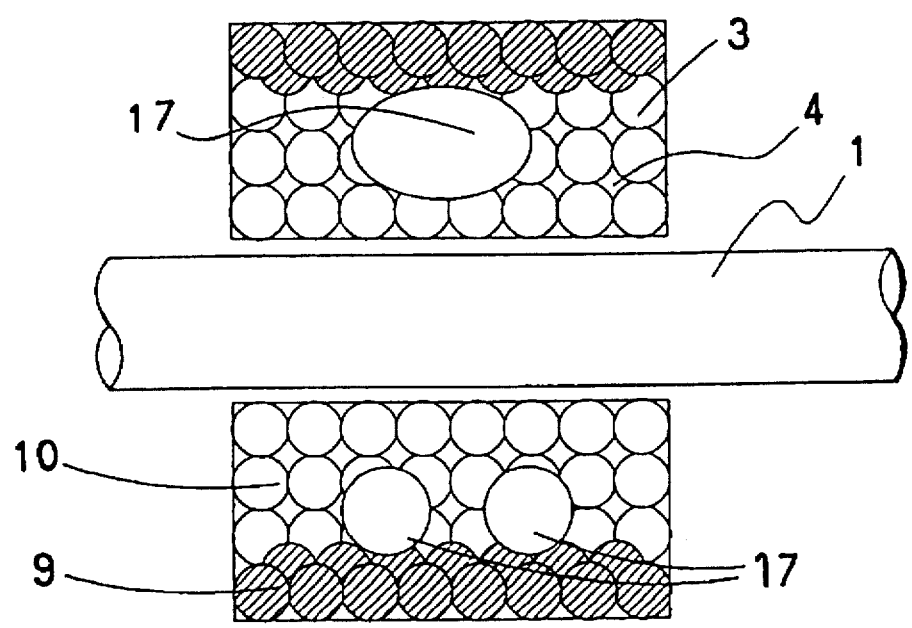
FIG. 32 is a cross-sectional view of a porous plastic bearing according to another embodiment of the present invention.

Referring now to FIG. 32, it illustrates a cross-sectional view of a porous-plastic bearing according to another embodiment of the present invention. Only the deference between this embodiment and the aforementioned embodiment shown in FIG. 30 will be described hereinafter.

In this embodiment, the outer peripheral portion of the bearing 2 is constructed by a low-porosity plastic particle layer 9 and the other portion of the bearing is constructed by a high-porosity plastic particle layer 10. The plastic particles in the layers 9 and 10 are made of ABS resin. In FIG. 32, reference numeral 17 denotes a cavity wherein no plastic particle layers 9 and 10 exist.

Next, the description will be directed to the operation of the bearing according to this embodiment. When the shaft 1 is rotated, a negative pressure is produced in the gap 51 or in the vicinity of the gap 51, which is opposite to the load-side gap 52, between the shaft 1 and the inner surface of the bearing 2. As a result, the liquid lubricating oil 4 which has infiltrated within the bearing 2 exudes to the inner surface of the bearing 2 in the vicinity of the gap 51 and then flows toward a load-side region in the vicinity of the gap 52 where the distance between the inner surface of the sliding bearing 2 and the shaft 1 is the shortest. A positive pressure is therefore produced in the load-side region. Thus, any contact between the shaft 1 and the bearing 2 can be prevented and hence the frictional resistance between the shaft 1 and the bearing 2 can be reduced.

Then, the liquid lubricating oil 4 enters into the interior of the bearing 2 from the inner surface of the bearing 2 in the vicinity of the load-side gap 52 as shown in FIG. 2 and then circulates through the interior of the bearing 2 while the oil exudes to between the shaft 1 and the sliding bearing 2 on the side opposite to the load-side gap 52.

If the shaft 1 is rotated at a higher speed, the liquid lubricating oil 4 circulated within the bearing 2 tends to go out from the outer surface of the bearing 2 due to the centrifugal force exerted on it; however, it cannot burst out of the bearing 2 because the porosity in the outer peripheral portion of the bearing 2 is too small for the oil to flow to outside the bearing 2 through the outer peripheral portion.

Thus, during rotation of the shaft 1 the liquid lubricating oil 4 continues to be supplied to the inner surface of the bearing 2 in the vicinity of the load-side gap without itself being consumed due to the dispersion of the oil to outside the bearing 2 while the oil is circulated within the interior of the bearing 2. Therefore, wearing and seizure of the bearing 2 can be prevented for a protracted period.

Figure 33:
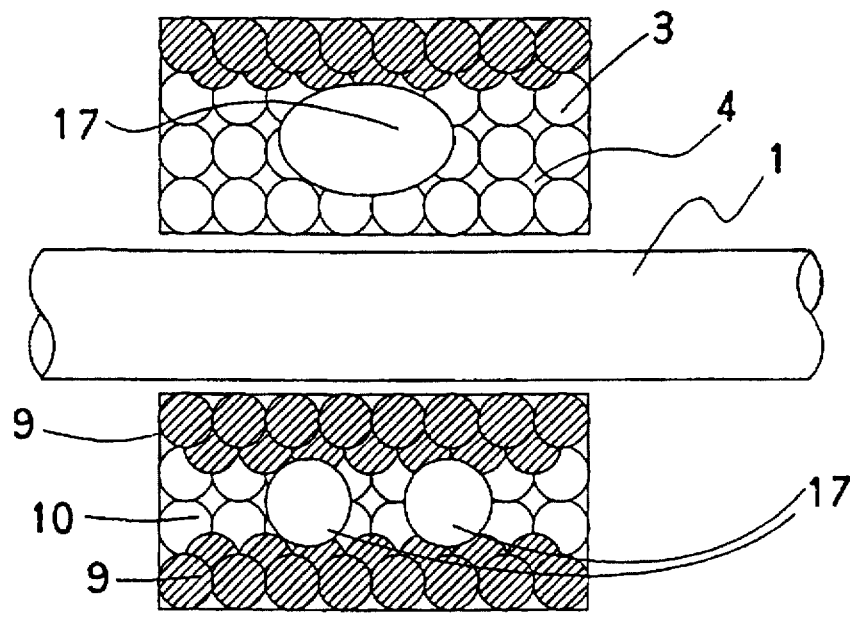
FIG. 33 is a cross-sectional view of a porous plastic bearing according to another embodiment of the present invention.

Referring now to FIG. 33, it illustrates a cross-sectional view of a porous-plastic bearing according to another embodiment of the present invention. Only the deference between this embodiment and the aforementioned embodiment shown in FIG. 30 will be described hereinafter.

In this embodiment, low-porosity plastic particle layers 9 are disposed in the outer peripheral portion of the bearing 2 and a half of the inner peripheral portion of the bearing 2 which can be brought into contact with the shaft 1 when the shaft 1 is stopped. Furthermore, the other portion of the bearing is constructed by a high-porosity plastic particle layer 10. The plastic particles in the layers 9 and 10 are made of ABS resin.

Next, the description will be directed to the operation of the bearing according to this embodiment. When the shaft 1 is rotated, a negative pressure is produced in the gap 51 or in the vicinity of the gap 51, which is opposite to the load-side gap 52, between the shaft 1 and the inner surface of the bearing 2. As a result, the liquid lubricating oil 4 which has infiltrated within the bearing 2 exudes to the inner surface of the bearing 2 in the vicinity of the gap 51 and then flows toward the load-side region in the vicinity of the gap 52 where the distance between the inner surface of the sliding bearing 2 and the shaft 1 is the shortest. A positive pressure is therefore produced in the load-side region. Thus, any contact between the shaft 1 and the bearing 2 can be prevented and hence the frictional resistance between the shaft 1 and the bearing 2 can be reduced.

The liquid lubricating oil 4 which has exuded tends to enter into the interior of the bearing 2 from the inner surface of the bearing 2 in the vicinity of the load-side region; however, in this case, it cannot enter easily because it is blocked by the low-porosity plastic particle layer 9. Therefore, the oil film formed between the shaft 1 and the inner surface of the bearing 2 can be retained easily. A very small amount of the liquid lubricating oil 4 also enters into the interior of the bearing 2 from the inner surface of the bearing 2 in the vicinity of the load-side region as shown in FIG. 2 and then circulates through the interior of the bearing 2 while the oil exudes to between the shaft 1 and the sliding bearing 2 on the side opposite to the load-side gap 52.

If the shaft 1 is rotated at a higher speed, the liquid lubricating oil 4 circulated within the bearing 2 tends to go out from the outer surface of the bearing 2 due to the centrifugal force exerted on it; however, it cannot burst out of the bearing 2 because the porosity in the outer peripheral portion of the bearing 2 is too small for the oil to flow to outside the bearing 2 through the outer peripheral portion.

Thus, during rotation of the shaft 1 the liquid lubricating oil 4 continues to be supplied to the inner surface of the bearing 2 in the vicinity of the load-side region without itself being consumed due to the dispersion of the oil to outside the bearing 2 while the oil is circulated within the interior of the bearing 2. Therefore, wearing and seizure of the bearing 2 can be prevented for a protracted period.

Next, the description will be directed to another embodiment of the present invention. Only the deference between this embodiment and the aforementioned embodiment shown in FIG. 30 will be described hereinafter. In the aforementioned embodiment shown in FIG. 30, the plastic particles 3 are made of ABS resin. Alternatively, they can be constructed of resin such as polyacetal (POM), polypropylene (PP), polyamide (PA), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE). When the plastic particles are made of such an alternative resin, the same advantages as those provided by the above-mentioned embodiment shown in FIG. 30 can be offered regardless of the thermal plasticity and thermohardening of the selected resin.

In the aforementioned embodiments shown in FIGS. 31 to 33, the low-porosity plastic particles in the layer 9 and high-porosity plastic particles in the layer 10 are made of ABS resin. Alternatively, they can be constructed of resin such as polyacetal (POM), polypropylene (PP), polyamide (PA), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE). When the plastic particles are made of such an alternative resin, the same advantages as those provided by the above-mentioned embodiments shown in FIGS. 31 to 33 can be offered regardless of the thermal plasticity and thermohardening of the selected resin.

Next, the description will be directed to another embodiment of the present invention. Only the difference between this embodiment and the aforementioned embodiment shown in FIG. 30 will be explained hereinafter. As previously mentioned, in the aforementioned embodiment shown in FIG. 30, the bearing is in the form of an all-round bearing. On the other hand, the sliding bearing of this embodiment can be in the form of a dynamic pressure journal bearing such as a partial bearing as shown in FIG. 5, a combination of a floating bush and an outer bearing as shown in FIG. 6, a multi-lobe bearing as shown in FIG. 7, a tilting pad bearing as shown in FIG. 8, or a bearing provided with spiral grooves as shown in FIG. 9. In all cases, this embodiment can offer the same advantages as those provided by the aforementioned embodiment shown in FIG. 30.

Similarly, in the aforementioned embodiments shown in FIGS. 31 to 33, the sliding bearing can be in the form of a dynamic pressure journal bearing such as a partial bearing as shown in FIG. 5, a combination of a floating bush and an outer bearing as shown in FIG. 6, a multi-lobe bearing as shown in FIG. 7, a tilting pad bearing as shown in FIG. 8, or a bearing provided with spiral grooves as shown in FIG. 9. In all cases, the same advantages as those provided by the aforementioned embodiments shown in FIGS. 31 to 33 can be offered.

In these variants, the plastic particles 3 are made of ABS resin. Alternatively, they can be constructed of resin such as polyacetal (POM), polypropylene (PP), polyamide (PA), polyimide (PI), polyethylene (PE), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE). When the plastic particles are made of such an alternative resin, the same advantages as those provided by the aforementioned embodiments shown in FIGS. 30 to 33 can be offered.

Figure 34:
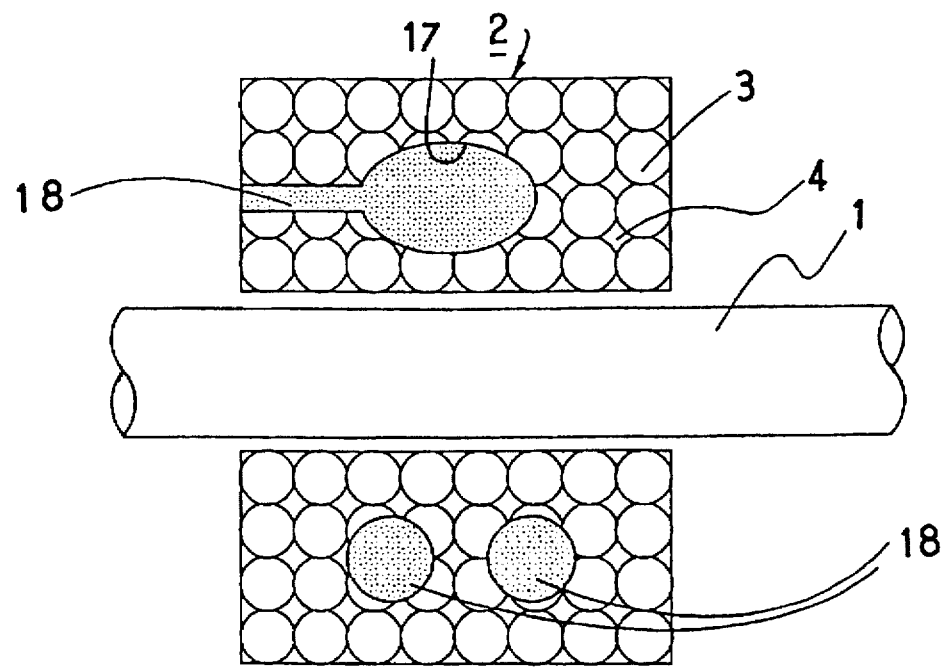
FIG. 34 is a cross-sectional view of a porous plastic bearing according to another embodiment of the present invention.

Referring now to FIG. 34, it illustrates a cross-sectional view of a porous-plastic bearing according to another embodiment of the present invention. In the figure, reference numeral 18 denotes an oil holding member capable of holding oil therein such as a felt. The oil holding members 18 are respectively inserted into the cavities 17 which are communicated with a lateral surface of the bearing. The plastic particles 3 contained within the bearing are made of ABS resin.

When the shaft 1 is rotated, a negative pressure is produced in the gap 51 or in the vicinity of the gap 51, which is opposite to the load-side gap 52, between the shaft 1 and the inner surface of the bearing 2. As a result, the liquid lubricating oil 4 which has infiltrated within the bearing 2 exudes to the inner surface of the bearing 2 in the vicinity of the gap 51 and then flows toward the load-side region in the vicinity of the gap 52 where the distance between the inner surface of the sliding bearing 2 and the shaft 1 is the shortest. A positive pressure is therefore produced in the load-side region. Thus, any contact between the shaft 1 and the bearing 2 can be prevented and hence the frictional resistance between the shaft 1 and the bearing 2 can be reduced.

The liquid lubricating oil 4 enters into the interior of the sliding bearing 2 from the inner surface of the sliding bearing 2 in the vicinity of the load-side gap as shown in FIG. 2 and then circulates through the interior of the bearing 2 while the oil exudes to between the shaft 1 and the bearing 2 on the side opposite to the load-side gap 52. Since the oil holding members 18, which are capable of holding oil therein, such as felts are inserted into the cavities 17 wherein no plastic particles 3 exists and hence the liquid lubricating oil 4 is held in the oil holding member 18, the oil content which is the ratio of the volume of the liquid lubricating oil 4 to the volume of the bearing is increased and the oil 4 can be easily held within the bearing 2. It is therefore possible to continue to supply the inner surface of the bearing 2 in the vicinity of the load-side gap with the liquid lubricating oil 4 for a protracted period.

Thus, during rotation of the shaft 1 the liquid lubricating oil 4 continues to be supplied to the inner surface of the bearing 2 in the vicinity of the load-side gap for a protracted period while the oil is circulated within the interior of the bearing 2. Therefore, wearing and seizure of the bearing 2 can be prevented. Furthermore, since the sliding bearing device is made of porous plastic, it is lightweight.

In order to hold the liquid lubricating oil 4 within the plastic bearing, there must exist a plurality of plastic particles in any longitudinal or cross section within the bearing. The liquid lubricating agent 4 is oil. Alternatively, the liquid lubricating agent 4 can be grease.

Figure 35:
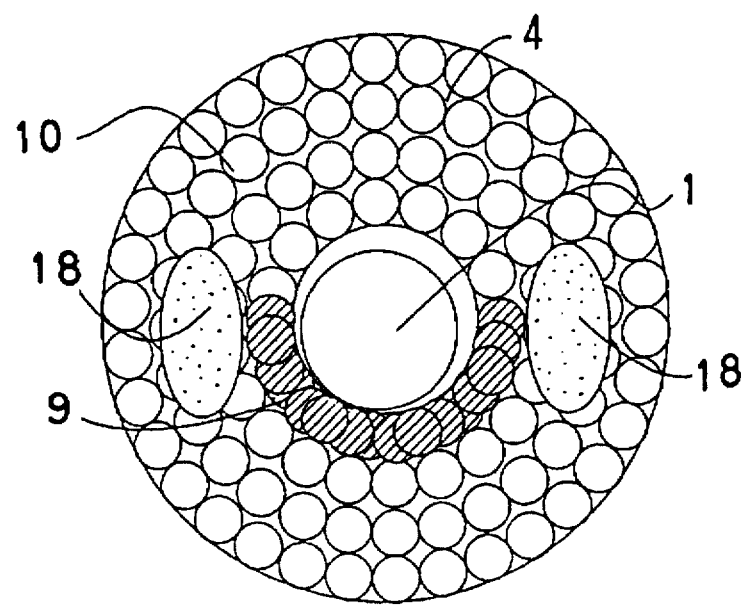
FIG. 35 is a cross-sectional view of a porous plastic bearing according to another embodiment of the present invention.

Referring now to FIG. 35, it illustrates a cross-sectional view of a porous-plastic bearing according to another embodiment of the present invention. Only the deference between this embodiment and the aforementioned embodiment shown in FIG. 34 will be described hereinafter.

In this embodiment, a low-porosity plastic particle layers 9 is disposed in the lower half of the inner peripheral portion of the bearing 2 which can be brought into contact with the shaft 1 when the shaft 1 is stopped. Furthermore, the other portion of the bearing is constructed by a high-porosity plastic particle layer 10. The plastic particles in the layers 9 and 10 are made of ABS resin.

When the shaft 1 is rotated, a negative pressure is produced in the gap 51 or in the vicinity of the gap 51, which is opposite to the load-side gap 52, between the shaft 1 and the inner surface of the bearing 2. As a result, the liquid lubricating oil 4 which has infiltrated into the oil holding member 18 within the bearing 2 exudes to the inner surface of the bearing 2 in the vicinity of the gap 51 and then flows toward the load-side region in the vicinity of the gap 52 where the distance between the inner surface of the sliding bearing 2 and the shaft 1 is the shortest. A positive pressure is therefore produced in the load-side region. Thus, any contact between the shaft 1 and the bearing 2 can be prevented and hence the frictional resistance between the shaft 1 and the bearing 2 can be reduced.

The liquid lubricating oil 4 which has exuded tends to enter into the interior of the bearing 2 from the inner surface of the bearing 2 in the vicinity of the load-side gap; however, in this case, it cannot enter easily because it is blocked by the low-porosity plastic particle layer 9. Therefore, the oil film formed between the shaft 1 and the inner surface of the bearing 2 can be retained easily, whereby wearing and seizure of the bearing can be prevented more effectively.

Figure 36:
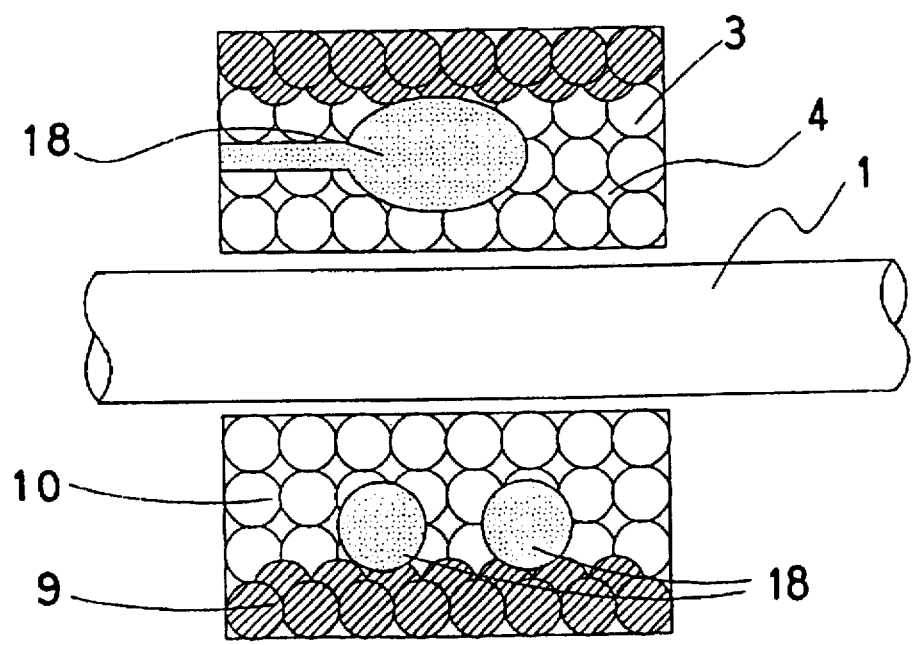
FIG. 36 is a cross-sectional view of a porous plastic bearing according to another embodiment of the present invention.

Referring now to FIG. 36, it illustrates a cross-sectional view of a porous-plastic bearing according to another embodiment of the present invention. Only the deference between this embodiment and the aforementioned embodiment shown in FIG. 34 will be described hereinafter.

In this embodiment, the outer peripheral portion of the bearing 2 is constructed by a low-porosity plastic particle layer 9 and the other portion of the bearing is constructed by a high-porosity plastic particle layer 10. The plastic particles in the layers 9 and 10 are made of ABS resin.

Next, the description will be directed to the operation of the bearing according to this embodiment. When the shaft 1 is rotated, a negative pressure is produced in the gap 51 or in the vicinity of the gap 51, which is opposite to the load-side gap 52, between the shaft 1 and the inner surface of the bearing 2. As a result, the liquid lubricating oil 4 which has infiltrated into the oil holding member 18 within the bearing 2 exudes to the inner surface of the bearing 2 in the vicinity of the gap 51 and then flows toward the load-side region in the vicinity of the gap 52 where the distance between the inner surface of the sliding bearing 2 and the shaft 1 is the shortest. A positive pressure is therefore produced in the load-side region. Thus, any contact between the shaft 1 and the bearing 2 can be prevented and hence the frictional resistance between the shaft 1 and the bearing 2 can be reduced.

Then, the liquid lubricating oil 4 enters into the interior of the bearing 2 from the inner surface of the bearing 2 in the vicinity of the load-side gap as shown in FIG. 2 and then circulates through the interior of the bearing 2 while the oil exudes to between the shaft 1 and the sliding bearing 2 on the side opposite to the load-side gap 52.

If the shaft 1 is rotated at a higher speed, the liquid lubricating oil 4 circulated within the bearing 2 tends to go out from the outer surface of the bearing 2 due to the centrifugal force exerted on it; however, it cannot burst out of the bearing 2 because the porosity in the outer peripheral portion of the bearing 2 is too small for the oil to flow to outside the bearing 2 through the outer peripheral portion.

Thus, during rotation of the shaft 1 the liquid lubricating oil 4 continues to be supplied to the inner surface of the bearing 2 in the vicinity of the load-side gap without itself being consumed due to the dispersion of the oil to outside the bearing 2 while the oil is circulated within the interior of the bearing 2. Therefore, wearing and seizure of the bearing 2 can be prevented for a protracted period.

Figure 37:
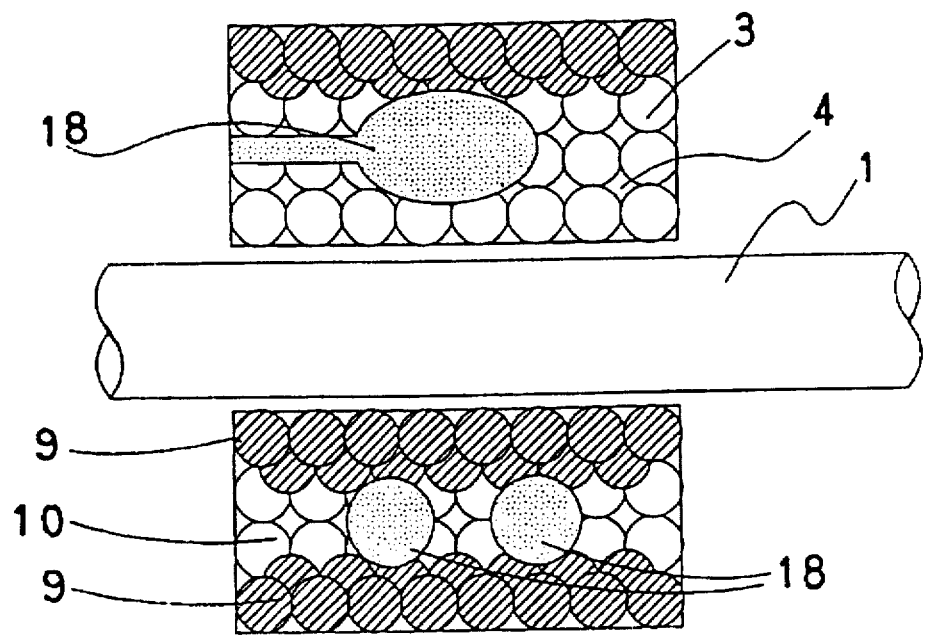
FIG. 37 is a cross-sectional view of a porous plastic bearing according to another embodiment of the present invention.

Referring now to FIG. 37, it illustrates a cross-sectional view of a porous-plastic bearing according to another embodiment of the present invention. Only the deference between this embodiment and the aforementioned embodiment shown in FIG. 34 will be described hereinafter.

In this embodiment, low-porosity plastic particle layers 9 are disposed in both of the outer peripheral portion of the bearing 2 and the inner peripheral portion of the bearing 2 which can be brought into contact with the shaft 1 when the shaft 1 is stopped. Furthermore, the other structure of the bearing according to this embodiment is the same as that according to the aforementioned embodiment shown in FIG. 34.

Next, the description will be directed to the operation of the bearing according to this embodiment. When the shaft 1 is rotated, a negative pressure is produced in the gap 51 or in the vicinity of the gap 51, which is opposite to the load-side gap 52, between the shaft 1 and the inner surface of the bearing 2. As a result, the liquid lubricating oil 4 which has infiltrated within the bearing 2 exudes to the inner surface of the bearing 2 in the vicinity of the gap 51 and then flows toward the load-side region in the vicinity of the gap 52 where the distance between the inner surface of the sliding bearing 2 and the shaft 1 is the shortest. A positive pressure is therefore produced in the load-side region. Thus, any contact between the shaft 1 and the bearing 2 can be prevented and hence the frictional resistance between the shaft 1 and the bearing 2 can be reduced.

The liquid lubricating oil 4 which has exuded tends to enter into the interior of the bearing 2 from the inner surface of the bearing 2 in the vicinity of the load-side gap; however, in this case, it cannot enter into the interior of the bearing 2 easily because it is blocked by the low-porosity plastic particle layer 9. Therefore, the oil film formed between the shaft 1 and the inner surface of the bearing 2 can be retained easily. A very small amount of the liquid lubricating oil 4 also enters into the interior of the bearing 2 from the inner surface of the bearing 2 in the vicinity of the load-side gap as shown in FIG. 2 and then circulates through the interior of the bearing 2 while the oil exudes to between the shaft 1 and the sliding bearing 2 on the side opposite to the load-side gap 52.

If the shaft 1 is rotated at a higher speed, the liquid lubricating oil 4 circulated within the bearing tends to go out from the outer surface of the bearing 2 due to the centrifugal force exerted on it; however, it cannot burst out of the bearing 2 because the porosity in the outer peripheral portion of the bearing 2 is too small for the oil to flow to outside the bearing 2 through the outer peripheral portion.

Thus, during rotation of the shaft 1 the liquid lubricating oil 4 continues to be supplied to the inner surface of the bearing 2 in the vicinity of the load-side gap without itself being consumed due to the dispersion of the oil to outside the bearing 2 while the oil is circulated within the interior of the bearing 2. Furthermore, the oil film can be easily formed between the shaft 1 and the inner surface of the bearing 2. Therefore, wearing and seizure of the bearing 2 can be prevented for a protracted period.

Next, the description will be directed to another embodiment of the present invention. Only the deference between this embodiment and the aforementioned embodiment shown in FIG. 34 will be described hereinafter. In the aforementioned embodiment shown in FIG. 34, the plastic particles 3 are made of ABS resin. Alternatively, they can be constructed of resin such as polyacetal (POM), polypropylene (PP), polyamide (PA), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE). When the plastic particles are made of such an alternative resin, the same advantages as those provided by the above-mentioned embodiment shown in FIG. 34 can be offered regardless of the thermal plasticity and thermohardening of the selected resin.

In the aforementioned embodiments shown in FIGS. 35 to 37, the low-porosity plastic particles in the layer 9 and high-porosity plastic particles in the layer 10 are made of ABS resin. Alternatively, they can also be constructed of resin such as polyacetal (POM), polypropylene (PP), polyamide (PA), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE). When the plastic particles are made of such an alternative resin, the same advantages as those provided by the above-mentioned embodiments shown in FIGS. 35 to 37 can be offered regardless of the thermal plasticity and thermohardening of the selected resin.

Next, the description will be directed to another embodiment of the present invention. Only the difference between this embodiment and the aforementioned embodiment shown in FIG. 34 will be explained hereinafter. As previously mentioned, in the aforementioned embodiment shown in FIG. 34, the bearing is in the form of an all-round bearing. On the other hand, the sliding bearing of this embodiment can be in the form of a dynamic pressure journal bearing such as a partial bearing as shown in FIG. 5, a combination of a floating bush and an outer bearing as shown in FIG. 6, a multi-lobe bearing as shown in FIG. 7, a tilting pad bearing as shown in FIG. 8, or a bearing provided with spiral grooves as shown in FIG. 9. In all cases, this embodiment can offer the same advantages as those provided by the aforementioned embodiment shown in FIG. 34.

Similarly, in the aforementioned embodiments shown in FIGS. 35 to 37, the sliding bearing of this embodiment can be in the form of a dynamic pressure journal bearing such as a partial bearing as shown in FIG. 5, a combination of a floating bush and an outer bearing as shown in FIG. 6, a multi-lobe bearing as shown in FIG. 7, a tilting pad bearing as shown in FIG. 8, or a bearing provided with spiral grooves as shown in FIG. 9. In all cases, the same advantages as those provided by the aforementioned embodiments shown in FIGS. 35 to 37 can be offered.

In these variants, the plastic particles 3 are made of ABS resin. Alternatively, they can be constructed of resin such as polyacetal (POM), polypropylene (PP), polyamide (PA), polyimide (PI), polyethylene (PE), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE). When the plastic particles are made of such an alternative resin, the same advantages as those provided by the aforementioned embodiments shown in FIGS. 34 to 37 can be offered.

Figure 38:
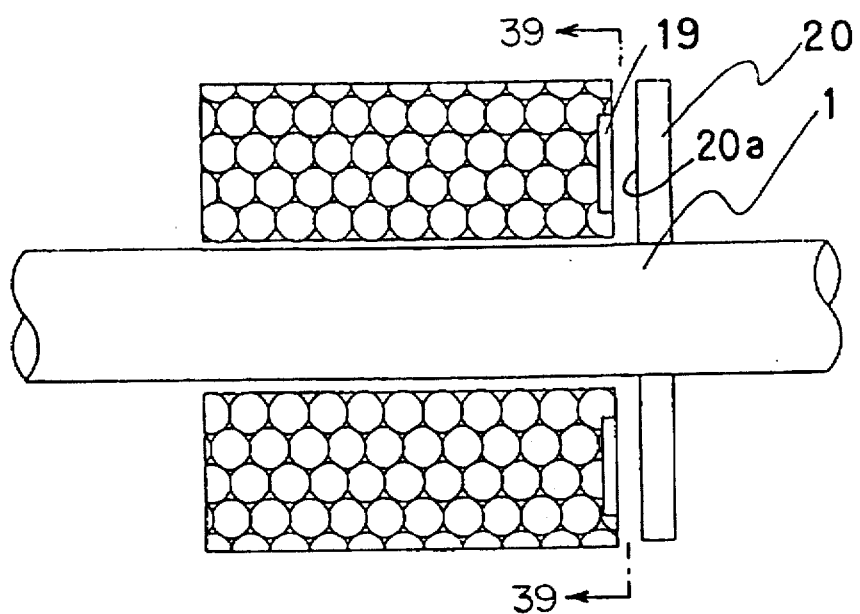
FIG. 38 is a cross-sectional view of a porous plastic bearing according to another embodiment of the present invention.
Figure 39:
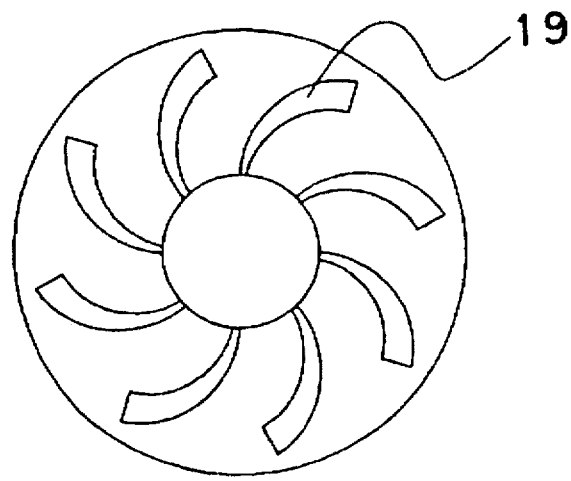
FIG. 39 is an end view of the bearing and is taken along the line 39—39 of FIG. 38.

Referring now to FIG. 38, it illustrates a cross-sectional view showing a porous plastic bearing according to another embodiment of the present invention. Furthermore, FIG. 39 is an end view of the bearing and is taken along the line 39—39 of FIG. 38. In the figures, reference numeral 19 denotes a dynamic pressure groove bearing portion, and 20 denotes a plate mounted on the shaft 1. The plate 20 is provided with a surface 20a which faces the end surface of the bearing including the dynamic pressure groove bearing portion 19. The shape of the plate 20 is not critical if it has such the surface 20a which faces the end surface of the bearing including the dynamic pressure groove bearing portion 19.

Next, the description will be directed to the operation of the bearing according to this embodiment. When the shaft 1 is rotated, a negative pressure is produced in the gap 51 or in the vicinity of the gap 51, which is opposite to the load-side gap 52, between the shaft 1 and the inner surface of the bearing 2. As a result, the liquid lubricating oil 4 which has infiltrated within the bearing 2 exudes to the inner surface of the bearing 2 in the vicinity of the gap 51 and then flows toward the load-side region in the vicinity of the gap 52 where the distance between the inner surface of the sliding bearing 2 and the shaft 1 is the shortest. A positive pressure is therefore produced in the load-side region. Thus, any contact between the shaft 1 and the bearing 2 can be prevented and hence the frictional resistance between the shaft 1 and the bearing 2 can be reduced.

The liquid lubricating oil 4 also enters into the interior of the bearing 2 from the inner surface of the bearing 2 in the vicinity of the load-side gap as shown in FIG. 2 and then circulates through the interior of the bearing 2 while it exudes to between the shaft 1 and the sliding bearing 2 on the side opposite to the load-side gap 52.

The liquid lubricating oil 4 which has exuded to the end surface of the bearing on the right-hand side of the bearing as shown in FIG. 38 generates a dynamic pressure in the groove bearing member 19. As a result, the contact between the end surface of the bearing 2 and the plate 20 is avoided. The frictional resistance of the bearing is reduced and therefore the bearing can carry a thrust load.

Thus, during rotation of the shaft 1 the liquid lubricating oil 4 continues to be supplied into the inner surface of the bearing 2 in the vicinity of the load-side gap for a protracted period while the oil is circulated within the interior of the bearing 2. Therefore, wearing and seizure of the bearing 2 can be prevented. Furthermore, since the sliding bearing is made of porous plastic, it is lightweight.

In order to hold the liquid lubricating oil 4 within the plastic bearing, there must exist a plurality of plastic particles in any longitudinal or cross section within the bearing 2. The liquid lubricating agent 4 is oil. Alternatively, the liquid lubricating agent 4 can be grease.

Figure 40:
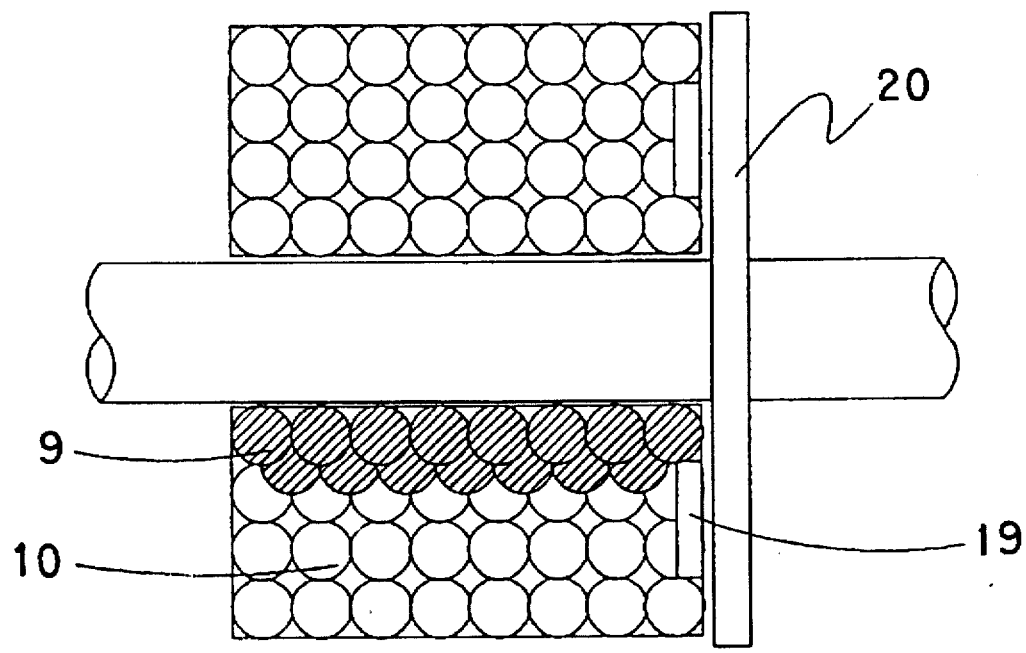
FIG. 40 is a cross-sectional view of a porous plastic bearing according to another embodiment of the present invention.

Referring now to FIG. 40, it illustrates a cross-sectional view of a porous-plastic bearing according to another embodiment of the present invention. Only the deference between this embodiment and the aforementioned embodiment shown in FIG. 38 will be described hereinafter.

In this embodiment, low-porosity plastic particle layers 9 are disposed in the lower half of the inner peripheral portion of the bearing 2 which can be brought into contact with the shaft 1 when the shaft 1 is stopped. Furthermore, the other portion of the bearing is constructed by a high-porosity plastic particle layer 10. The other structure of the bearing according to this embodiment is the same as that of the bearing according to the aforementioned embodiment shown in FIG. 38. The plastic particles in the layers 9 and 10 are made of ABS resin.

Next, the description will be directed to the operation of the bearing according to this embodiment. When the shaft 1 is rotated, a negative pressure is produced in the gap 51 or in the vicinity of the gap 51, which is opposite to the load-side gap 52, between the shaft 1 and the inner surface of the bearing 2. As a result, the liquid lubricating oil 4 which has infiltrated within the bearing 2 exudes to the inner surface of the bearing 2 in the vicinity of the gap 51 and then flows toward the load-side region in the vicinity of the gap 52 where the distance between the inner surface of the sliding bearing 2 and the shaft 1 is the shortest. A positive pressure is therefore produced in the load-side region. Thus, any contact between the shaft 1 and the bearing 2 can be prevented and hence the frictional resistance between the shaft 1 and the bearing 2 can be reduced.

The liquid lubricating oil 4 which has exuded tends to enter into the interior of the bearing 2 from the inner surface of the bearing 2 in the vicinity of the load-side gap; however, in this case, it cannot enter into the interior of the bearing 2 easily because it is blocked by the low-porosity plastic particle layer 9. Therefore, the oil film formed between the shaft 1 and the inner surface of the bearing 2 can be retained easily, whereby wearing and seizure of the bearing can be prevented more effectively.

Figure 41:
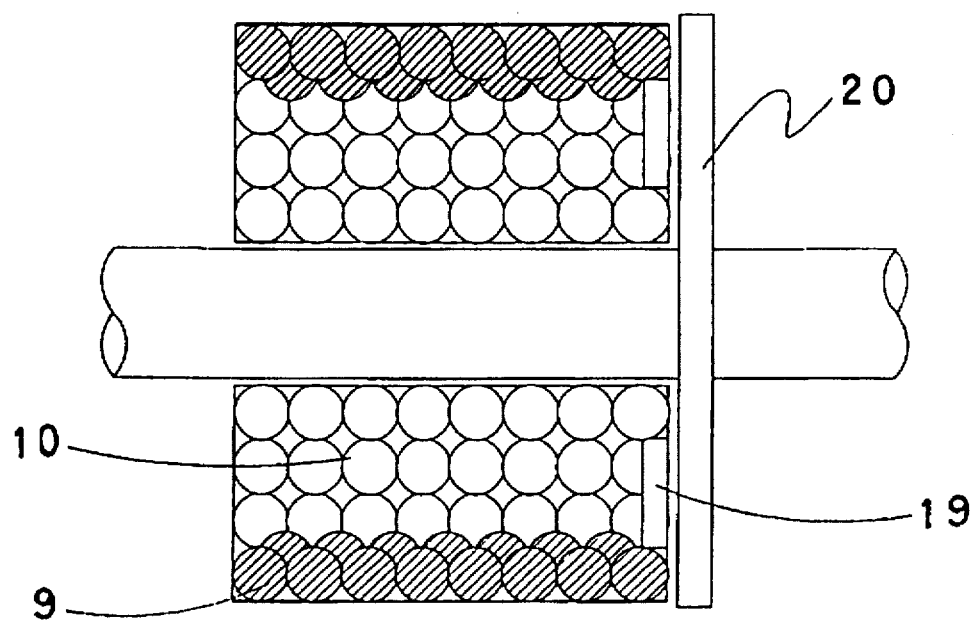
FIG. 41 is a cross-sectional view of a porous plastic bearing according to another embodiment of the present invention.

Referring now to FIG. 41, it illustrates a cross-sectional view of a porous-plastic bearing according to another embodiment of the present invention. Only the deference between this embodiment and the aforementioned embodiment shown in FIG. 38 will be described hereinafter.

In this embodiment, the outer peripheral portion of the bearing 2 is constructed by a low-porosity plastic particle layer 9 and the other portion of the bearing is constructed by a high-porosity plastic particle layer 10. The other structure of the bearing according to this embodiment is the same as that of the bearing according to the aforementioned embodiment shown in FIG. 38.

Next, the description will be directed to the operation of the bearing according to this embodiment. When the shaft 1 is rotated, a negative pressure is produced in the gap 51 or in the vicinity of the gap 51, which is opposite to the load-side gap 52, between the shaft 1 and the inner surface of the bearing 2. As a result, the liquid lubricating oil 4 which has infiltrated within the bearing 2 exudes to the inner surface of the bearing 2 in the vicinity of the gap 51 and then flows toward the load-side region in the vicinity of the gap 52 where the distance between the inner surface of the sliding bearing 2 and the shaft 1 is the shortest. A positive pressure is therefore produced in the load-side region. Thus, any contact between the shaft 1 and the bearing 2 can be prevented and hence the frictional resistance between the shaft 1 and the bearing 2 can be reduced.

Then, the liquid lubricating oil 4 enters into the interior of the bearing 2 from the inner surface of the bearing 2 in the vicinity of the load-side gap as shown in FIG. 2 and then circulates through the interior of the bearing 2 while the oil exudes to between the shaft 1 and the sliding bearing 2 on the side opposite to the load-side gap 52.

If the shaft 1 is rotated at a higher speed, the liquid lubricating oil 4 circulated within the bearing 2 tends to go out from the outer surface of the bearing 2 due to the centrifugal force exerted on it; however, it cannot burst out of the bearing 2 because the porosity in the outer peripheral portion of the bearing 2 is too small for the oil to flow to outside the bearing 2 through the outer peripheral portion.

Thus, during rotation of the shaft 1 the liquid lubricating oil 4 continues to be supplied to the inner surface of the bearing 2 in the vicinity of the load-side gap without itself being consumed due to the dispersion of the oil to outside the bearing 2 while the oil is circulated within the interior of the bearing 2. Therefore, wearing and seizure of the bearing 2 can be prevented for a protracted period.

Figure 42:
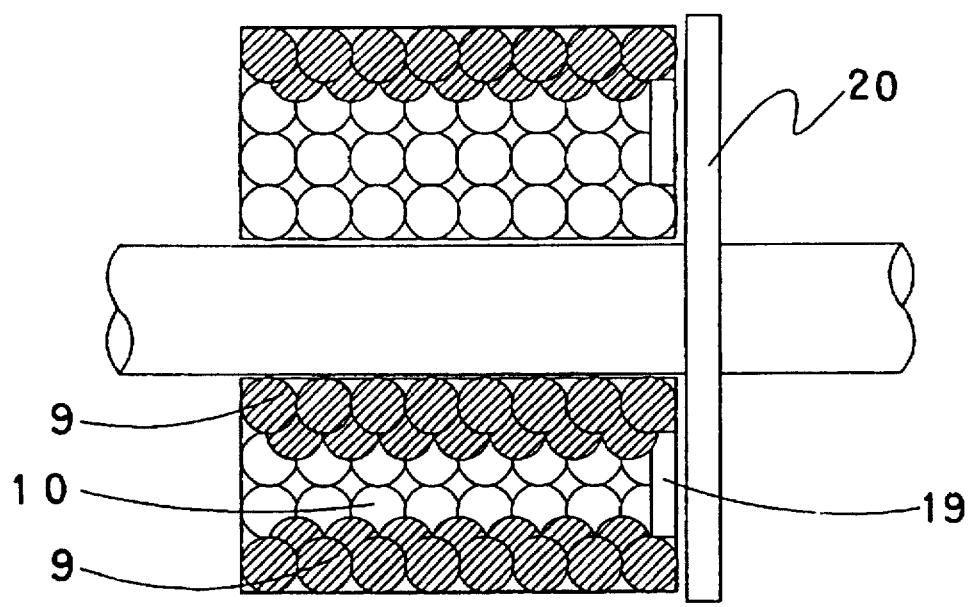
FIG. 42 is a cross-sectional view of a porous plastic bearing according to another embodiment of the present invention.

Referring now to FIG. 42, it illustrates a cross-sectional view of a porous-plastic bearing according to another embodiment of the present invention. Only the deference between this embodiment and the aforementioned embodiment shown in FIG. 38 will be described hereinafter.

In this embodiment, low-porosity plastic particle layers 9 are disposed in the outer peripheral portion of the bearing 2 and inner peripheral portion of the bearing 2 which can be brought into contact with the shaft 1 when the shaft 1 is stopped. Furthermore, the other part of the bearing is constructed by a high-porosity plastic particle layer 10.

Next, the description will be directed to the operation of the bearing according to this embodiment. When the shaft 1 is rotated, a negative pressure is produced in the gap 51 or in the vicinity of the gap 51, which is opposite to the load-side gap 52, between the shaft 1 and the inner surface of the bearing 2. As a result, the liquid lubricating oil 4 which has infiltrated within the bearing 2 exudes to the inner surface of the bearing 2 in the vicinity of the gap 51 and then flows toward the load-side region in the vicinity of the gap 52 where the distance between the inner surface of the sliding bearing 2 and the shaft 1 is the shortest. A positive pressure is therefore produced in the load-side region. Thus, any contact between the shaft 1 and the bearing 2 can be prevented and hence the frictional resistance between the shaft 1 and the bearing 2 can be reduced.

The liquid lubricating oil 4 which has exuded tends to enter into the interior of the bearing 2 from the inner surface of the bearing 2 in the vicinity of the load-side gap; however, in this case, it cannot enter into the interior of the bearing 2 easily because it is blocked by the low-porosity plastic particle layer 9. Therefore, the oil film formed between the shaft 1 and the inner surface of the bearing 2 can be retained easily. A very small amount of the liquid lubricating oil 4 also enters into the interior of the bearing 2 from the inner surface of the bearing 2 in the vicinity of the load-side region as shown in FIG. 2 and then circulates through the interior of the bearing 2 while the oil exudes to between the shaft 1 and the sliding bearing 2 on the side opposite to the load-side gap 52.

If the shaft 1 is rotated at a higher speed, the liquid lubricating oil 4 circulated within the bearing 2 tends to go out from the outer surface of the bearing 2 due to the centrifugal force exerted on it; however, it cannot burst out of the bearing 2 because the porosity in the outer peripheral portion of the bearing 2 is too small for the oil to flow to outside the bearing 2 through the outer peripheral portion.

Thus, during rotation of the shaft 1 the liquid lubricating oil 4 continues to be supplied to the inner surface of the bearing 2 in the vicinity of the load-side gap without itself being consumed due to the dispersion of the oil to outside the bearing 2 while the oil is circulated within the interior of the bearing 2. Furthermore, the oil film can be easily formed between the shaft 1 and the inner surface of the bearing 2. Therefore, wearing and seizure of the bearing 2 can be prevented for a protracted period.

Figure 43:
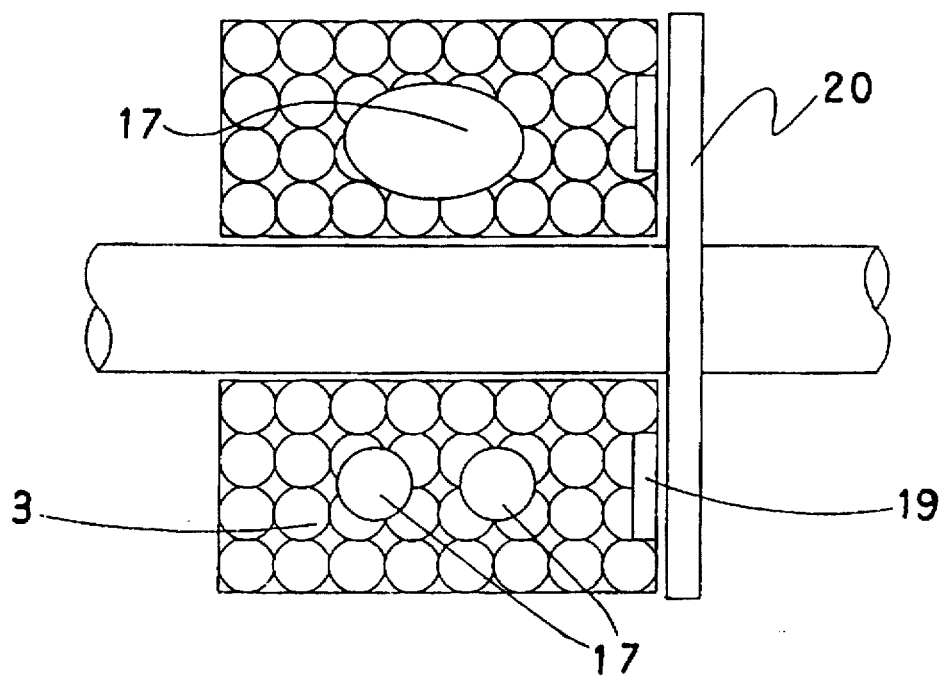
FIG. 43 is a cross-sectional view of a porous plastic bearing according to another embodiment of the present invention.

Referring now to FIG. 43, it illustrates a cross-sectional view of a porous-plastic bearing according to another embodiment of the present invention. Only the deference between this embodiment and the aforementioned embodiment shown in FIG. 38 will be described hereinafter.

In this embodiment, there is provided a cavity 17, wherein no plastic particle 3 exists, among the plastic particles 3 in the bearing 2.

Next, the description will be directed to the operation of the sliding bearing according to this embodiment. When the shaft 1 is rotated, a negative pressure is produced in the gap 51 or in the vicinity of the gap 51, which is opposite to the load-side gap 52, between the shaft 1 and the inner surface of the bearing 2. As a result, the liquid lubricating oil 4 which has infiltrated within the bearing 2 exudes to the inner surface of the bearing 2 in the vicinity of the gap 51 and then flows toward the load-side region in the vicinity of the gap 52 where the distance between the inner surface of the sliding bearing 2 and the shaft 1 is the shortest. A positive pressure is therefore produced in the load-side region. Thus, any contact between the shaft 1 and the bearing 2 can be prevented and hence the frictional resistance between the shaft 1 and the bearing 2 can be reduced.

The liquid lubricating oil 4 enters into the interior of the sliding bearing 2 from the inner surface of the sliding bearing 2 in the vicinity of the load-side gap as shown in FIG. 2 and then circulates through the interior of the bearing 2 while the oil exudes to between the shaft and the bearing 2 on the side opposite to the load-side gap 52.

Since the cavities 17 wherein no plastic particle 3 exists are included within the bearing 2 and hence the liquid lubricating oil 4 enters into the cavities 17, the oil content which is the ratio of the volume of the liquid lubricating oil 4 to the volume of the bearing is increased. It is therefore possible to continue to supply the inner surface of the bearing 2 in the vicinity of the load-side gap with the liquid lubricating oil 4 for a protracted period.

Thus, during rotation of the shaft 1 the liquid lubricating oil 4 continues to be supplied to the inner surface of the bearing 2 in the vicinity of the load-side gap for a protracted period while the oil is circulated within the interior of the bearing 2. Therefore, wearing and seizure of the bearing device can be prevented. Furthermore, since the sliding bearing device is made of porous plastic, it is lightweight.

Figure 44:
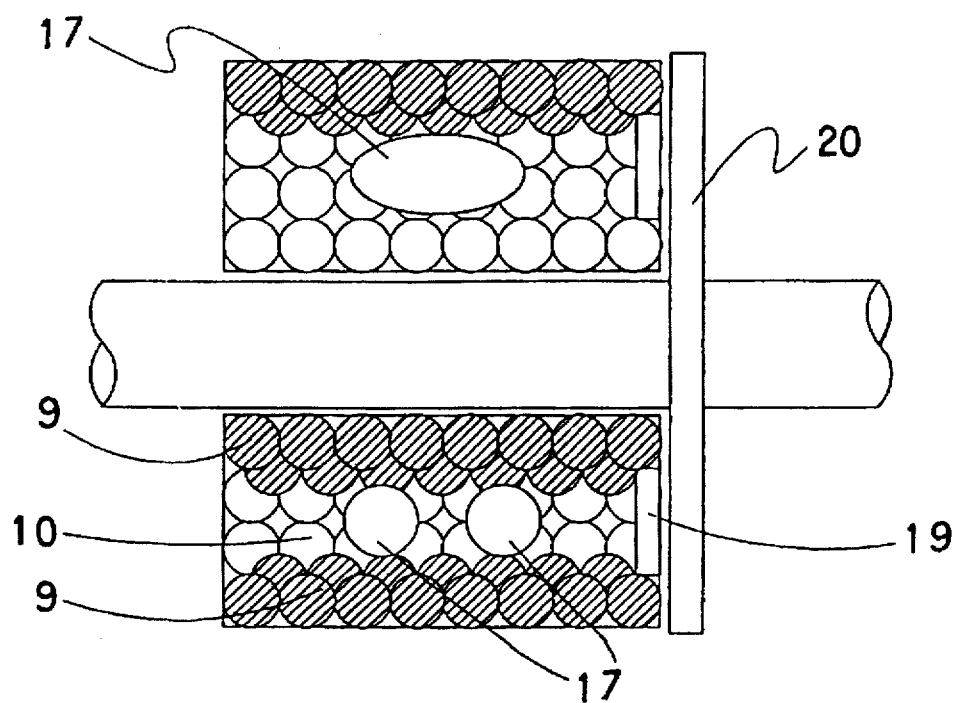
FIG. 44 is a cross-sectional view of a porous plastic bearing according to another embodiment of the present invention.

Referring now to FIG. 44, it illustrates a cross-sectional view of a porous-plastic bearing according to another embodiment of the present invention. Only the deference between this embodiment and the aforementioned embodiment shown in FIG. 43 will be described hereinafter.

In this embodiment, low-porosity plastic particle layers 9 are disposed in both of the outer peripheral portion of the bearing 2 and the lower half of the inner peripheral portion of the bearing 2 which can be brought into contact with the shaft 1 when the shaft 1 is stopped. Furthermore, the other part of the bearing is constructed by a high-porosity plastic particle layer 10. The plastic particles in the layers 9 and 10 are made of ABS resin.

Next, the description will be directed to the operation of the bearing according to this embodiment. When the shaft 1 is rotated, a negative pressure is produced in the gap 51 or in the vicinity of the gap 51, which is opposite to the load-side gap 52, between the shaft 1 and the inner surface of the bearing 2. As a result, the liquid lubricating oil 4 which has infiltrated within the bearing 2 exudes to the inner surface of the bearing 2 in the vicinity of the gap 51 and then flows toward the load-side region in the vicinity of the gap 52 where the distance between the inner surface of the sliding bearing 2 and the shaft 1 is the shortest. A positive pressure is therefore produced in the load-side region. Thus, any contact between the shaft 1 and the bearing 2 can be prevented and hence the frictional resistance between the shaft 1 and the bearing 2 can be reduced.

The liquid lubricating oil 4 which has exuded tends to enter into the interior of the bearing 2 from the inner surface of the bearing 2 in the vicinity of the load-side gap; however, in this case, it cannot enter into the interior of the bearing 2 easily because it is blocked by the low-porosity plastic particle layer 9. Therefore, the oil film formed between the shaft 1 and the inner surface of the bearing 2 can be retained easily. A very small amount of the liquid lubricating oil 4 also enters into the interior of the bearing 2 from the inner surface of the bearing 2 in the vicinity of the load-side gap as shown in FIG. 2 and then circulates through the interior of the bearing 2 while the oil exudes to between the shaft 1 and the sliding bearing 2 on the side opposite to the load-side gap 52.

If the shaft 1 is rotated at a higher speed, the liquid lubricating oil 4 circulated within the bearing 2 tends to go out from the outer surface of the bearing 2 due to the centrifugal force exerted on it; however, it cannot burst out of the bearing 2 because the porosity in the outer peripheral portion of the bearing 2 is too small for the oil to flow to outside the bearing 2 through the outer peripheral portion.

Thus, during rotation of the shaft 1 the liquid lubricating oil 4 continues to be supplied to the inner surface of the bearing 2 in the vicinity of the load-side gap without itself being consumed due to the dispersion of the oil to outside the bearing 2 while the oil is circulated within the interior of the bearing 2. Therefore, wearing and seizure of the bearing 2 can be prevented for a protracted period.

According to this embodiment, the bearing 2 wherein the low-porosity plastic particle layers 9 are disposed in both of the inner peripheral portion of the bearing 2, on which a load is exerted, and the outer peripheral portion of the bearing 2 is provided as an example. However, it is needless to say that the bearing wherein the low-porosity plastic particle layer 9 is disposed in either the inner peripheral portion of the bearing 2 or the outer peripheral portion of the bearing 2 can offer the same advantages.

Figure 45:
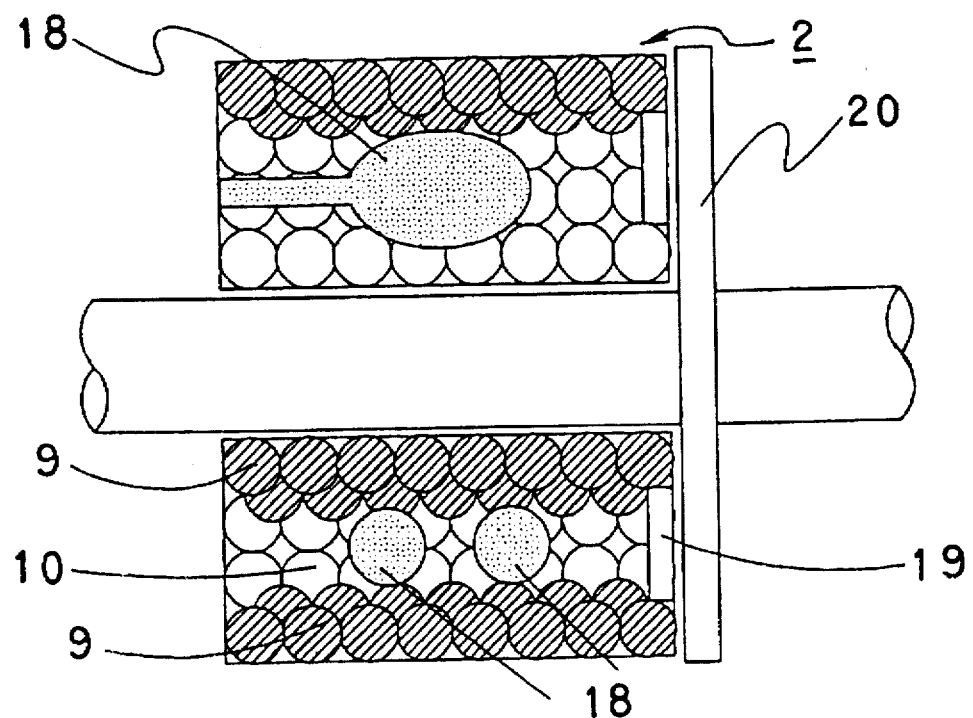
FIG. 45 is a cross-sectional view of a porous plastic bearing according to another embodiment of the present invention.

Referring now to FIG. 45, it illustrates a cross-sectional view of a porous-plastic bearing according to another embodiment of the present invention. Only the deference between this embodiment and the aforementioned embodiment shown in FIG. 44 will be described hereinafter.

In FIG. 45, reference numeral 18 denotes an oil holding member capable of holding oil therein such as a felt. The plastic particles in the layers 9 and 10 are made of ABS resin.

When the shaft 1 is rotated, a negative pressure is produced in the gap 51 or in the vicinity of the gap 51, which is opposite to the load-side gap 52, between the shaft 1 and the inner surface of the bearing 2. As a result, the liquid lubricating oil 4 which has infiltrated within the bearing 2 exudes to the inner surface of the bearing 2 in the vicinity of the gap 51 and then flows toward the load-side region in the vicinity of the gap 52 where the distance between the inner surface of the sliding bearing 2 and the shaft 1 is the shortest. A positive pressure is therefore produced in the load-side region. Thus, any contact between the shaft 1 and the bearing 2 can be prevented and hence the frictional resistance between the shaft 1 and the bearing 2 can be reduced.

In this embodiment, since the oil holding members 18, which are capable of holding oil therein, such as felts are inserted into the cavities 17 wherein no plastic particles 3 exists and hence the liquid lubricating oil 4 is held in the oil holding member 18, the oil content which is the ratio of the volume of the liquid lubricating oil 4 to the volume of the bearing is increased and the oil 4 can be easily held within the bearing 2. It is therefore possible to continue to supply the inner surface of the bearing 2 in the vicinity of the load-side gap with the liquid lubricating oil 4 for a protracted period.

The liquid lubricating oil 4 which has exuded tends to enter into the interior of the bearing 2 from the inner surface of the bearing 2 in the vicinity of the load-side region; however, in this case, it cannot enter into the interior of the bearing 2 easily because it is blocked by the low-porosity plastic particle layer 9. Therefore, the oil film formed between the shaft 1 and the inner surface of the bearing 2 can be retained easily. A very small amount of the liquid lubricating oil 4 also enters into the interior of the bearing 2 from the inner surface of the bearing 2 in the vicinity of the load-side gap as shown in FIG. 2 and then circulates through the interior of the bearing 2 while the oil exudes to between the shaft 1 and the sliding bearing 2 on the side opposite to the load-side gap 52.

If the shaft 1 is rotated at a higher speed, the liquid lubricating oil 4 circulated within the bearing 2 tends to go out from the outer surface of the bearing 2 due to the centrifugal force exerted on it; however, it cannot burst out of the bearing 2 because the porosity in the outer peripheral portion of the bearing 2 is small.

Thus, during rotation of the shaft 1 the liquid lubricating oil 4 continues to be supplied to the inner surface of the bearing 2 in the vicinity of the load-side gap without itself being consumed due to the dispersion of the oil to outside the bearing 2 while the oil is circulated within the interior of the bearing 2. Furthermore, the oil film can be easily formed between the shaft 1 and the inner surface of the bearing 2. Therefore, wearing and seizure of the bearing 2 can be prevented for a protracted period.

According to this embodiment, the bearing 2 wherein the low-porosity layers 9 are disposed in both of the inner peripheral portion of the bearing 2, on which a load is exerted, and the outer peripheral portion of the bearing 2 is provided as an example. However, it is needless to say that the bearing wherein the low-porosity layer 9 is disposed in either the inner peripheral portion of the bearing 2 or the outer peripheral portion of the bearing 2 can offer the same advantages.

Next, the description will be directed to another embodiment of the present invention. Only the deference between this embodiment and the aforementioned embodiment shown in FIG. 38 will be described hereinafter. In the aforementioned embodiment shown in FIG. 38, the plastic particles 3 are made of ABS resin. Alternatively, they can be constructed of resin such as polyacetal (POM), polypropylene (PP), polyamide (PA), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE). When the plastic particles are made of such an alternative resin, the same advantages as those provided by the above-mentioned embodiment shown in FIG. 34 can be offered regardless of the thermal plasticity and thermohardening of the selected resin.

In the aforementioned embodiments shown in FIGS. 40 to 45, the low-porosity plastic particles in the layer 9 and high-porosity plastic particles in the layer 10 are made of ABS resin. Alternatively, they can also be constructed of resin such as polyacetal (POM), polypropylene (PP), polyamide (PA), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE). When the plastic particles are made of such an alternative resin, the same advantages as those provided by the above-mentioned embodiments shown in FIGS. 40 to 45 can be offered regardless of the thermal plasticity and thermohardening of the selected resin.

Next, the description will be directed to another embodiment of the present invention. Only the difference between this embodiment and the aforementioned embodiment shown in FIG. 38 will be explained hereinafter. As previously mentioned, in the aforementioned embodiment shown in FIG. 38, the bearing is in the form of an all-round bearing. On the other hand, the sliding bearing of this embodiment can be in the form of a dynamic pressure journal bearing such as a partial bearing as shown in FIG. 5, a combination of a floating bush and an outer bearing as shown in FIG. 6, a multi-lobe bearing as shown in FIG. 7, a tilting pad bearing as shown in FIG. 8, or a bearing provided with spiral grooves as shown in FIG. 9. In all cases, this embodiment can offer the same advantages as those provided by the aforementioned embodiment shown in FIG. 38.

Furthermore, like the aforementioned embodiment shown in FIG. 38, the plastic particles 3 in the bearing of this embodiment are made of ABS resin. Alternatively, they can be constructed of resin such as polyacetal (POM), polypropylene (PP), polyamide (PA), polyimide (PI), polyethylene (PE), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE). It is needless to say that when the plastic particles are made of such an alternative resin, the same advantages as those provided by the above-mentioned embodiment shown in FIG. 38 can be offered.

Figure 46:
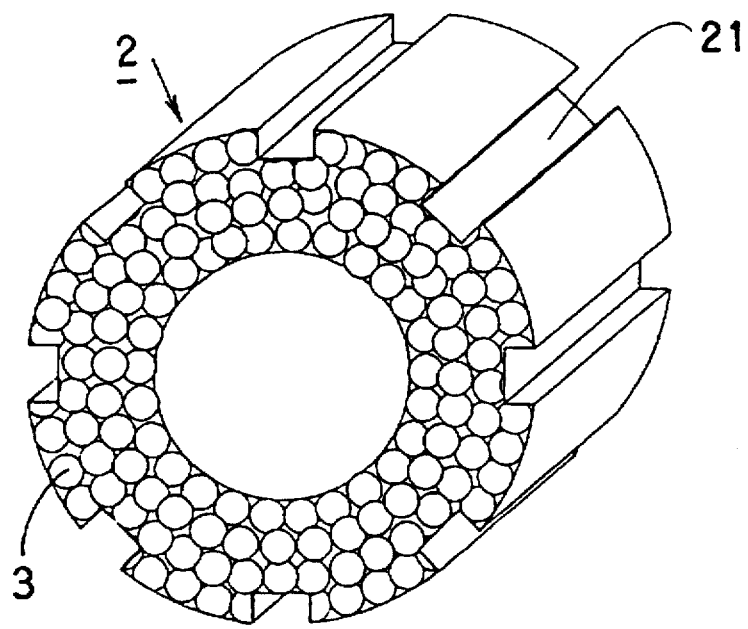
FIG. 46 is a cross-sectional view of a porous plastic bearing according to another embodiment of the present invention.

Referring now to FIG. 46, it illustrates a cross-sectional view showing a porous plastic bearing according to another embodiment of the present invention. In the figure, reference numeral 21 denotes a groove formed on the outer surface of the bearing 2 for holding the liquid lubricating oil. The plastic particles included within the bearing are made of ABS resin.

When the shaft 1 is rotated, a negative pressure is produced in the gap 51 or in the vicinity of the gap 51, which is opposite to the load-side gap 52, between the shaft 1 and the inner surface of the bearing 2. As a result, the liquid lubricating oil 4 which has infiltrated within the bearing 2 exudes to the inner surface of the bearing 2 in the vicinity of the gap 51 and then flows toward the load-side region in the vicinity of the gap 52 where the distance between the inner surface of the sliding bearing 2 and the shaft 1 is the shortest. A positive pressure is therefore produced in the load-side region. Thus, any contact between the shaft 1 and the bearing 2 can be prevented and hence the frictional resistance between the shaft 1 and the bearing 2 can be reduced. Furthermore, the bearing 2 can carry the radial force exerted by the shaft 1.

The liquid lubricating oil 4 enters into the interior of the bearing 2 from the inner surface of the bearing 2 in the vicinity of the load-side gap as shown in FIG. 2 and then circulates through the interior of the bearing 2 while the oil exudes to between the shaft 1 and the bearing 2 on the side opposite to the load-side gap.

As the shaft 1 is rotated, a part of the liquid lubricating oil 4 tends to go out from the outer surface of the bearing 2; however, the grooves 21 formed on the outer surface of the bearing hold the liquid lubricating oil 4 by the surface tension of the oil contained therein.

Thus, during rotation of the shaft 1 the liquid lubricating oil 4 continues to be supplied to the inner surface of the bearing 2 in the vicinity of the load-side gap for a protracted period while the oil is circulated within the interior of the bearing 2. Therefore, wearing and seizure of the bearing 2 can be prevented. Furthermore, since the sliding bearing 2 is made of porous plastic, it is lightweight.

In order to hold the liquid lubricating oil 4 within the plastic bearing 2, there must exist a plurality of plastic particles in any longitudinal or cross section within the bearing 2. The liquid lubricating agent 4 is oil. Alternatively, the liquid lubricating agent 4 can be grease.

Figure 47:
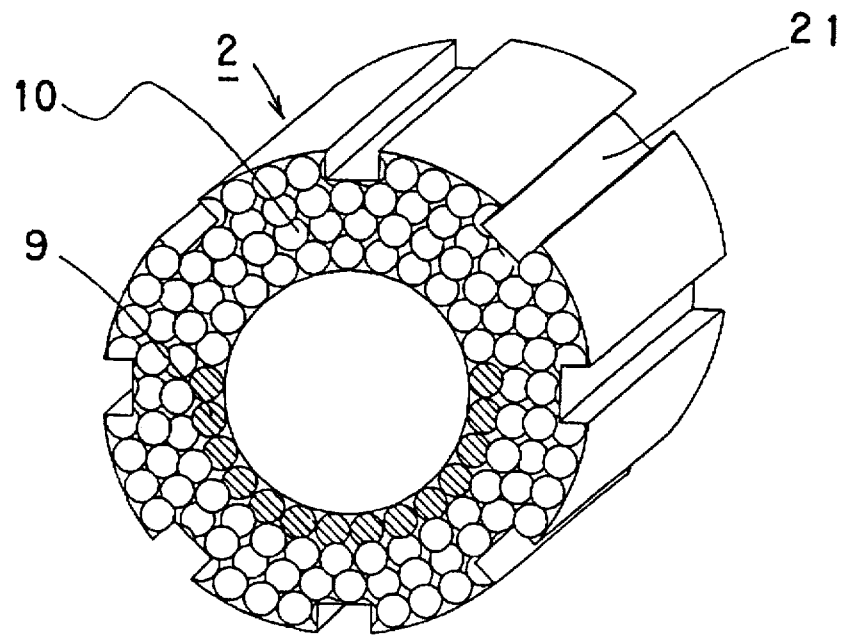
FIG. 47 is a cross-sectional view of a porous plastic bearing according to another embodiment of the present invention.

Referring now to FIG. 47, it illustrates a cross-sectional view of a porous-plastic bearing according to another embodiment of the present invention. Only the deference between this embodiment and the aforementioned embodiment shown in FIG. 46 will be described hereinafter.

In this embodiment, a low-porosity plastic particle layer 9 is disposed in the lower half of the inner peripheral portion of the bearing 2 having the plural grooves 21 formed on the outer surface thereof. Furthermore, the other portion of the bearing is constructed by a high-porosity plastic particle layer 10. The plastic particles in the layers 9 and 10 are made of ABS resin.

When the shaft 1 is rotated, a negative pressure is produced in the gap 51 or in the vicinity of the gap 51, which is opposite to the load-side gap 52, between the shaft 1 and the inner surface of the bearing 2. As a result, the liquid lubricating oil 4 which has infiltrated within the bearing 2 exudes to the inner surface of the bearing 2 in the vicinity of the gap 51 and then flows toward the load-side region in the vicinity of the gap 52 where the distance between the inner surface of the sliding bearing 2 and the shaft 1 is the shortest. A positive pressure is therefore produced in the load-side region. Thus, any contact between the shaft 1 and the bearing 2 can be prevented and hence the frictional resistance between the shaft 1 and the bearing 2 can be reduced.

The liquid lubricating oil 4 which has exuded tends to enter into the interior of the bearing 2 from the inner surface of the bearing 2 in the vicinity of the load-side gap; however, in this case, it cannot enter into the interior of the bearing 2 easily because it is blocked by the low-porosity plastic particle layer 9 in the lower half of the inner peripheral portion of the bearing. Therefore, the oil film formed between the shaft 1 and the inner surface of the bearing 2 can be retained easily, whereby wearing and seizure of the bearing can be prevented more effectively. Furthermore, the liquid lubricating oil 4 which tends to go out from the outer surface of the bearing 2 can be held in the grooves 21 by the surface tension of the oil contained in the grooves.

Figure 48:
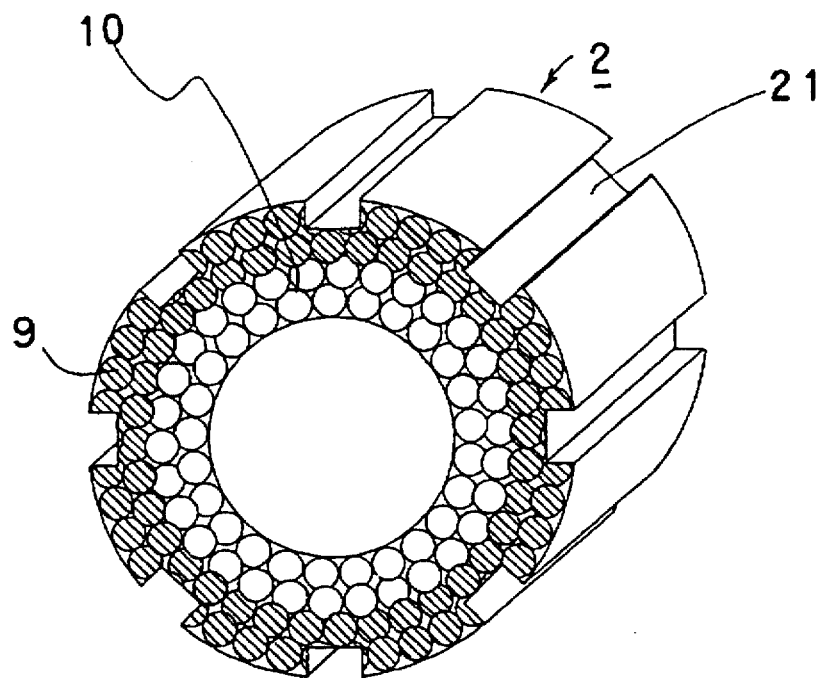
FIG. 48 is a cross-sectional view of a porous plastic bearing according to another embodiment of the present invention.

Referring now to FIG. 48, it illustrates a cross-sectional view of a porous-plastic bearing according to another embodiment of the present invention. Only the deference between this embodiment and the aforementioned embodiment shown in FIG. 46 will be described hereinafter.

In this embodiment, a low-porosity plastic particle layer 9 is disposed in all the outer peripheral portion of the bearing 2 having a plurality of grooves 21 formed on the surface thereof. Furthermore, the other part of the bearing is constructed by a high-porosity plastic particle layer 10. The plastic particles in the layers 9 and 10 are made of ABS resin.

When the shaft 1 is rotated, a negative pressure is produced in the gap 51 or in the vicinity of the gap 51, which is opposite to the load-side gap 52 between the shaft 1 and the inner surface of the bearing 2. As a result, the liquid lubricating oil 4 which has infiltrated within the bearing 2 exudes to the inner surface of the bearing 2 in the vicinity of the gap 51 and then flows toward the load-side region in the vicinity of the gap 52 where the distance between the inner surface of the sliding bearing 2 and the shaft 1 is the shortest. A positive pressure is therefore produced in the load-side region. Thus, any contact between the shaft 1 and the bearing 2 can be prevented and hence the frictional resistance between the shaft 1 and the bearing 2 can be reduced.

The liquid lubricating oil 4 also enters into the interior of the bearing 2 from the inner surface of the bearing 2 in the vicinity of the load-side gap as shown in FIG. 2 and then circulates through the interior of the bearing 2 while the oil exudes to between the shaft 1 and the sliding bearing 2 on the side opposite to the load-side gap 52.

If the shaft 1 is rotated at a higher speed, the liquid lubricating oil 4 circulated within the bearing 2 tends to go out from the outer surface of the bearing 2 due to the centrifugal force exerted on it; however, it cannot burst out of the bearing 2 because the outer peripheral portion of the bearing 2 is constructed by the low-porosity plastic particle layer 9. Furthermore, the liquid lubricating oil 4 is also held by the plural grooves 21. Therefore, the dispersion of the lubricating oil can be prevented more effectively.

Thus, during rotation of the shaft 1 the liquid lubricating oil 4 continues to be supplied to the inner surface of the bearing 2 in the vicinity of the load-side gap without itself being consumed due to the dispersion of the oil to outside the bearing 2 while the oil is circulated within the interior of the bearing 2. Therefore, wearing and seizure of the bearing 2 can be prevented for a protracted period.

Figure 49:
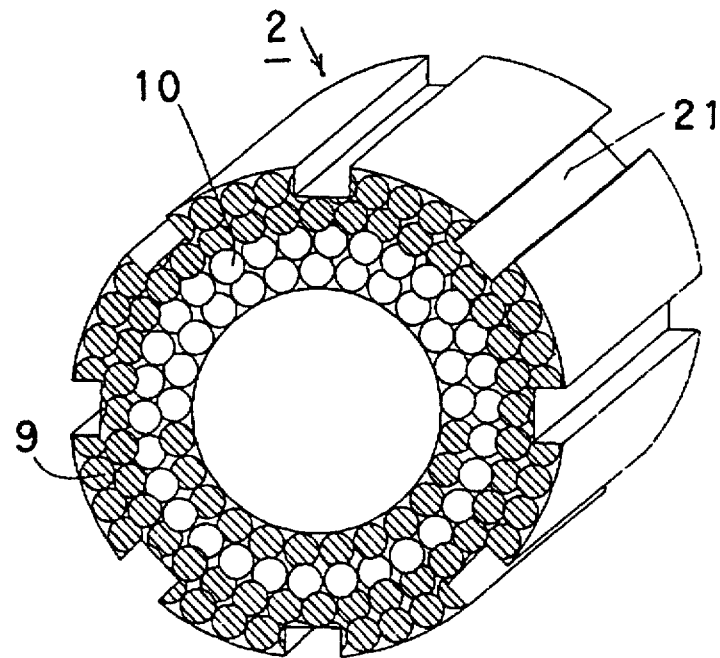
FIG. 49 is a cross-sectional view of a porous plastic bearing according to another embodiment of the present invention.

Referring now to FIG. 49, it illustrates a cross-sectional view of a porous-plastic bearing according to another embodiment of the present invention. Only the deference between this embodiment and the aforementioned embodiment shown in FIG. 46 will be described hereinafter.

In this embodiment, low-porosity plastic particle layers 9 are disposed in both of all the outer peripheral portion of the bearing 2 having a plurality of grooves 21 formed on the surface thereof and the lower half of the inner peripheral portion of the bearing. Furthermore, the other part of the bearing is constructed by a high-porosity plastic particle layer 10. The plastic particles in the layers 9 and 10 are made of ABS resin.

When the shaft 1 is rotated, a negative pressure is produced in the gap 51 or in the vicinity of the gap 51, which is opposite to the load-side gap 52, between the shaft 1 and the inner surface of the bearing 2. As a result, the liquid lubricating oil 4 which has infiltrated within the bearing 2 exudes to the inner surface of the bearing 2 in the vicinity of the gap 51 and then flows toward the load-side region in the vicinity of the gap 52 where the distance between the inner surface of the sliding bearing 2 and the shaft 1 is the shortest. A positive pressure is therefore produced in the load-side region. Thus, any contact between the shaft 1 and the bearing 2 can be prevented and hence the frictional resistance between the shaft 1 and the bearing 2 can be reduced.

The liquid lubricating oil 4 which has exuded tends to enter into the interior of the bearing 2 from the inner surface of the bearing 2 in the vicinity of the load-side gap; however, in this case, it cannot enter into the interior of the bearing 2 easily because it is blocked by the low-porosity plastic particle layer 9 in the lower half of the inner peripheral portion of the bearing. Therefore, the oil film formed between the shaft 1 and the inner surface of the bearing 2 can be retained easily. A very small amount of the liquid lubricating oil 4 also enters into the interior of the bearing 2 from the inner surface of the bearing 2 in the vicinity of the load-side gap as shown in FIG. 2 and then circulates through the interior of the bearing 2 while the oil exudes to between the shaft 1 and the sliding bearing 2 on the side opposite to the load-side gap.

If the shaft 1 is rotated at a higher speed, the liquid lubricating oil 4 circulated within the bearing 2 tends to go out from the outer surface of the bearing 2 due to the centrifugal force exerted on it; however, it cannot burst out of the bearing 2 easily because all the outer peripheral portion of the bearing 2 is constructed by the low-porosity plastic particle layer 9. Furthermore, the liquid lubricating oil 4 is also held by the plural grooves 21.

Thus, during rotation of the shaft 1 the liquid lubricating oil 4 continues to be supplied to the inner surface of the bearing 2 in the vicinity of the load-side gap without itself being consumed due to the dispersion of the oil to outside the bearing 2 while the oil is circulated within the interior of the bearing 2. Furthermore, the oil film can be easily formed between the shaft 1 and the bearing 2. Therefore, wearing and seizure of the bearing 2 can be prevented for a protracted period.

Figure 50:
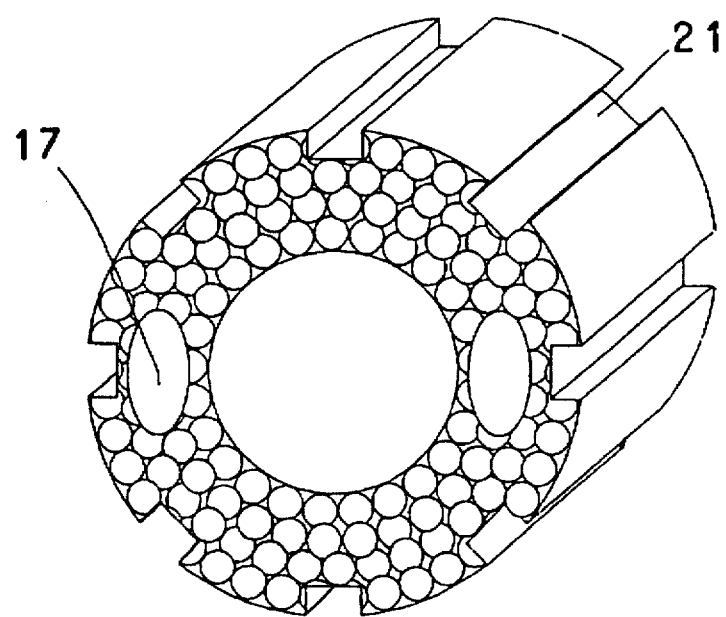
FIG. 50 is a cross-sectional view of a porous plastic bearing according to another embodiment of the present invention.

Referring now to FIG. 50, it illustrates a cross-sectional view of a porous-plastic bearing according to another embodiment of the present invention. Only the deference between this embodiment and the aforementioned embodiment shown in FIG. 46 will be described hereinafter.

In this embodiment, there is provided a cavity 17, wherein no plastic particle 3 exists, within a layer containing a plurality of plastic particles 3 in the bearing 2 having a plurality of grooves 21 formed on the outer surface thereof. The plastic particles 3 are made of ABS resin.

When the shaft 1 is rotated, a negative pressure is produced in the gap 51 or in the vicinity of the gap 51, which is opposite to the load-side gap 52, between the shaft 1 and the inner surface of the bearing 2. As a result, the liquid lubricating oil 4 which has infiltrated within the bearing 2 exudes to the inner surface of the bearing 2 in the vicinity of the gap 51 and then flows toward the load-side region in the vicinity of the gap 52 where the distance between the inner surface of the sliding bearing 2 and the shaft 1 is the shortest. A positive pressure is therefore produced in the load-side region. Thus, any contact between the shaft 1 and the bearing 2 can be prevented and hence the frictional resistance between the shaft 1 and the bearing 2 can be reduced.

The liquid lubricating oil 4 enters into the interior of the sliding bearing 2 from the inner surface of the sliding bearing 2 in the vicinity of the load-side gap 52 as shown in FIG. 2 and then circulates through the interior of the bearing 2 while the oil exudes to between the shaft 1 and the bearing 2 on the side opposite to the load-side gap.

Since the cavities 17 wherein no plastic particle 3 exists are included within the bearing 2 and hence the liquid lubricating oil 4 enters into the cavities 17, the oil content which is the ratio of the volume of the liquid lubricating oil 4 to the volume of the bearing is increased. It is therefore possible to continue to supply the inner surface of the bearing 2 in the vicinity of the load-side gap with the liquid lubricating oil 4 for a protracted period.

Thus, during rotation of the shaft 1 the liquid lubricating oil 4 continues to be supplied to the inner surface of the bearing 2 in the vicinity of the load-side gap for a protracted period while the oil is circulated within the interior of the bearing 2. Therefore, wearing and seizure of the bearing device can be prevented. Furthermore, since the sliding bearing 2 is made of porous plastic, it is lightweight.

Figure 51:
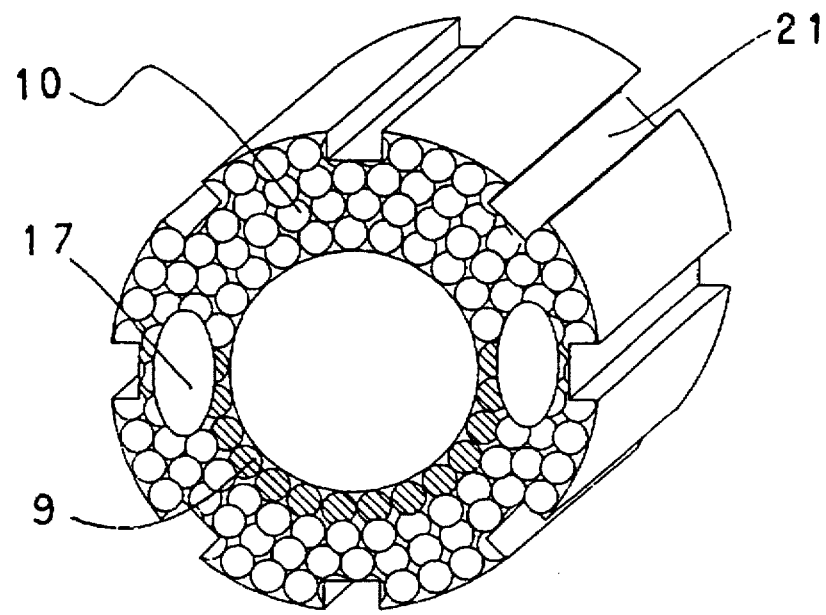
FIG. 51 is a cross-sectional view of a porous plastic bearing according to another embodiment of the present invention.

Referring now to FIG. 51, it illustrates a cross-sectional view of a porous-plastic bearing according to another embodiment of the present invention. Only the deference between this embodiment and the aforementioned embodiment shown in FIG. 46 will be described hereinafter.

In this embodiment, there are provided cavities 17, wherein no plastic particle 3 exists, within the bearing 2 having a plurality of grooves 21 formed on the outer surface thereof. Furthermore, a low-porosity plastic particle layer 9 is disposed in the lower half of the inner peripheral portion of the bearing 2 and the other portion of the bearing is constructed by a high-porosity plastic particle layer 10.

When the shaft 1 is rotated, a negative pressure is produced in the gap 51 or in the vicinity of the gap 51, which is opposite to the load-side gap 52, between the shaft 1 and the inner surface of the bearing 2. As a result, the liquid lubricating oil 4 which has infiltrated within the bearing 2 exudes to the inner surface of the bearing 2 in the vicinity of the gap 51 and then flows toward the load-side region in the vicinity of the gap 52 where the distance between the inner surface of the sliding bearing 2 and the shaft 1 is the shortest. A positive pressure is therefore produced in the load-side region. Thus, any contact between the shaft 1 and the bearing 2 can be prevented and hence the frictional resistance between the shaft 1 and the bearing 2 can be reduced.

The liquid lubricating oil 4 enters into the interior of the bearing 2 from the inner surface of the bearing 2 in the vicinity of the load-side gap as shown in FIG. 2 and then circulates through the interior of the bearing 2 while the oil exudes to between the shaft 1 and the sliding bearing 2 on the side opposite to the load-side gap.

The liquid lubricating oil 4 which has exuded tends to enter into the interior of the bearing 2 from the inner surface of the bearing 2 in the vicinity of the load-side gap; however, in this case, it cannot enter into the interior of the bearing 2 easily because it is blocked by the low-porosity plastic particle layer 9 in the lower half of the inner peripheral portion of the bearing. Therefore, the oil film formed between the shaft 1 and the inner surface of the bearing 2 can be retained easily.

Since the cavities 17 wherein no plastic particle 3 exists are included within the bearing 2 and hence the liquid lubricating oil 4 enters into the cavities 17, the oil content which is the ratio of the volume of the liquid lubricating oil 4 to the volume of the bearing is increased. It is therefore possible to continue to supply the load-side inner surface of the bearing 2 in the vicinity of the load-side gap with the liquid lubricating oil 4 for a protracted period.

Furthermore, the liquid lubricating oil 4 which tends to go out from the outer surface of the bearing 2 can be held by the grooves 21. Thus, during rotation of the shaft 1 the liquid lubricating oil 4 continues to be supplied to the inner surface of the bearing 2 in the vicinity of the load-side gap without itself being consumed due to the dispersion of the oil to outside the bearing 2 while the oil is circulated within the interior of the bearing 2. Therefore, wearing and seizure of the bearing 2 can be prevented for a protracted period.

Figure 52:
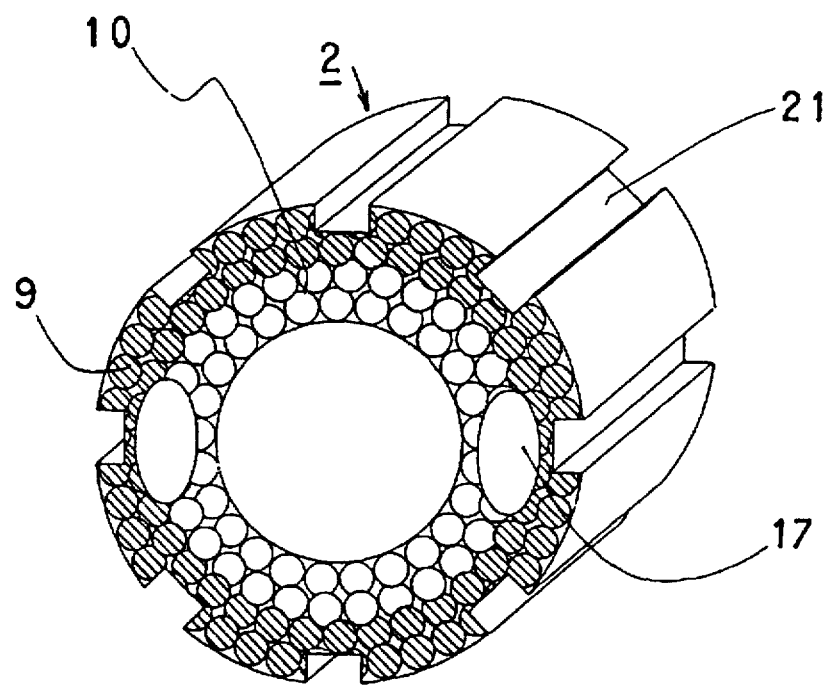
FIG. 52 is a cross-sectional view of a porous plastic bearing according to another embodiment of the present invention.

Referring now to FIG. 52, it illustrates a cross-sectional view of a porous-plastic bearing according to another embodiment of the present invention. Only the deference between this embodiment and the aforementioned embodiment shown in FIG. 46 will be described hereinafter.

In this embodiment, there are provided cavities 17 within the bearing having a plurality of grooves 21 formed on the outer surface thereof. Furthermore, a low-porosity plastic particle layer 9 is disposed in all the outer peripheral portion of the bearing 2 and the other portion of the bearing is constructed by a high-porosity plastic particle layer 10. The plastic particles in the layers 9 and 10 are made of ABS resin.

When the shaft 1 is rotated, a negative pressure is produced in the gap 51 or in the vicinity of the gap 51, which is opposite to the load-side gap 52, between the shaft 1 and the inner surface of the bearing 2. As a result, the liquid lubricating oil 4 which has infiltrated within the bearing 2 exudes to the inner surface of the bearing 2 in the vicinity of the gap 51 and then flows toward the load-side region in the vicinity of the gap 52 where the distance between the inner surface of the sliding bearing 2 and the shaft 1 is the shortest. A positive pressure is therefore produced in the load-side region. Thus, any contact between the shaft 1 and the bearing 2 can be prevented and hence the frictional resistance between the shaft 1 and the bearing 2 can be reduced.

The liquid lubricating oil 4 also enters into the interior of the bearing 2 from the inner surface of the bearing 2 in the vicinity of the load-side gap as shown in FIG. 2 and then circulates through the interior of the bearing 2 while the oil exudes to between the shaft 1 and the sliding bearing 2 on the side opposite to the load-side gap.

If the shaft 1 is rotated at a higher speed, the liquid lubricating oil 4 circulated within the bearing 2 tends to go out from the outer surface of the bearing 2 due to the centrifugal force exerted on it; however, it cannot burst out of the bearing 2 easily because all the outer peripheral portion of the bearing 2 is constructed by the low-porosity plastic particle layer 9. Furthermore, the liquid lubricating oil 4 which tends to go out is also held in the plural grooves 21 by the surface tension of the oil.

Since the liquid lubricating oil 4 also enters into the cavities 17, the oil content which is the ratio of the volume of the liquid lubricating oil 4 to the volume of the bearing is increased. It is therefore possible to continue to supply the inner surface of the bearing 2 in the vicinity of the load-side gap with the liquid lubricating oil 4 for a protracted period.

Thus, during rotation of the shaft 1 the liquid lubricating oil 4 continues to be supplied to the inner surface of the bearing 2 in the vicinity of the load-side gap without itself being consumed due to the dispersion of the oil to outside the bearing 2 while the oil is circulated within the interior of the bearing 2. Therefore, wearing and seizure of the bearing 2 can be prevented for a protracted period.

Figure 53:
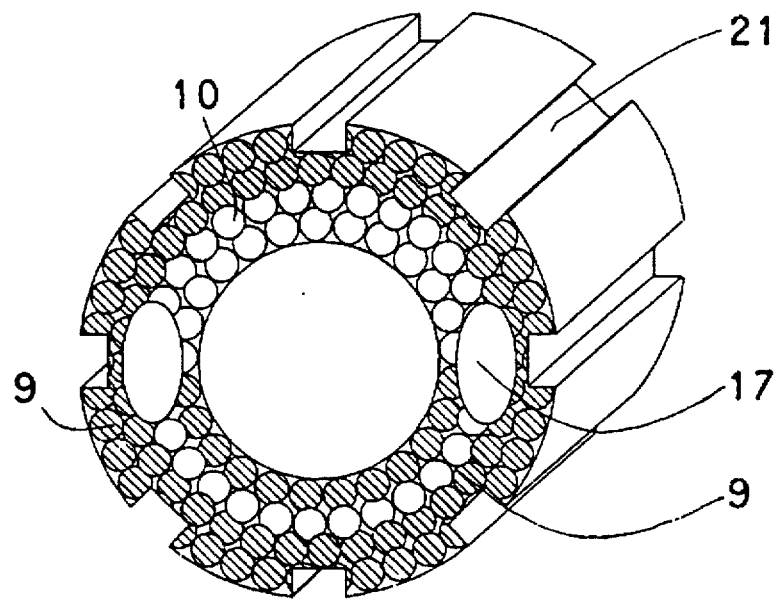
FIG. 53 as a cross-sectional view of a porous plastic bearing according to another embodiment of the present invention.

Referring now to FIG. 53, it illustrates a cross-sectional view of a porous-plastic bearing according to another embodiment of the present invention. Only the deference between this embodiment and the aforementioned embodiment shown in FIG. 46 will be described hereinafter.

In this embodiment, there are provided cavities 17 within the bearing having a plurality of grooves 21 formed on the outer surface thereof. Furthermore, low-porosity plastic particle layers 9 are disposed in both of all the outer peripheral portion of the bearing 2 and the lower half of the inner peripheral portion of the bearing 2. The other part of the bearing is constructed by a high-porosity plastic particle layer 10. The plastic particles in the layers 9 and 10 are made of ABS resin.

When the shaft 1 is rotated, a negative pressure is produced in the gap 51 or in the vicinity of the gap 51, which is opposite to the load-side gap 52, between the shaft 1 and the inner surface of the bearing 2. As a result, the liquid lubricating oil 4 which has infiltrated within the bearing 2 exudes to the inner surface of the bearing 2 in the vicinity of the gap 51 and then flows toward the load-side region in the vicinity of the gap 52 where the distance between the inner surface of the sliding bearing 2 and the shaft 1 is the shortest. A positive pressure is therefore produced in the load-side region. Thus, any contact between the shaft 1 and the bearing 2 can be prevented and hence the frictional resistance between the shaft 1 and the bearing 2 can be reduced.

The liquid lubricating oil 4 which has exuded tends to enter into the interior of the bearing 2 from the inner surface of the bearing 2 in the vicinity of the load-side gap; however, in this case, it cannot enter into the interior of the bearing 2 easily because it is blocked by the low-porosity plastic particle layer 9 in the lower half of the inner peripheral portion of the bearing. Therefore, the oil film formed between the shaft 1 and the inner surface of the bearing 2 can be retained easily. A very small amount of the liquid lubricating oil 4 also enters into the interior of the bearing 2 from the inner surface of the bearing 2 in the vicinity of the load-side gap as shown in FIG. 2 and then circulates through the interior of the bearing 2 while the oil exudes to between the shaft 1 and the sliding bearing 2 on the side opposite to the load-side gap.

If the shaft 1 is rotated at a higher speed, the liquid lubricating oil 4 circulated within the bearing 2 tends to go out from the outer surface of the bearing 2 due to the centrifugal force exerted on it; however, it cannot burst out of the bearing 2 easily because all the outer peripheral portion of the bearing 2 is constructed by the low-porosity plastic particle layer 9. Furthermore, the liquid lubricating oil 4 is also held in the plural grooves 21.

In this embodiment, since the liquid lubricating oil 4 is also held in the cavities 17 in which no plastic particle 3 exists, the oil content which is the ratio of the volume of the liquid lubricating oil 4 to the volume of the bearing is increased. It is therefore possible to continue to supply the load-side inner surface of the bearing 2 in the vicinity of the load-side gap with the liquid lubricating oil 4 for a protracted period.

Furthermore, the liquid lubricating oil 4 which tends to go out is also held in the plural grooves 21 by the surface tension of the oil. Thus, during rotation of the shaft 1 the liquid lubricating oil 4 continues to be supplied to the inner surface of the bearing 2 in the vicinity of the load-side gap without itself being consumed due to the dispersion of the oil to outside the bearing 2 while the oil is circulated within the interior of the bearing 2. Furthermore, the oil film can be easily formed between the shaft 1 and the bearing 2. Therefore, wearing and seizure of the bearing 2 can be prevented for a protracted period.

Figure 54:
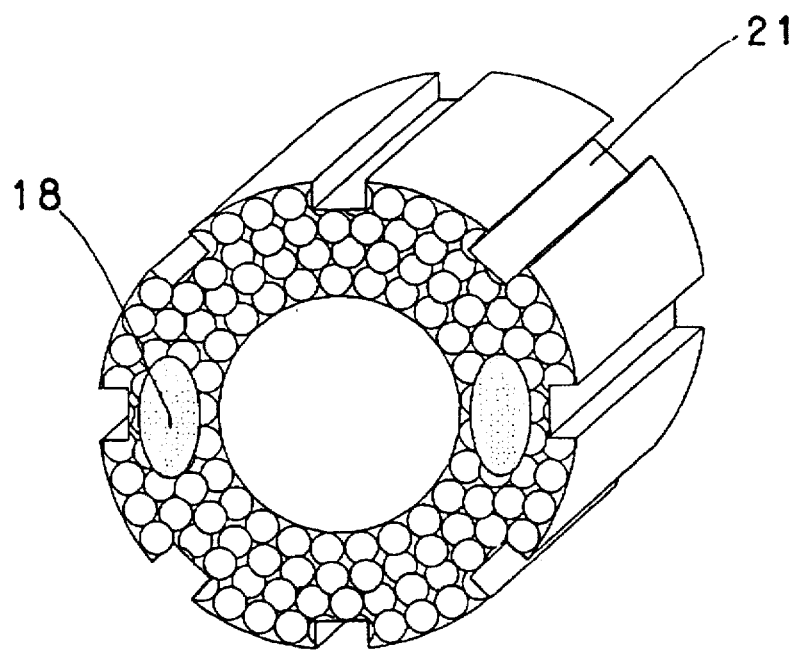
FIG. 54 as a cross-sectional view of a porous plastic bearing according to another embodiment of the present invention.

Referring now to FIG. 54, it illustrates a cross-sectional view of a porous-plastic bearing according to another embodiment of the present invention. Only the deference between this embodiment and the aforementioned embodiment shown in FIG. 46 will be described hereinafter.

In FIG. 54, reference numeral 18 denotes an oil holding member capable of holding oil therein such as a felt. The plastic particles 3 within the bearing are made of ABS resin.

In this embodiment, the bearing is provided with a plurality of grooves 21 formed on the outer surface thereof and cavities 17 in a layer containing a cluster of plastic particles 3. The oil holding members 18 are inserted into the cavities 17 respectively.

Next, the description will be directed to the operation of the bearing according to this embodiment. When the shaft 1 is rotated, a negative pressure is produced in the gap 51 or in the vicinity of the gap 51, which is opposite to the load-side gap 52, between the shaft 1 and the inner surface of the bearing 2. As a result, the liquid lubricating oil 4 which has infiltrated within the bearing 2 exudes to the inner surface of the bearing 2 in the vicinity of the gap 51 and then flows toward the load-side region in the vicinity of the gap 52 where the distance between the inner surface of the sliding bearing 2 and the shaft 1 is the shortest. A positive pressure is therefore produced in the load-side region. Thus, any contact between the shaft 1 and the bearing 2 can be prevented and hence the frictional resistance between the shaft 1 and the bearing 2 can be reduced.

The liquid lubricating oil 4 also enters into the interior of the bearing 2 from the inner surface of the bearing 2 in the vicinity of the load-side gap as indicated by the arrows shown in FIG. 2 and then circulates through the interior of the bearing 2 while the oil exudes to between the shaft 1 and the sliding bearing 2 on the side opposite to the load-side gap.

Since the bearing is provided with the oil holding members 18 which is capable of holding oil therein within the cavities 17 wherein no plastic particles 3 exists and hence the liquid lubricating oil 4 is held in the oil holding members 18, the oil content which is the ratio of the volume of the liquid lubricating oil 4 to the volume of the bearing is increased and the liquid lubricating oil 4 can be easily held within the bearing 2. It is therefore possible to continue to supply the inner surface of the bearing 2 in the vicinity of the load-side gap with the liquid lubricating oil 4 for a protracted period.

Thus, during rotation of the shaft 1 the liquid lubricating oil 4 continues to be supplied to the inner surface of the bearing 2 in the vicinity of the load-side gap for a protracted period while the oil is circulated within the interior of the bearing 2. Therefore, wearing and seizure of the bearing 2 can be prevented. Furthermore, since the sliding bearing is made of porous plastic, it is lightweight.

In order to hold the liquid lubricating oil 4 within the plastic bearing, there must exist a plurality of plastic particles in any longitudinal or cross section within the bearing 2. The liquid lubricating agent 4 is oil. Alternatively, the liquid lubricating agent 4 can be grease.

Figure 55:
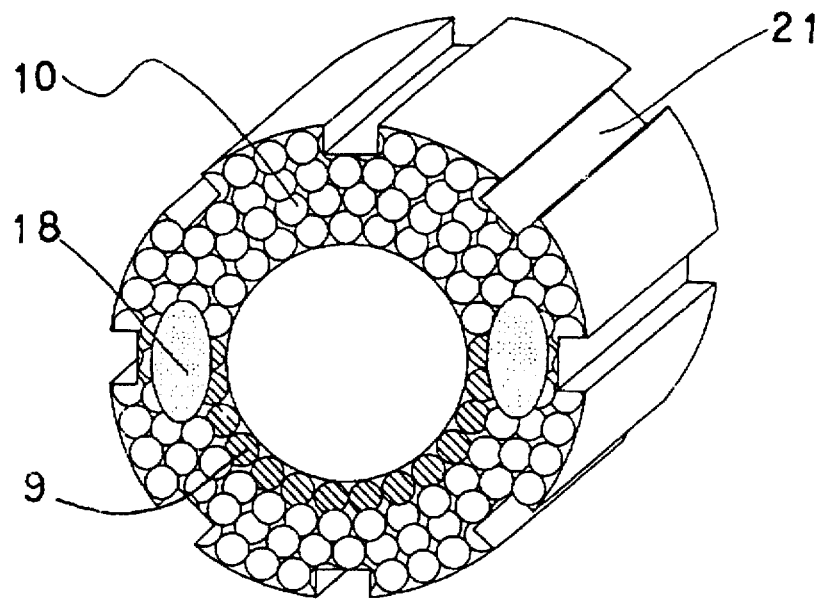
FIG. 55 as a cross-sectional view of a porous plastic bearing according to another embodiment of the present invention.

Referring now to FIG. 55, it illustrates a cross-sectional view of a porous-plastic bearing according to another embodiment of the present invention. Only the deference between this embodiment and the aforementioned embodiment shown in FIG. 54 will be described hereinafter.

In this embodiment, the layer containing the plastic particles 3 within the bearing 2 according to the aforementioned embodiment shown in FIG. 54 is replaced by a low-porosity plastic particle layer 9 formed in the lower half of the inner peripheral portion of the bearing 2 and a high-porosity plastic particle layer 10 formed in the other part of the bearing. The plastic particles in the layers 9 and 10 are made of ABS resin.

In such the bearing 2 of this embodiment, the liquid lubricating oil 4 which has exuded tends to enter into the interior of the bearing 2 from the inner surface of the bearing 2 in the vicinity of the load-side gap; however, in this case, it cannot enter into the interior of the bearing 2 easily because it is blocked by the low-porosity plastic particle layer 9. Therefore, the oil film formed between the shaft 1 and the inner surface of the bearing 2 can be retained easily.

The oil holding members 18 inserted into the cavities 17 increase the content of the liquid lubricating oil 4 in the bearing. Furthermore, the liquid lubricating oil 4 which tends to go out is also held in the plural grooves 21. Therefore, wearing and seizure of the bearing can be prevented more effectively.

Figure 56:
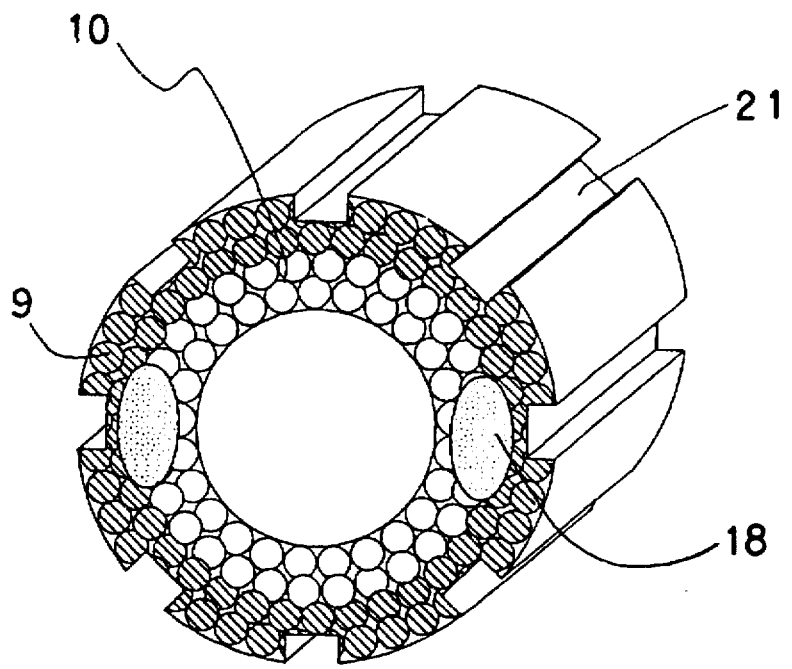
FIG. 56 as a cross-sectional view of a porous plastic bearing according to another embodiment of the present invention.

Referring now to FIG. 56, it illustrates a cross-sectional view of a porous-plastic bearing according to another embodiment of the present invention. Only the deference between this embodiment and the aforementioned embodiment shown in FIG. 54 will be described hereinafter.

In this embodiment, a low-porosity plastic particle layer 9 is disposed in all the outer peripheral portion of the bearing 2 having a plurality of grooves 21 formed on the surface thereof. Furthermore, the other part of the bearing is constructed by a high-porosity plastic particle layer 10.

In such the bearing 2 of this embodiment, for example, if the shaft 1 is rotated at a higher speed, the liquid lubricating oil 4 circulated within the bearing 2 tends to go out from the outer surface of the bearing 2 due to the centrifugal force exerted on it; however, it cannot burst out of the bearing 2 easily because the outer peripheral portion of the bearing 2 is constructed by the low-porosity plastic particle layer 9. Furthermore, the liquid lubricating oil 4 which has exuded to the outer surface of the bearing is also held in the plural grooves 21 by the surface tension of the oil.

Thus, during rotation of the shaft 1 the liquid lubricating oil 4 continues to be supplied to the inner surface of the bearing 2 in the vicinity of the load-side gap without itself being consumed due to the dispersion of the oil to outside the bearing 2 while the oil is circulated within the interior of the bearing 2. Therefore, wearing and seizure of the bearing 2 can be prevented for a protracted period.

Figure 57:
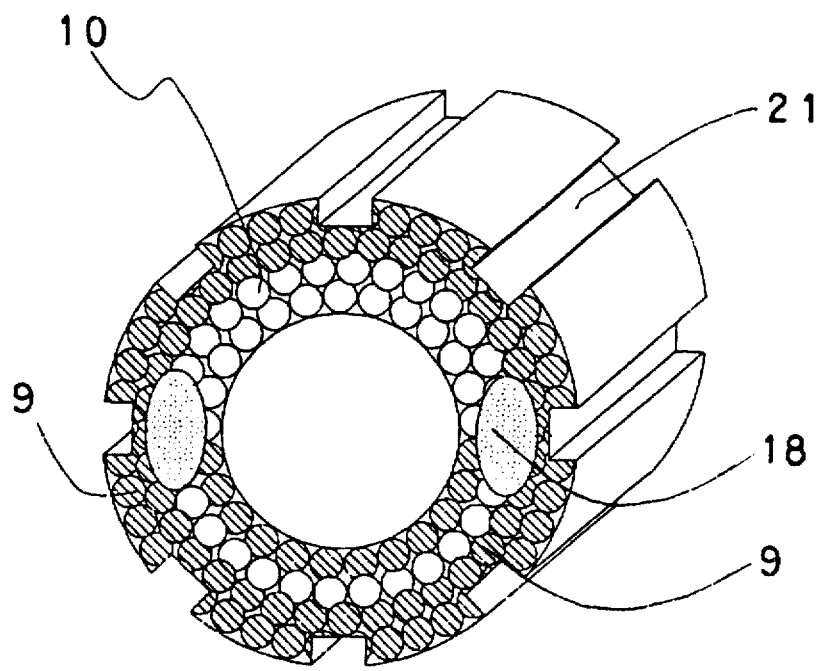
FIG. 57 is a cross-sectional view of a porous plastic bearing according to another embodiment of the present invention.

Referring now to FIG. 57, it illustrates a cross-sectional view of a porous-plastic bearing according to another embodiment of the present invention. Only the deference between this embodiment and the aforementioned embodiment shown in FIG. 54 will be described hereinafter.

In this embodiment, low-porosity plastic particle layers 9 are disposed in both of all the outer peripheral portion of the bearing 2 and the lower half of the inner peripheral portion of the bearing 2. Furthermore, the other part of the bearing is constructed by a high-porosity plastic particle layer 10.

In such the bearing 2 of this embodiment, during rotation of the shaft 1, the liquid lubricating oil 4 which has circulated within the interior of the bearing and has exuded tends to enter into the interior of the bearing 2 from the inner surface of the bearing 2 in the vicinity of the load-side gap; however, in this case, it cannot enter into the interior of the bearing 2 easily because it is blocked by the low-porosity plastic particle layer 9.

When the shaft 1 is rotated at a higher speed, the liquid lubricating oil 4 tends to go out from the outer surface of the bearing 2 due to the centrifugal force exerted on it; however, it cannot burst out of the bearing 2 easily because the outer peripheral portion of the bearing 2 is constructed by the low-porosity plastic particle layer 9. Furthermore, the liquid lubricating oil 4 which has exuded to the outer surface of the bearing is also held in the plural grooves 21 by the surface tension of the oil.

Thus, during rotation of the shaft 1 the liquid lubricating oil 4 continues to be supplied to the inner surface of the bearing 2 in the vicinity of the load-side gap without itself being consumed due to the dispersion of the oil to outside the bearing 2 while the oil is circulated within the interior of the bearing 2. Furthermore, the oil film can be easily formed between the shaft 1 and the inner surface of the bearing 2. Therefore, wearing and seizure of the bearing 2 can be prevented for a protracted period.

Next, the description will be directed to another embodiment of the present invention. Only the deference between this embodiment and the aforementioned embodiment shown in FIG. 46 will be described hereinafter. In the aforementioned embodiment shown in FIG. 46, the plastic particles 3 are made of ABS resin. Alternatively, they can be constructed of resin such as polyacetal (POM), polypropylene (PP), polyamide (PA), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE). When the plastic particles are made of such an alternative resin, the same advantages as those provided by the above-mentioned embodiment shown in FIG. 46 can be offered regardless of the thermal plasticity and thermohardening of the selected resin.

In the aforementioned embodiments shown in FIGS. 47 to 57, the particles in the low-porosity plastic particle layer 9 and high-porosity plastic particle layer 10 are made of ABS resin. Alternatively, they can also be constructed of resin such as polyacetal (POM), polypropylene (PP), polyamide (PA), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE). When the plastic particles are made of such an alternative resin, the same advantages as those provided by the above-mentioned embodiments shown in FIGS. 47 to 57 can be offered regardless of the thermal plasticity and thermohardening of the selected resin.

Next, the description will be directed to another embodiment of the present invention. Only the difference between this embodiment and the aforementioned embodiment shown in FIG. 46 will be explained hereinafter. As previously mentioned, in the aforementioned embodiment shown in FIG. 46, the bearing is in the form of an all-round bearing. On the other hand, the sliding bearing of this embodiment can be in the form of a dynamic pressure journal bearing such as a partial bearing as shown in FIG. 5, a combination of a floating bush and an outer bearing as shown in FIG. 6, a multi-lobe bearing as shown in FIG. 7, a tilting pad bearing as shown in FIG. 8, or a bearing provided with spiral grooves as shown in FIG. 9. In all cases, this embodiment can offer the same advantages as those provided by the aforementioned embodiment shown in FIG. 46. Furthermore, it is needless to say that the plastic particles 3 contained within the bearing can be constructed of resin such as polyacetal (POM), polypropylene (PP), polyamide (PA), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE).

Figure 58:
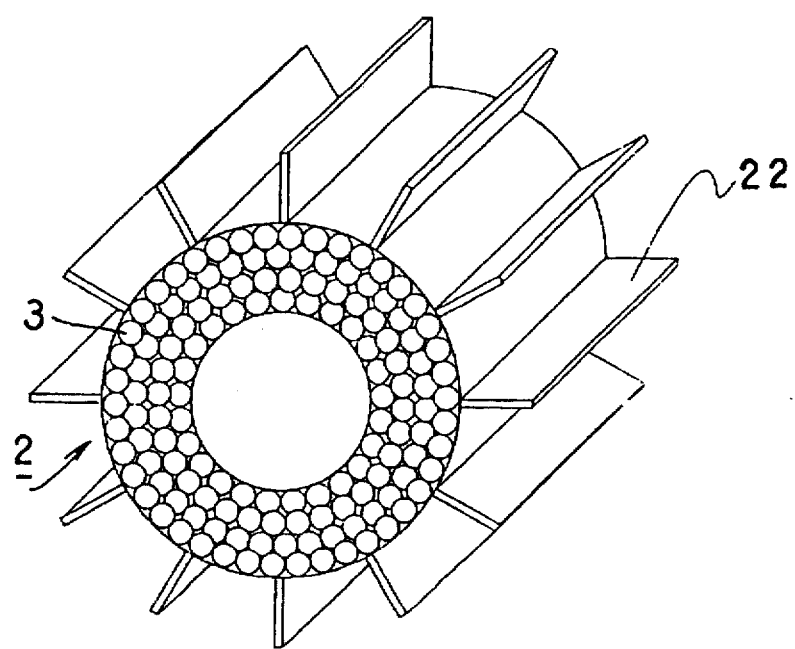
FIG. 58 as a cross-sectional view of a porous plastic bearing according to another embodiment of the present invention.

Referring now to FIG. 58, it illustrates a perspective view of a porous-plastic bearing according to another embodiment of the present invention. In the figure, reference numeral 22 denotes a radiating fin. The bearing 2 provided with a plurality of radiating fins 22 is constructed from a cluster of plastic particles 3. The plastic particles 3 are made of ABS resin.

When the shaft 1 is rotated, a negative pressure is produced in the gap 51 or in the vicinity of the gap 51, which is opposite to the load-side gap 52, between the shaft 1 and the inner surface of the bearing 2. As a result, the liquid lubricating oil 4 which has infiltrated within the bearing 2 exudes to the inner surface of the bearing 2 in the vicinity of the gap 51 and then flows toward the load-side region in the vicinity of the gap 52 where the distance between the inner surface of the sliding bearing 2 and the shaft 1 is the shortest. A positive pressure is therefore produced in the load-side region. Thus, any contact between the shaft 1 and the bearing 2 can be prevented and hence the frictional resistance between the shaft 1 and the bearing 2 can be reduced. Furthermore, the bearing can carry a radial force exerted by the shaft 1.

In general, the consumption of the liquid lubricating oil is accelerated by frictional heat produced in the load-side region in the vicinity of the load-side gap where the distance between the shaft 1 and the inner surface of the bearing as the shaft 1 is rotated. However, according to this embodiment, the plural radiating fins 22 arranged on the outer surface of the bearing 2 can dissipate the heat generated in the bearing 2 into the surroundings, and hence an increase in the temperature within the bearing 2 can be prevented. Therefore, the consumption of the liquid lubricating oil can be reduced.

Thus, during rotation of the shaft 1 the liquid lubricating oil 4 continues to be supplied to the inner surface of the bearing 2 in the vicinity of the load-side region for a protracted period while the oil is smoothly circulated within the interior of the bearing 2. Therefore, wearing and seizure of the bearing 2 can be prevented.

In order to hold the liquid lubricating oil 4 within the plastic bearing 2, there must exist a plurality of plastic particles in any longitudinal or cross section within the bearing 2. The liquid lubricating agent 4 is oil. Alternatively, the liquid lubricating agent 4 can be grease.

Figure 59:
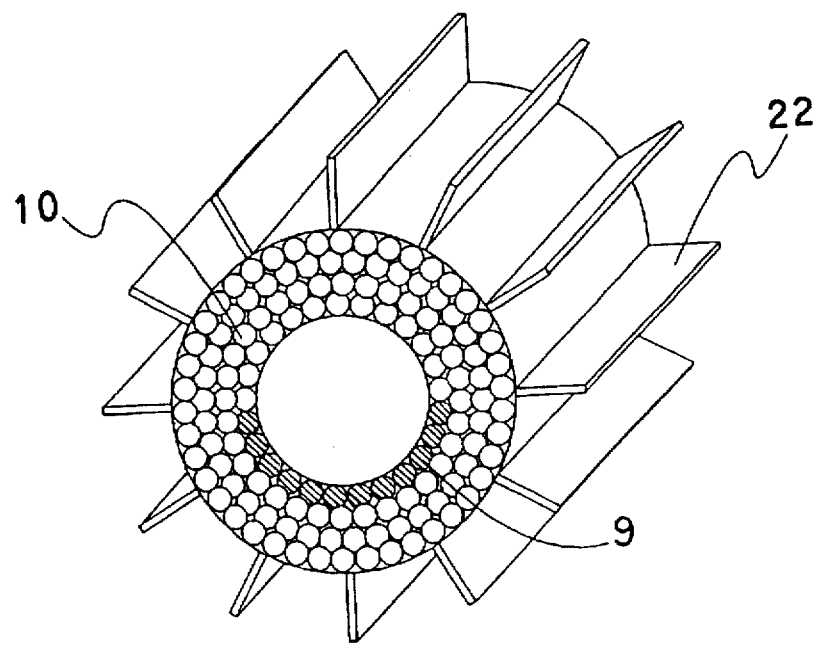
FIG. 59 as a cross-sectional view of a porous plastic bearing according to another embodiment of the present invention.

Referring now to FIG. 59, it illustrates a cross-sectional view of a porous-plastic bearing according to another embodiment of the present invention. Only the deference between this embodiment and the aforementioned embodiment shown in FIG. 58 will be described hereinafter.

In this embodiment, a low-porosity plastic particle layer 9 is disposed in the lower half of the inner peripheral portion of the bearing 2 having a plurality of radiating fins 22 arranged on the outer surface thereof and the other portion of the bearing is constructed by a high-porosity plastic particle layer 10.

Therefore, according to this embodiment, the plural radiating fins 22 arranged on the outer surface of the bearing 2 can dissipate the heat generated in the bearing 2 into the surroundings, and therefore an increase in the temperature within the bearing 2 can be prevented. Furthermore, the liquid lubricating oil 4 which has exuded tends to enter into the interior of the bearing 2 from the inner surface of the bearing 2; however, in this case, it cannot enter into the interior of the bearing 2 easily because it is blocked by the low-porosity plastic particle layer 9 in the lower half of the inner peripheral portion of the bearing. Therefore, the oil film formed between the shaft 1 and the inner surface of the bearing 2 can be retained easily and hence wearing and seizure of the bearing 2 can be prevented more effectively.

Figure 60:
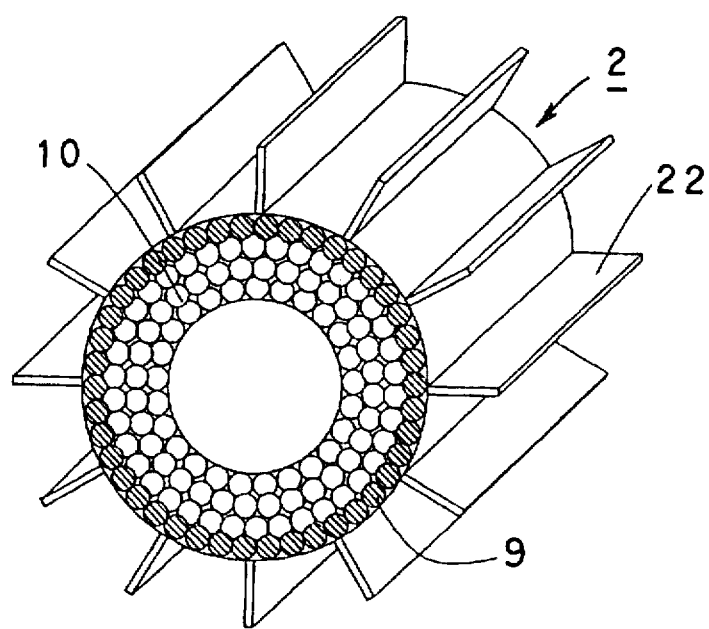
FIG. 60 as a cross-sectional view of a porous plastic bearing according to another embodiment of the present invention.

Referring now to FIG. 60, it illustrates a cross-sectional view of a porous-plastic bearing according to another embodiment of the present invention. Only the deference between this embodiment and the aforementioned embodiment shown in FIG. 58 will be described hereinafter.

In this embodiment, a low-porosity plastic particle layer 9 is disposed in all the outer peripheral portion of the bearing 2 having a plurality of radiating fins 22 arranged on the outer surface thereof and the other portion of the bearing is constructed by a high-porosity plastic particle layer 10.

Therefore, according to this embodiment, the liquid lubricating oil 4 which tends to go out from the outer surface of the bearing 2, for example, when the shaft 1 is rotated at a higher speed, can be prevented by the low-porosity plastic particle layer 9. Furthermore, the plural radiating fins 22 can dissipate the heat generated in the bearing 2 into the surroundings, and therefore an increase in the temperature within the bearing 2 can be prevented.

Figure 61:
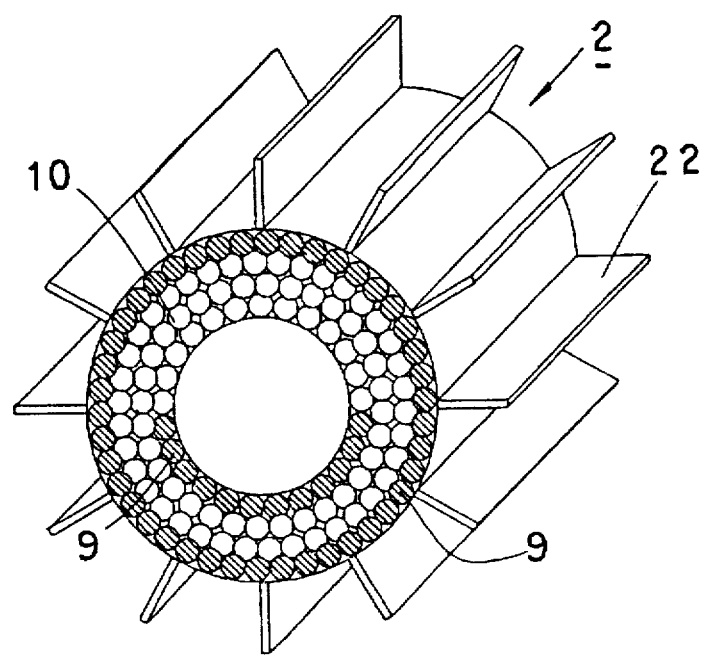
FIG. 61 as a cross-sectional view of a porous plastic bearing according to another embodiment of the present invention.

Referring now to FIG. 61, it illustrates a cross-sectional view of a porous-plastic bearing according to another embodiment of the present invention. Only the deference between this embodiment and the aforementioned embodiment shown in FIG. 58 will be described hereinafter.

In this embodiment, a low-porosity plastic particle layer 9 is disposed in both of all the outer peripheral portion of the bearing 2 having a plurality of radiating fins 22 arranged on the outer surface thereof and the lower half of the inner peripheral portion of the bearing. Furthermore, the other portion of the bearing is constructed by a high-porosity plastic particle layer 10.

Therefore, according to this embodiment, the liquid lubricating oil 4 which has exuded tends to enter into the interior of the bearing 2 from the inner surface of the bearing 2; however, in this case, it cannot enter into the interior of the bearing 2 easily because it is blocked by the low-porosity plastic particle layer 9 in the lower half of the inner peripheral portion of the bearing. Furthermore, the liquid lubricating oil 4 which tends to go out from the outer surface of the bearing 2, for example, when the shaft 1 is rotated at a higher speed, can be prevented by the low-porosity plastic particle layer 9. In addition, the plural radiating fins 22 can dissipate the heat generated in the bearing 2 into the surroundings, and therefore an increase in the temperature within the bearing 2 can be prevented.

Figure 62:
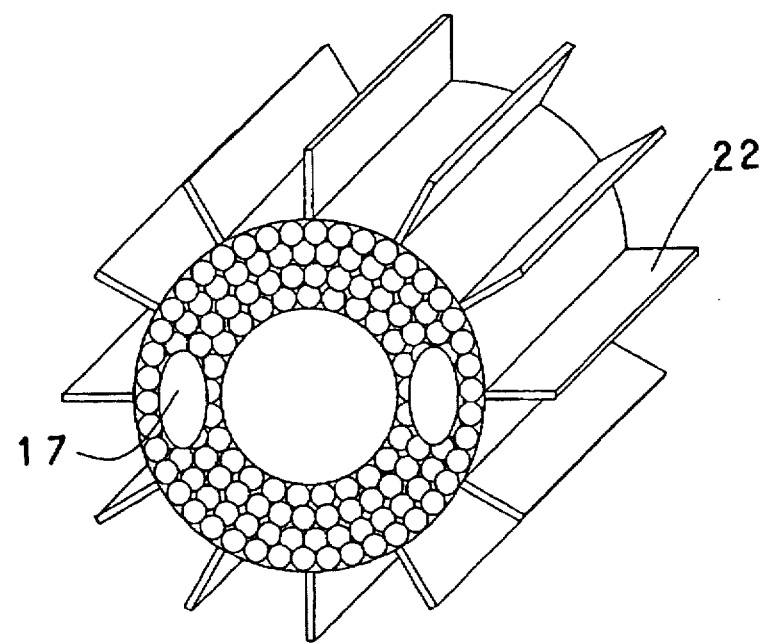
FIG. 62 is a cross-sectional view of a porous plastic bearing according to another embodiment of the present invention.

Referring now to FIG. 62, it illustrates a cross-sectional view of a porous-plastic bearing according to another embodiment of the present invention. Only the deference between this embodiment and the aforementioned embodiment shown in FIG. 58 will be described hereinafter.

In this embodiment, there are provided cavities 17 within a layer having a plurality of plastic particles 3 in the bearing 2 having a plurality of radiating fins 22 arranged on the outer surface thereof.

Therefore, according to this embodiment, the plural radiating fins 22 can dissipate the heat generated in the bearing 2 into the surroundings, and therefore an increase in the temperature within the bearing 2 can be prevented. Furthermore, since the cavities 17 are filled with the liquid lubricating oil 4, the oil content which is the ratio of the volume of the liquid lubricating oil 4 to the volume of the bearing is increased. It is therefore possible to continue to supply the inner surface of the bearing 2 in the vicinity of the load-side gap with the liquid lubricating oil 4 for a protracted period.

Figure 63:
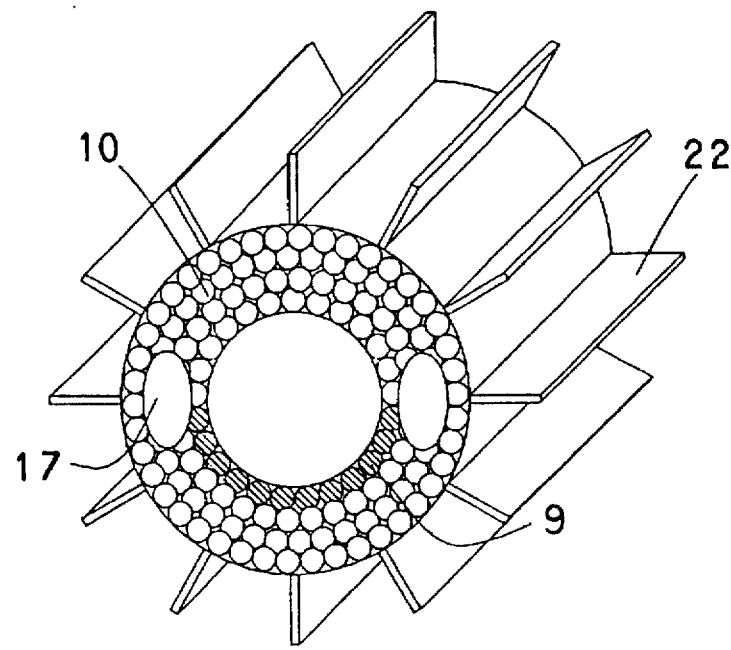
FIG. 63 is a cross-sectional view of a porous plastic bearing according to another embodiment of the present invention.

Referring now to FIG. 63, it illustrates a cross-sectional view of a porous-plastic bearing according to another embodiment of the present invention. Only the deference between this embodiment and the aforementioned embodiment shown in FIG. 62 will be described hereinafter.

In this embodiment, a low-porosity plastic particle layer 9 is disposed in the lower half of the inner peripheral portion of the bearing 2 having a plurality of radiating fins 22 arranged on the outer surface thereof and the other portion of the bearing is constructed by a high-porosity plastic particle layer 10.

Therefore, according to this embodiment, the liquid lubricating oil 4 which has exuded tends to enter into the interior of the bearing 2 from the inner surface of the bearing 2; however, it cannot enter into the interior of the bearing 2 easily because it is blocked by the low-porosity plastic particle layer 9 in the lower half of the inner peripheral portion of the bearing 2. Furthermore, the plural radiating fins 22 arranged on the outer surface of the bearing 2 can dissipate the heat generated in the bearing 2 into the surroundings, and therefore an increase in the temperature within the bearing 2 can be prevented. In addition, since the cavities 17 are filled with the liquid lubricating oil 4, the oil content which is the ratio of the volume of the liquid lubricating oil 4 to the volume of the bearing is increased. It is therefore possible to continue to supply the inner surface of the bearing 2 in the vicinity of the load-side gap with the liquid lubricating oil 4 for a protracted period.

Figure 64:
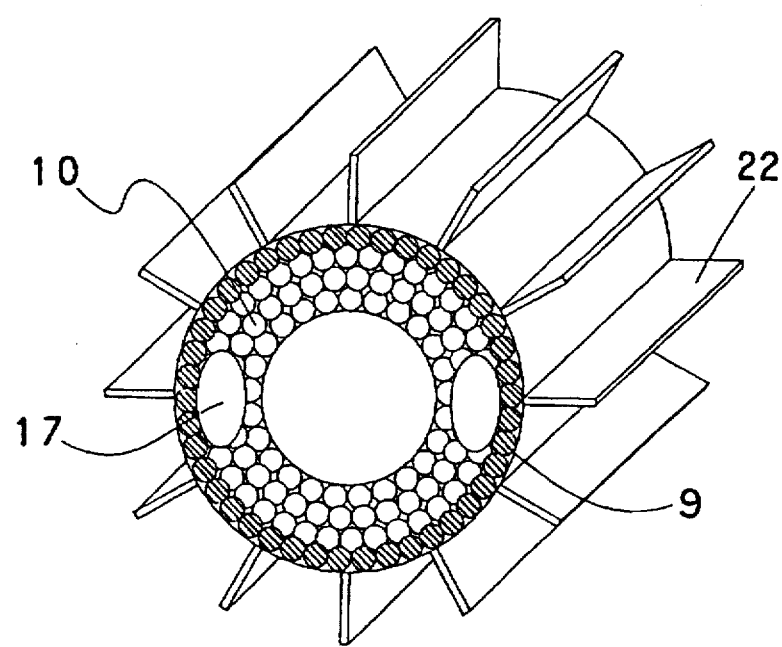
FIG. 64 is a cross-sectional view of a porous plastic bearing according to another embodiment of the present invention.

Referring now to FIG. 64, it illustrates a cross-sectional view of a porous-plastic bearing according to another embodiment of the present invention. Only the deference between this embodiment and the aforementioned embodiment shown in FIG. 62 will be described hereinafter.

In this embodiment, a low-porosity plastic particle layer 9 is disposed in all the outer peripheral portion of the bearing 2 having a plurality of radiating fins 22 arranged on the outer surface thereof and the other portion of the bearing is constructed by a high-porosity plastic particle layer 10.

Therefore, according to this embodiment, the liquid lubricating oil 4 which tends to go out from the outer surface of the bearing 2 when the shaft 1 is rotated at a higher speed can be prevented by the low-porosity plastic particle layer 9. Furthermore, the plural radiating fins 22 can dissipate the heat generated in the bearing 2 into the surroundings, and therefore an increase in the temperature within the bearing 2 can be prevented. In addition, since the cavities 17 are filled with the liquid lubricating oil 4, the oil content which is the ratio of the volume of the liquid lubricating oil 4 to the volume of the bearing is increased. It is therefore possible to continue to supply the inner surface of the bearing 2 in the vicinity of the load-side gap with the liquid lubricating oil 4 for a protracted period.

Figure 65:
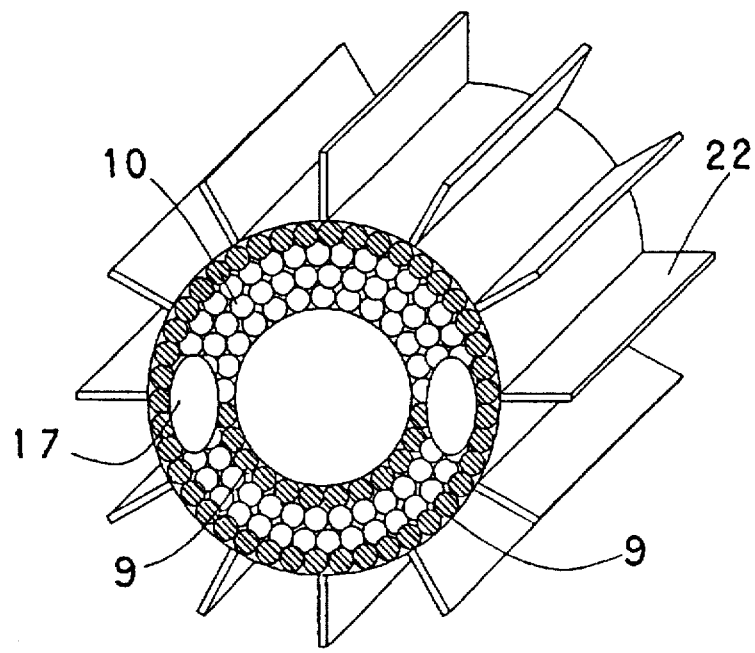
FIG. 65 as a cross-sectional view of a porous plastic bearing according to another embodiment of the present invention.

Referring now to FIG. 65, it illustrates a cross-sectional view of a porous-plastic bearing according to another embodiment of the present invention. Only the deference between this embodiment and the aforementioned embodiment shown in FIG. 64 will be described hereinafter.

In this embodiment, another low-porosity plastic particle layer 9 is also disposed in the lower half of the inner peripheral portion of the bearing 2 having a plurality of radiating fins 22 arranged on the outer surface thereof. Furthermore, the other portion of the bearing is the same as that of the bearing according to the aforementioned embodiment shown in FIG. 64.

Therefore, according to this embodiment, the liquid lubricating oil 4 which has exuded to the inner surface of the bearing 2 tends to enter into the interior of the bearing 2; however, it cannot enter into the interior of the bearing 2 easily because it is blocked by the low-porosity plastic particle layer 9 in the lower half of the inner peripheral portion of the bearing 2. On the other hand, the liquid lubricating oil 4 which tends to go out from the outer surface of the bearing 2 when the shaft 1 is rotated at a higher speed can be prevented by the other low-porosity plastic particle layer 9. Furthermore, the plural radiating fins 22 can dissipate the heat generated in the bearing 2 into the surroundings, and therefore an increase in the temperature within the bearing 2 can be prevented. In addition, since the cavities 17 are filled with the liquid lubricating oil 4, the oil content which is the ratio of the volume of the liquid lubricating oil 4 to the volume of the bearing is increased. It is therefore possible to continue to supply the inner surface of the bearing 2 in the vicinity of the load-side gap with the liquid lubricating oil 4 for a protracted period.

Figure 66:
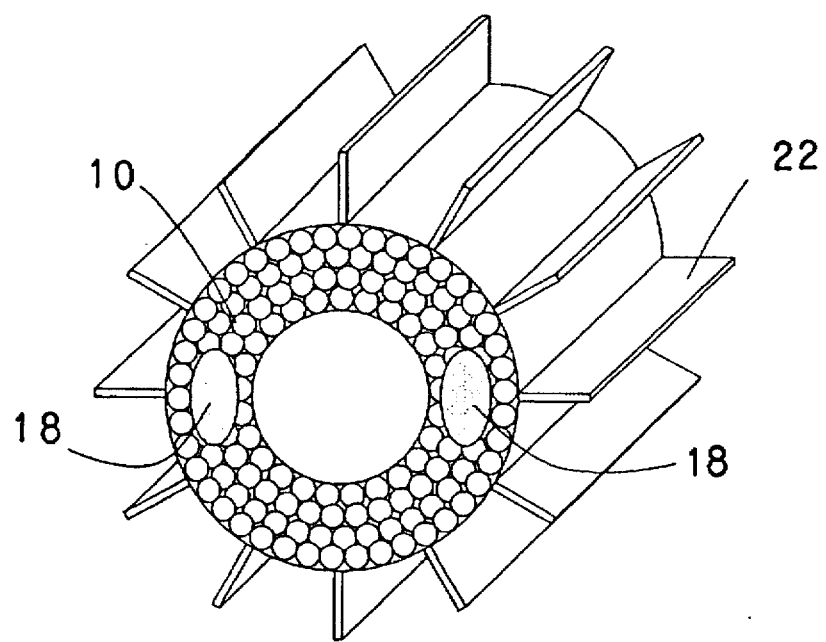
FIG. 66 is a cross-sectional view of a porous plastic bearing according to another embodiment of the present invention.

Referring now to FIG. 66, it illustrates a cross-sectional view of a porous-plastic bearing according to another embodiment of the present invention. Only the deference between this embodiment and the aforementioned embodiment shown in FIG. 62 will be described hereinafter.

In this embodiment, oil holding members 18 are respectively inserted into cavities 17 formed among a cluster of plastic particles 3 within the bearing 2 having a plurality of radiating fins 22 arranged on the outer surface thereof. The other portion of the bearing is the same as that of the bearing according to the aforementioned embodiment shown in FIG. 62.

In accordance with this embodiment, since the liquid lubricating oil 4 infiltrates into the oil holding members 18 in the cavities 17 and it is held in the oil holding members 18, the oil content which is the ratio of the volume of the liquid lubricating oil 4 to the volume of the bearing is further increased. Furthermore, the plural radiating fins 22 can dissipate the heat generated in the bearing 2 into the surroundings, and therefore an increase in the temperature within the bearing 2 can be prevented. It is therefore possible to continue to supply the inner surface of the bearing 2 in the vicinity of the load-side gap with the liquid lubricating oil 4 for a protracted period.

In order to hold the liquid lubricating oil 4 within the plastic bearing 2, there must exist a plurality of plastic particles in any longitudinal or cross section within the bearing 2. The liquid lubricating agent 4 is oil. Alternatively, the liquid lubricating agent 4 can be grease.

Figure 67:
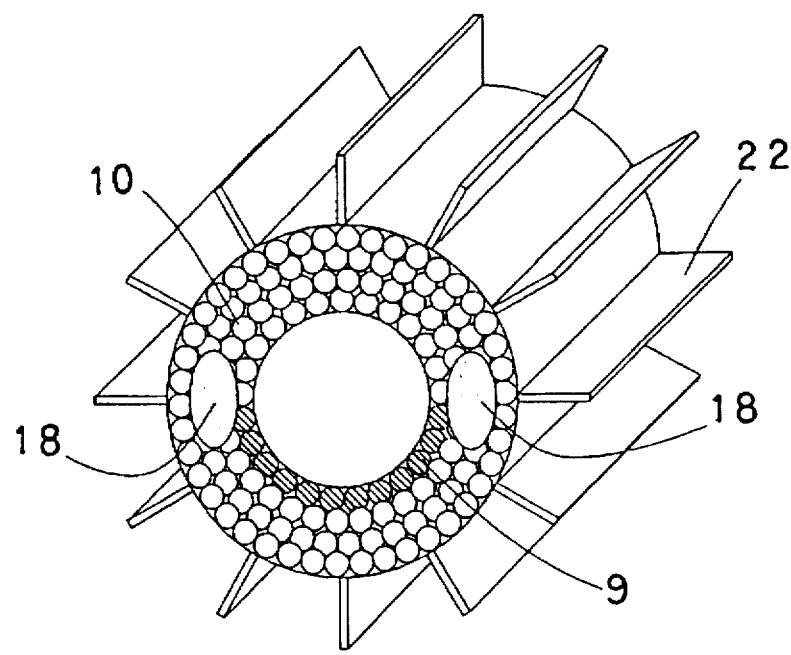
FIG. 67 as a cross-sectional view of a porous plastic bearing according to another embodiment of the present invention.

Referring now to FIG. 67, it illustrates a cross-sectional view of a porous-plastic bearing according to another embodiment of the present invention. Only the deference between this embodiment and the aforementioned embodiment shown in FIG. 66 will be described hereinafter.

In this embodiment, a low-porosity plastic particle layer 9 is disposed in the lower-half of the inner peripheral portion of the bearing 2 having a plurality of radiating fins 22 arranged on the outer surface thereof and the other portion of the bearing is constructed by a high-porosity plastic particle layer 10.

Therefore, according to this embodiment, the liquid lubricating oil 4 which has exuded to the inner surface of the bearing 2 tends to enter into the interior of the bearing 2; however, it cannot enter into the interior of the bearing 2 easily because it is blocked by the low-porosity plastic particle layer 9 in the lower half of the inner peripheral portion of the bearing 2.

Furthermore, since the liquid lubricating oil 4 infiltrates into the oil holding members 18 in the cavities 17 and it is held in the oil holding members 18, the oil content which is the ratio of the volume of the liquid lubricating oil 4 to the volume of the bearing is further increased. In addition, the plural radiating fins 22 arranged on the outer surface of the bearing 2 can dissipate the heat generated in the bearing 2 into the surroundings, and therefore an increase in the temperature within the bearing 2 can be prevented. It is therefore possible to continue to supply the inner surface of the bearing 2 in the vicinity of the load-side gap with the liquid lubricating oil 4 for a protracted period.

Figure 68:
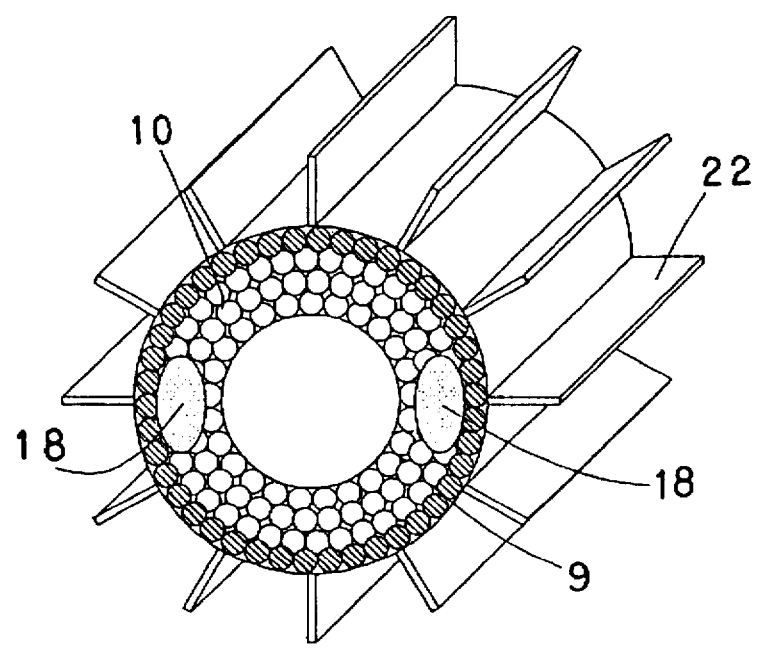
FIG. 68 as a cross-sectional view of a porous plastic bearing according to another embodiment of the present invention.

Referring now to FIG. 68, it illustrates a cross-sectional view of a porous-plastic bearing according to another embodiment of the present invention. Only the deference between this embodiment and the aforementioned embodiment shown in FIG. 66 will be described hereinafter.

In this embodiment, a low-porosity plastic particle layer 9 is disposed in all the outer peripheral portion of the bearing 2 having a plurality of radiating fins 22 arranged on the outer surface thereof and the other portion of the bearing is constructed by a high-porosity plastic particle layer 10.

Therefore, according to this embodiment, the liquid lubricating oil 4 which tends to go out from the outer surface of the bearing 2, for example, when the shaft 1 is rotated at a higher speed can be prevented by the low-porosity plastic particle layer 9. Furthermore, the plural radiating fins 22 can dissipate the heat generated in the bearing 2 into the surroundings, and therefore an increase in the temperature within the bearing 2 can be prevented. In addition, the oil holding members 18 inserted into the cavities 17 increase the content of the lubricating oil.

Thus, during rotation of the shaft 1 the liquid lubricating oil 4 continues to be supplied to the inner surface of the bearing 2 in the vicinity of the load-side gap without itself being consumed due to the dispersion of the oil to outside the bearing 2 while the oil is circulated within the interior of the bearing 2. Therefore, wearing and seizure of the bearing 2 can be prevented for a protracted period.

Figure 69:
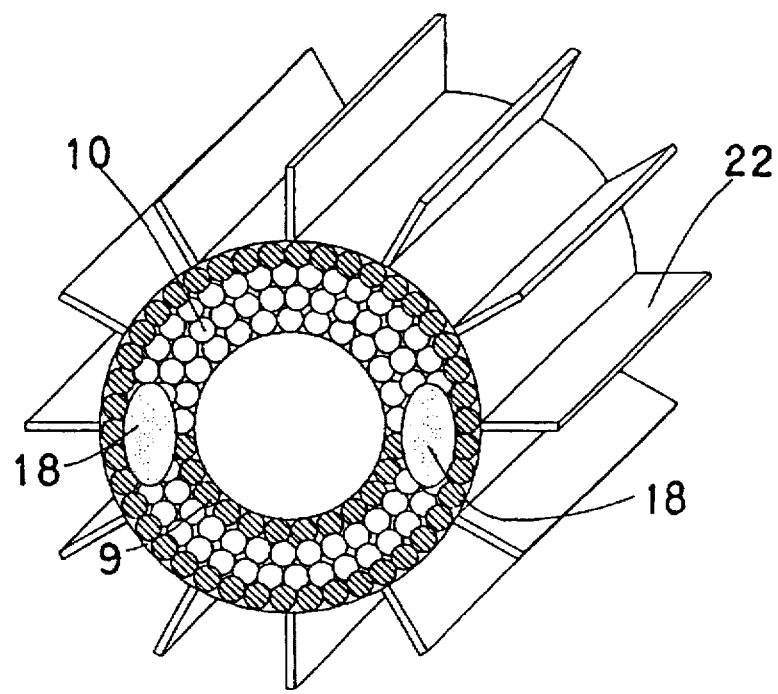
FIG. 69 as a cross-sectional view of a porous plastic bearing according to another embodiment of the present invention.

Referring now to FIG. 69, it illustrates a cross-sectional view of a porous-plastic bearing according to another embodiment of the present invention. Only the deference between this embodiment and the aforementioned embodiment shown in FIG. 68 will be described hereinafter.

In this embodiment, another low-porosity plastic particle layer 9 is also disposed in the lower half of the inner peripheral portion of the bearing 2 having a plurality of radiating fins 22 arranged on the outer surface thereof. Furthermore, the other portion of the bearing is the same as that of the bearing according to the aforementioned embodiment shown in FIG. 68.

According to this embodiment, the liquid lubricating oil 4 which has exuded to the inner surface of the bearing 2 tends to enter into the interior of the bearing 2; however, it cannot enter into the interior of the bearing 2 easily because it is blocked by the low-porosity plastic particle layer 9 in the lower half of the inner peripheral portion of the bearing 2. The other operation and advantages according to this embodiment are the same as those according to the aforementioned embodiment shown in FIG. 68.

Next, the description will be directed to another embodiment of the present invention. Only the deference between this embodiment and the aforementioned embodiment shown in FIG. 58 will be described hereinafter. In the aforementioned embodiment shown in FIG. 58, the plastic particles 3 are made of ABS resin. Alternatively, they can be constructed of resin such as polyacetal (POM), polypropylene (PP), polyamide (PA), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE). When the plastic particles are made of such an alternative resin, the same advantages as those provided by the above-mentioned embodiment shown in FIG. 58 can be offered regardless of the thermal plasticity and thermohardening of the selected resin.

In the aforementioned embodiments shown in FIGS. 59 to 69, the low-porosity plastic particles in the layer 9 and high-porosity plastic particles in the layer 10 are made of ABS resin. Alternatively, they can be constructed of resin such as polyacetal (POM), polypropylene (PP), polyamide (PA), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE). When the plastic particles are made of such an alternative resin, the same advantages as those provided by the above-mentioned embodiments shown in FIGS. 59 to 69 can be offered regardless of the thermal plasticity and thermohardening of the selected resin.

Next, the description will be directed to another embodiment of the present invention. Only the difference between this embodiment and the aforementioned embodiment shown in FIG. 58 will be explained hereinafter. As previously mentioned, in the aforementioned embodiment shown in FIG. 58, the bearing is in the form of an all-round bearing. On the other hand, the sliding bearing of this embodiment can be in the form of a dynamic pressure journal bearing such as a partial bearing as shown in FIG. 5, a combination of a floating bush and an outer bearing as shown in FIG. 6, a multi-lobe bearing as shown in FIG. 7, a tilting pad bearing as shown in FIG. 8, or a bearing provided with spiral grooves as shown in FIG. 9. In all cases, this embodiment can offer the same advantages as those provided by the aforementioned embodiment shown in FIG. 58.

Figure 70:
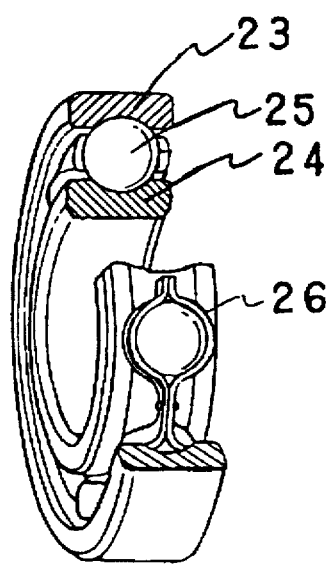
FIG. 70 is a perspective view, partially in section, of a porous-plastic bearing according to another embodiment of the present invention.

Referring now to FIG. 70, it illustrates a perspective view, partially in section, of a porous-plastic bearing according to another embodiment of the present invention. In the figure, reference numeral 23 denotes an outer ring member, and 24 denotes an inner ring member. The combination of the outer ring member 23 and inner ring member 24 is referred to as a bearing ring. Furthermore, reference numeral 25 denotes a ball referred to as a rolling element, and 26 denotes a ball holder constructed from a porous plastic material made of ABS resin. Like the bearing 2 mentioned above, the ball holder 26 is constructed by a porous plastic material which is impregnated with a liquid lubricating agent.

The plural balls 25 are held in the ball holder 26 made of a porous plastic material which is impregnated with a liquid lubricating agent so that they are not brought into contact with each other. The balls 25 pivot between the outer ring member 23 and the inner ring member 24, thereby reducing the frictional resistance. Since the ball holder 26 made of porous plastic is impregnated with a liquid lubricating oil, the liquid lubricating oil exudes from the porous-plastic ball holder 26 to where the balls are in contact with the outer ring member and the balls are in contact with the inner ring member, whereby the wearing away of the balls, inner and outer ring members, and holder can be prevented and hence the longevity of the bearing is increased.

Next, the description will be directed to another embodiment of the present invention. Only the deference between this embodiment and the aforementioned embodiment shown in FIG. 70 will be described hereinafter. In the aforementioned embodiment shown in FIG. 70, the porous-plastic holder 26 impregnated with a liquid lubricating oil is made of ABS resin. Alternatively, the holder can be constructed of resin such as polyacetal (POM), polypropylene (PP), polyamide (PA), polyimide (PI), polyethylene (PE), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE). It is needless to say that the same advantages as those provided by the above-mentioned embodiment shown in FIG. 70 can be offered when the holder is made of such an alternative resin.

Figure 71:
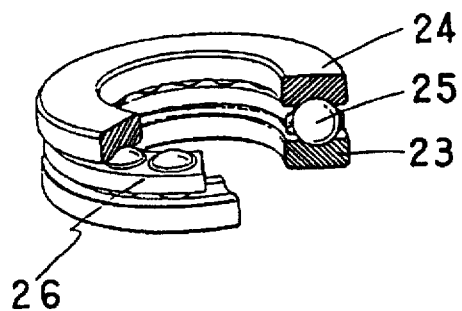
FIG. 71 is a perspective view, partially in section, of a porous-plastic bearing according to another embodiment of the present invention.

Referring now to FIG. 71, it illustrates a perspective view, partially in section, of a porous-plastic bearing according to another embodiment of the present invention. Only the deference between this embodiment and the aforementioned embodiment shown in FIG. 70 will be described hereinafter. In the aforementioned embodiment, as shown in FIG. 70, the bearing is in the form of a radial bearing. On the contrary, the bearing according to this embodiment is in the form of a thrust bearing. The same advantages as those provided by the aforementioned embodiment shown in FIG. 70 can be offered.

Like the aforementioned embodiment shown in FIG. 70, the porous-plastic holder 26 impregnated with a liquid lubricating oil can be made of ABS resin. Alternatively, the porous-plastic holder 26 impregnated with a liquid lubricating oil can be constructed of resin such as polyacetal (POM), polypropylene (PP), polyamide (PA), polyimide (PI), polyethylene (PE), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE). It is needless to say that the same advantages as those provided by the above-mentioned embodiment shown in FIG. 70 can be offered when the holder is made of such an alternative resin.

Figure 72:
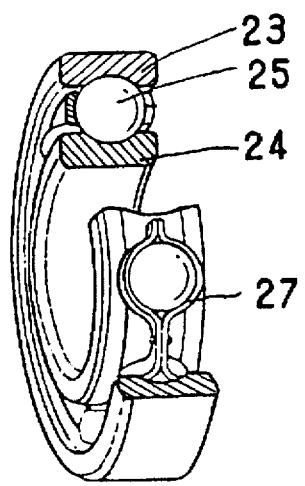
FIG. 72 is a perspective view, partially in section, of a porous-plastic bearing according to another embodiment of the present invention.

Referring now to FIG. 72, it illustrates a perspective view, partially in section, of a porous-plastic bearing according to another embodiment of the present invention. In the figure, reference numeral 23 denotes an outer ring member, and 24 denotes an inner ring member. The combination of the outer ring member 23 and inner ring member 24 is referred to as a bearing ring. Furthermore, reference numeral 25 denotes a ball referred to as a rolling element, and 27 denotes a ball holder constructed from a porous plastic material made of ABS resin, which is impregnated with a solid lubricating agent.

The plural balls 25 are held in the ball holder 27 made of a porous plastic material which is impregnated with a solid lubricating agent so that they are not brought into contact with each other. The balls 25 pivot between the outer ring member 23 and the inner ring member 24, thereby reducing the frictional resistance. Since the ball holder 27 made of porous plastic is impregnated with a solid lubricating agent, the solid lubricating agent exudes to where the balls are in contact with the outer ring member and the balls are in contact with the inner ring member as the holder wears out, whereby the wearing away of the balls, inner and outer ring members, and holder can be prevented and hence the longevity of the bearing is increased.

Next, the description will be directed to another embodiment of the present invention. Only the deference between this embodiment and the aforementioned embodiment shown in FIG. 72 will be described hereinafter. In the aforementioned embodiment shown in FIG. 72, the porous-plastic holder 27 impregnated with a solid lubricating agent is made of ABS resin. Alternatively, the holder can be constructed of resin such as polyacetal (POM), polypropylene (PP), polyamide (PA), polyimide (PI), polyethylene (PE), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE). It is needless to say that the same advantages as those provided by the above-mentioned embodiment shown in FIG. 72 can be offered when the holder is made of such an alternative resin.

Figure 73:
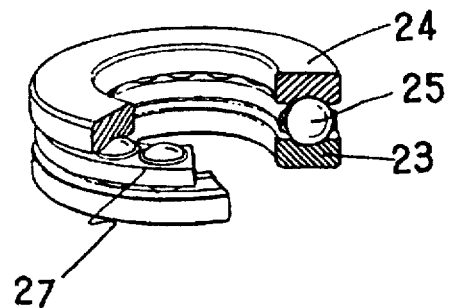
FIG. 73 is a perspective view, partially in section, of a porous-plastic bearing according to another embodiment of the present invention.

Referring now to FIG. 73, it illustrates a perspective view, partially in section, of a porous-plastic bearing according to another embodiment of the present invention. Only the deference between this embodiment and the aforementioned embodiment shown in FIG. 72 will be described hereinafter. In the aforementioned embodiment, as shown in FIG. 72, the bearing is in the form of a radial bearing. On the contrary, the bearing according to this embodiment is in the form of a thrust bearing. The same advantages as those provided by the aforementioned embodiment shown in FIG. 72 can be offered.

Like the aforementioned embodiment shown in FIG. 72, the porous-plastic holder 27 impregnated with a solid lubricating agent can be made of ABS resin. Alternatively, the porous-plastic holder 27 impregnated with a solid lubricating agent can be constructed of resin such as polyacetal (POM), polypropylene (PP), polyamide (PA), polyimide (PI), polyethylene (PE), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE). It is needless to say that when the holder is made of such an alternative resin, the same advantages as those provided by the above-mentioned embodiment shown in FIG. 72 can be offered regardless of the thermal plasticity and thermohardening of an alternative resin.

Figure 74:
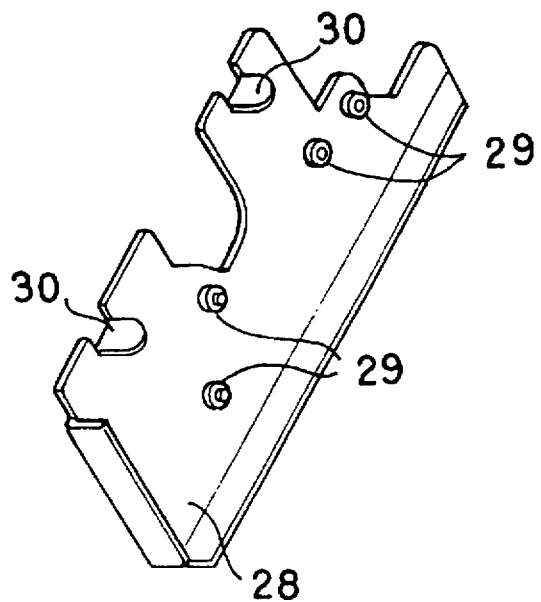
FIG. 74 is a perspective view of a porous-plastic bearing apparatus according to another embodiment of the present invention.

Referring now to FIG. 74, it illustrates a perspective view of a cabinet or box including a plurality of porous-plastic bearings according to one embodiment of the present invention. In the figure, reference numeral 28 denotes a molded cabinet or box made of plastic, 29 denotes a sliding bearing member for supporting rotational movements, and 30 denotes a bearing member for supporting to-and-fro movements. The manufacture of the box is conducted as follows: after the bearing members 29 and 30 for supporting rotational movements and to-and-fro movements and housing 28 are molded in one piece using a cluster of plastic particles, the bearing members 29 and 30 are impregnated with lubricating oil. The plastic particles are made of ABS resin. It should be noted that the supporting member of the present invention integrally molded together with a plurality of bearing members for supporting the plural bearing members is not limited to a cabinet or box and it can be a bearing housing, a casing for enclosing a fan, or the like.

The structure of the bearing members 29 is the same as any one of those of the bearings according to the aforementioned embodiments shown in FIGS. 1 to 73. Next, the description will be made as to other parts except the bearing members.

Figure 75:
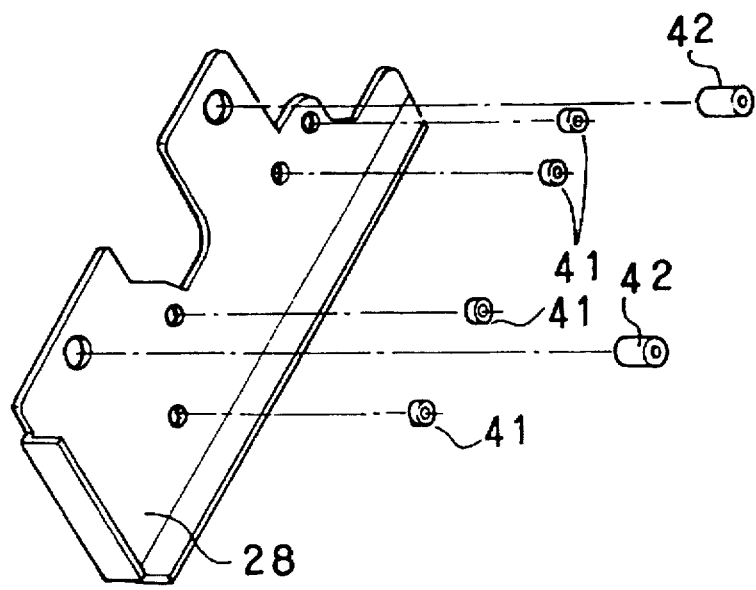
FIG. 75 is a perspective view of a prior art porous-plastic bearing apparatus.

FIG. 75 shows a perspective view of a conventional housing including typical prior art bearings for comparison with the box shown in FIG. 74. In the figure, reference numeral 41 denotes a ball bearing mounted on the box 28 molded of plastic, and 42 denotes a linear ball bearing which is also mounted on the box 28. Bearing housings are needed for assembling these components and hence many assembling processes must be undergone. As a result, the assembling cost is increased. Furthermore, the ball bearings are expensive.

On the other hand, the bearing apparatus of the aforementioned embodiment shown in FIG. 74 has an integrally molded supporting member such as a cabinet or a box, a bearing housing, or the like. Therefore, the assembling cost can be reduced. Furthermore, since the bearing apparatus needs no expensive ball bearing, the parts cost of the bearing apparatus can be reduced.

Next, the description will be directed to another embodiment of the present invention. Only the deference between this embodiment and the aforementioned embodiment shown in FIG. 74 will be described hereinafter. In the aforementioned embodiment shown in FIG. 74, the plastic particles are made of ABS resin. Alternatively, they can be constructed of resin such as polyacetal (POM), polypropylene (PP), polyamide (PA), polyimide (PI), polyethylene (PE), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE). It is needless to say that the same advantages can be offered when the plastic particles are made of such an alternative resin.

Figure 76:
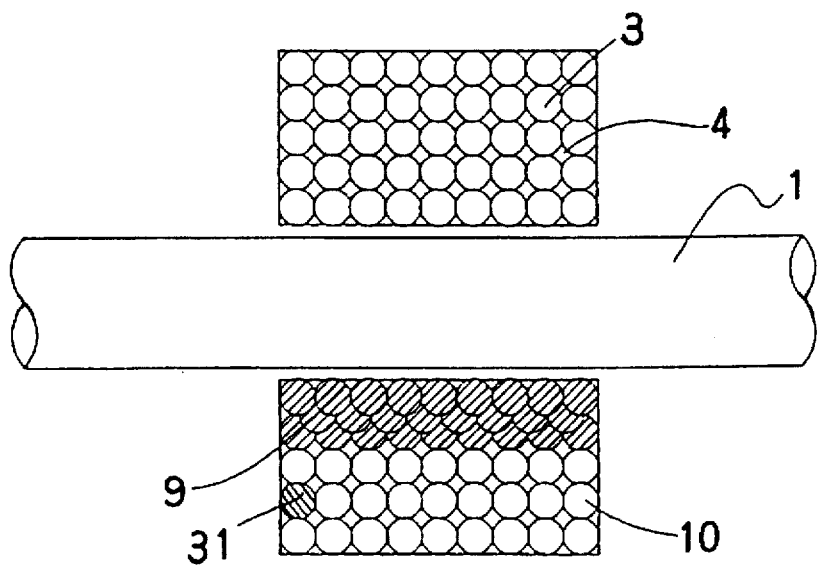
FIG. 76 is a cross-sectional view of a porous plastic bearing according to another embodiment of the present invention.
Figure 77:
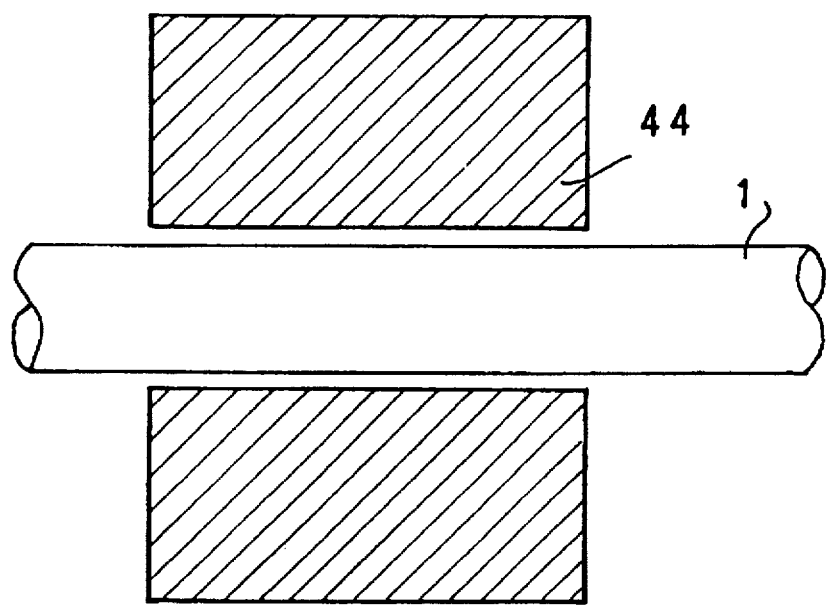
FIG. 77 is a cross-sectional view of a prior art plastic bearing.
Figure 78:
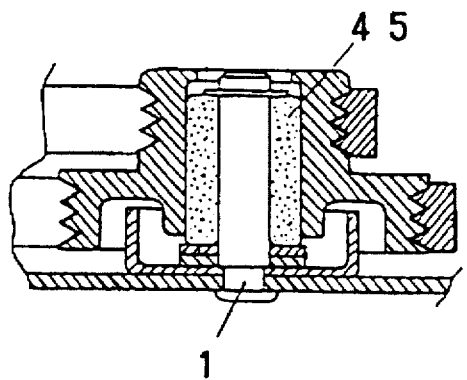
FIG. 78 is a cross-sectional view of a prior art metallic porous sliding bearing.
Figure 79:
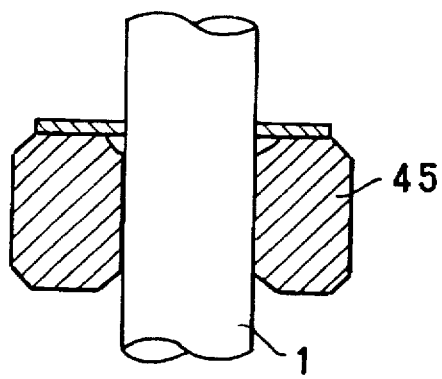
FIG. 79 is a cross-sectional view of a prior art metallic porous sliding bearing.
Figure 80:
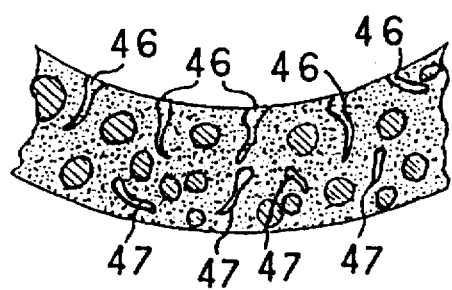
FIG. 80 is a cross-sectional view of a prior art porous-plastic sliding bearing.
Figure 81:
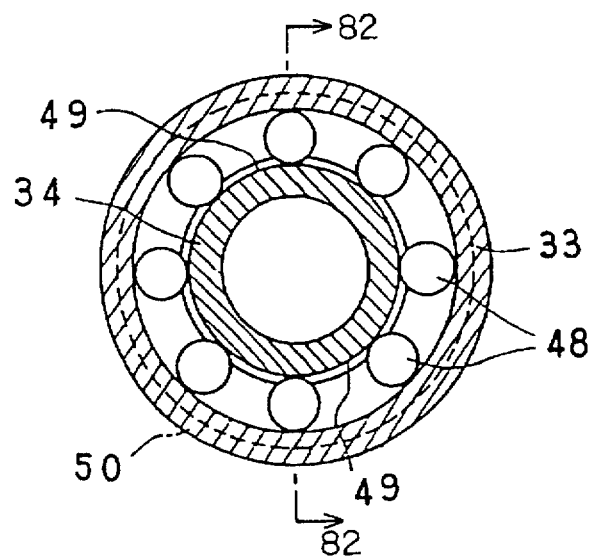
FIG. 81 is a cross-sectional view of a prior art oilless rolling bearing.
Figure 82:
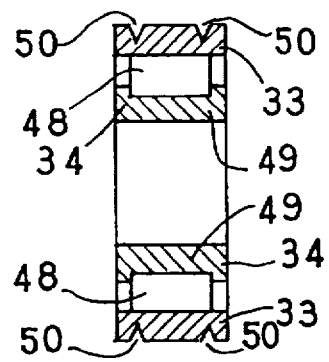
FIG. 82 is a cross-sectional view taken along the line 82—82 of FIG. 81.
Figure 83:
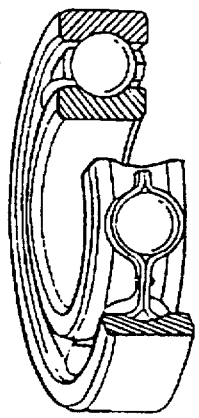
FIG. 83 is a perspective view, partially in section, of a prior art rolling bearing used widely.

Referring now to FIG. 76, it illustrates a cross-sectional view of a porous-plastic bearing according to another embodiment of the present invention. In the figure, reference numeral 31 denotes a recess disposed as a marker on one end surface of the bearing 2.

In the sliding bearing 2 according to this embodiment, the recess 31 is disposed, as a marker, on either one of lines obtained by projection of a perpendicular line, which is running from the approximate center of the low-porosity plastic particle layer 9 within the bearing to the point of intersection of the perpendicular from the central point to the bearing axis, on both end surfaces of the sliding bearing. The porous plastic bearing can carry a load thereon by means of the low-porosity plastic particle layer 9 in the inner peripheral portion of the bearing. The loaded portion of the bearing 2 can be identified from the exterior of the bearing. Therefore, the installation of the bearing can be conducted easily. The marker 31 can be a flange or a projection, or anything if it can mark the position of the low-porosity particle layer, instead of a recess.

Next, the description will be directed to another embodiment of the present invention. Only the deference between this embodiment and the aforementioned embodiment shown in FIG. 76 will be described hereinafter. In the aforementioned embodiment shown in FIG. 76, there is provided the recess 31 as a marker on one end surface of the bearing. Alternatively, there can be provided a recess, as a marker, on a line on the lateral outer surface of the bearing member, which lies between the intersections of the above-mentioned lines obtained by projection of a perpendicular line, which is running from the approximate center of the low-porosity plastic particle layer 9 within the bearing to the point of intersection of the perpendicular from the central point to the bearing axis, on both end surfaces of the sliding bearing, and the edges of the end surfaces of the bearing. It is needless to say that this variant can offer the same advantages.

It is also needless to say that the marker 31 can be a flange or a projection, or anything if it can mark the position of the low-porosity particle layer, instead of a recess.

As previously mentioned, in accordance with a preferred embodiment of the present invention, there is provided a porous-plastic bearing constructed from a cluster of lightweight plastic particles, in which there exists a lubricating agent between a shaft and the bearing. Therefore, the bearing of this embodiment is lightweight. Furthermore, the frictional resistance of the bearing can be reduced and hence wear and seizure rarely occur in the bearing.

In accordance with another preferred embodiment of the present invention, there is provided a porous-plastic bearing constructed from a cluster of lightweight plastic particles, in which a solid lubricating agent, which has infiltrated into the bearing, exudes to a gap between a shaft and the bearing. Therefore, the bearing of this embodiment is lightweight. Furthermore, the frictional resistance of the bearing can be reduced and hence wear and seizure rarely occur in the bearing.

In accordance with another preferred embodiment of the present invention, there is provided a porous-plastic bearing constructed from a cluster of lightweight plastic particles, in which lubricating oil, which has infiltrated into the bearing, exudes to a gap between a shaft and the bearing and forms an oil film and the porosity of the loaded part in the inner peripheral portion of the bearing is small. Therefore, the bearing of this embodiment is lightweight. Furthermore, the frictional resistance of the bearing can be reduced and hence wear and seizure rarely occur in the bearing.

In accordance with another preferred embodiment of the present invention, there is provided a porous-plastic bearing constructed from a cluster of lightweight plastic particles, in which lubricating oil, which has infiltrated into the bearing, exudes to a gap between a shaft and the bearing and forms an oil film and the porosity of the outer peripheral portion of the bearing is small. Therefore, the bearing of this embodiment is lightweight. Furthermore, the frictional resistance of the bearing can be reduced and hence wear and seizure rarely occur in the bearing.

In accordance with another preferred embodiment of the present invention, there is provided a porous-plastic bearing constructed from a cluster of lightweight plastic particles, in which lubricating oil, which has infiltrated into the bearing, exudes to a gap between a shaft and the bearing and forms an oil film and the porosities of the loaded part in the inner peripheral portion and outer peripheral portion of the bearing are small. Therefore, the bearing of this embodiment is lightweight. Furthermore, the frictional resistance of the bearing can be reduced and hence wear and seizure rarely occur in the bearing.

In accordance with another preferred embodiment of the present invention, there is provided a porous-plastic bearing constructed from a cluster of lightweight plastic particles, in which a marker such as a flange, a recess, or a projection is disposed on either one of lines obtained by projection of a perpendicular line, which is running from the approximate center of the low-porosity plastic particle layer within the bearing to the point of intersection of the perpendicular from the central point to the bearing axis, on both end surfaces of the sliding bearing, or a line on the lateral outer surface of the bearing member, which lies between the intersections of the above-mentioned lines obtained by projection of a perpendicular line, which is running from the approximate center of the low-porosity plastic particle layer within the bearing to the point of intersection of the perpendicular from the central point to the bearing axis, on both end surfaces of the sliding bearing, and the edges of the end surfaces of the bearing. Thus, the loaded portion of the bearing can be identified from the exterior of the bearing, and therefore the installation of the bearing can be conducted easily.

In accordance with another preferred embodiment of the present invention, there is provided a porous-plastic bearing constructed from a cluster of lightweight plastic particles, in which cavities are located within the bearing for holding oil, thereby improving the oil content of the bearing, and in which lubricating oil, which has infiltrated into the bearing, exudes to a gap between a shaft and the bearing and forms an oil film. Therefore, the bearing of this embodiment is lightweight. Furthermore, the frictional resistance of the bearing can be reduced and hence wearing and seizure of the bearing rarely occur.

In accordance with another preferred embodiment of the present invention, there is provided a porous-plastic bearing constructed from a cluster of lightweight plastic particles, in which cavities each having a member capable of holding oil are located within the bearing, and in which lubricating oil, which has infiltrated into the bearing, exudes to a gap between a shaft and the bearing and forms an oil film. Therefore, the bearing of this embodiment is lightweight. Furthermore, the frictional resistance of the bearing can be reduced and hence wear and seizure rarely occur in the bearing.

In accordance with another preferred embodiment of the present invention, there is provided a porous-plastic bearing constructed from a cluster of lightweight plastic particles, in which a pressure groove bearing member is disposed on one end surface of the bearing for supporting a thrust load, and in which lubricating oil, which has infiltrated into the bearing, exudes to a gap between a shaft and the bearing and forms an oil film. Furthermore, the shaft is provided with a plane portion which faces the groove bearing member. Therefore, the bearing of this embodiment is lightweight, and the bearing can carry both of radial and thrust loads. Furthermore, the frictional resistance of the bearing can be reduced and hence wear and seizure rarely occur in the bearing.

In accordance with another preferred embodiment of the present invention, there is provided a porous-plastic bearing constructed from a cluster of lightweight plastic particles, in which grooves are formed on the outer surface of the bearing for holding a liquid lubricating oil, and in which the lubricating oil, which has infiltrated into the bearing, exudes to a gap between a shaft and the bearing and forms an oil film. Therefore, the bearing of this embodiment is lightweight. Furthermore, the frictional resistance of the bearing can be reduced and hence wear and seizure rarely occur in the bearing.

In accordance with another preferred embodiment of the present invention, there is provided a porous-plastic bearing constructed from a cluster of lightweight plastic particles, in which radiating fins are disposed on the outer surface of the bearing for preventing a reduction in the viscosity of a liquid lubricating oil which has infiltrated into the bearing, and in which the lubricating oil exudes to a gap between a shaft and the bearing and forms an oil film. Therefore, the bearing of this embodiment is lightweight. Furthermore, the frictional resistance of the bearing can be reduced and hence wear and seizure rarely occur in the bearing.

In accordance with another preferred embodiment of the present invention, there is provided a porous-plastic bearing apparatus having a integrally molded supporting member for supporting bearing members, such as a bearing housing, casing, or a box. Therefore, the frictional resistance of the bearing can be reduced. Furthermore, since bearing members wherein wear and seizure rarely occur are integrally molded together with the supporting member such as a box or the like, the assembling cost of the bearing apparatus and cost of parts such as bearings can be reduced.

In accordance with another preferred embodiment of the present invention, there is provided a porous-plastic bearing in the form of a rolling bearing including a ball holder constructed from a cluster of lightweight plastic particles, in which a lubricating agent exudes to a gap between a shaft and the bearing. Therefore, the bearing of this embodiment is lightweight. Furthermore, the frictional resistance of the bearing can be reduced and hence wear and seizure rarely occur in the bearing.

In accordance with another preferred embodiment of the present invention, there is provided a porous-plastic bearing in the form of a rolling bearing including a ball holder constructed from a cluster of lightweight plastic particles, and in which lubricating oil, which has infiltrated into the bearing, exudes to a gap between a shaft and the bearing and forms an oil film. Therefore, the bearing of this embodiment is lightweight. Furthermore, the frictional resistance of the bearing can be reduced and hence wear and seizure rarely occur in the bearing.

In accordance with another preferred embodiment of the present invention, there is provided a porous-plastic bearing in the form of a rolling bearing including a ball holder constructed from a cluster of lightweight plastic particles, and in which there are provided cavities impregnated with a solid lubricating agent. Therefore, the bearing of this embodiment is lightweight. Furthermore, the frictional resistance of the bearing can be reduced and hence wear and seizure rarely occur in the bearing.

In accordance with another preferred embodiment of the present invention, a porous-plastic bearing constructed from a cluster of lightweight plastic particles is manufactured by placing a cluster of plastic particles each having a volume or a softening temperature which is less than that of the other portion of the bearing in the vicinity of the portion to be loaded of the bearing, and sintering a number of plastic particles including the low-volume or low-softening-temperature plastic particles. Therefore, a bearing in which the porosity of the loaded part in the inner peripheral portion of the bearing is lower compared with that of the other portion of the bearing can be easily manufactured. Furthermore, the bearing of this embodiment is lightweight. In addition, the frictional resistance of the bearing can be reduced and hence wear and seizure rarely occur in the bearing.

In accordance with another preferred embodiment of the present invention, a porous-plastic bearing constructed from a cluster of lightweight plastic particles is manufactured by placing a cluster of plastic particles each having a volume or a softening temperature which is less than that of the other portion of the bearing within a mold so that the cluster is located in the outer peripheral portion of the molded bearing, and sintering a number of plastic particles including the low-volume or low-softening-temperature plastic particles. Therefore, a bearing in which the porosity of the loaded part in the outer peripheral portion of the bearing is lower compared with that of the other portion of the bearing can be easily manufactured. Furthermore, the bearing of this embodiment is lightweight. In addition, the frictional resistance of the bearing can be reduced and hence wear and seizure rarely occur in the bearing.

In accordance with another preferred embodiment of the present invention, a porous-plastic bearing constructed from a cluster of lightweight plastic particles is manufactured by placing at least two clusters of plastic particles each having a volume which is less than that of the other portion of the bearing within a mold so that the clusters are respectively located in the loaded part of the inner peripheral portion of the molded bearing and outer peripheral portion of the molded bearing, and sintering a number of plastic particles including the low-volume plastic particles. Therefore, a bearing in which the porosities of the loaded part in the inner peripheral portion of the bearing and outer peripheral portion of the bearing are lower compared with that of the other portion of the bearing can be easily manufactured. Furthermore, the bearing of this embodiment is lightweight. In addition, the frictional resistance of the bearing can be reduced and hence wear and seizure rarely occur in the bearing.

In accordance with another preferred embodiment of the present invention, a porous-plastic bearing constructed from a cluster of lightweight plastic particles is manufactured by placing at least two clusters of plastic particles each having a softening temperature which is less than that of the other portion of the bearing within a mold so that the clusters are respectively located in the loaded part of the inner peripheral portion of the molded bearing and outer peripheral portion of the molded bearing, and sintering a number of plastic particles including the low-softening-temperature plastic particles. Therefore, a bearing in which the porosities of the loaded part in the inner peripheral portion of the bearing and outer peripheral portion of the bearing are lower compared with that of the other portion of the bearing can be easily manufactured. Furthermore, the bearing of this embodiment is lightweight. In addition, the frictional resistance of the bearing can be reduced and hence wearing and seizure of the bearing rarely occur.

What is claimed is:

1. A porous-plastic bearing comprising a sliding bearing member which is constructed of porous plastic and which is formed by gathering a cluster of plastic particles each having a volume in the range of from about 0.004 $mm^3$ to about 4 $mm^3$ and sintering the cluster of plastic particles while setting its porosity at a selected value in the range of from about 10% to about 30%, wherein said sliding bearing member comprises a plurality of plastic particles in any longitudinal or cross section, and wherein pores formed within said sliding bearing member contain a lubricating agent, wherein said sliding bearing member comprises a first plastic particle layer with a low porosity formed in at least one region within an inner peripheral portion of said bearing member and a second plastic particle layer with a high porosity, and wherein an area of said first plastic particle layer as projected on an inner surface of said sliding bearing member is less than a total area of said inner surface of said sliding bearing member.

2. The porous-plastic bearing according to claim 1, wherein said lubricating agent is a liquid lubricating oil.

3. The porous-plastic bearing according to claim 2, wherein the porosity of an outer peripheral portion of said sliding bearing member is lower than the porosity of other portions of the sliding bearing member.

4. The porous-plastic bearing according to claim 2, wherein said sliding bearing member includes at least one cavity for circulating said lubricating oil.

5. The porous-plastic bearing according to claim 4, further comprising an oil holding member disposed in the cavity.

6. The porous-plastic bearing according to claim 2, wherein said bearing further comprises a dynamic pressure groove bearing member disposed on an end surface of said sliding bearing member.

7. The porous-plastic bearing according to claim 2, wherein said bearing further comprises at least one groove in an outer surface of said sliding bearing member for holding liquid lubricating oil.

8. The porous-plastic bearing according to claim 2, wherein said bearing further comprises at least one radiating fin formed on an outer surface of said sliding bearing member.

9. The porous-plastic bearing according to claim 2, wherein said bearing includes a bearing housing, a casing and a cabinet which are integrally molded and made of porous plastic.

10. The porous-plastic bearing according to claim 1, wherein said lubricating agent is a solid lubricating agent.

11. The porous-plastic bearing according to claim 1, wherein a mark is disposed on an outer surface of the bearing member for marking the position of said first plastic particle layer.

12. A porous-plastic bearing comprising a sliding bearing member which is constructed of porous plastic and which is formed by gathering a cluster of plastic particles each having a volume in the range of from about 0.004 mm$^3$ to about 4 mm$^3$ and sintering the cluster of plastic particles while setting its porosity at a selected value in the range of from about 10% to about 30%, wherein said sliding bearing member comprises a plurality of plastic particles in any longitudinal or cross section, and wherein pores formed within said sliding bearing member contain a lubricating agent, wherein said sliding bearing member comprises a first plastic particle layer formed in at least one region within an inner peripheral portion of said bearing member and a second plastic particle layer formed in an outer peripheral portion of said bearing member, the porosities of said first and second plastic particle layers being lower than the porosities of other portions of said sliding bearing member, and wherein an area of said first plastic particle layer as projected on an inner surface of said sliding bearing member is less than a total area of said inner surface of said sliding bearing member.

13. A porous-plastic bearing including a bearing ring, and a rolling element, said bearing comprising a ball holder which is constructed of porous plastic and which is formed by gathering a cluster of plastic particles each having a volume in the range of from about 0.004 mm$^3$ to about 4 mm$^3$, the total volume of the cluster being in the range of from about 70% to about 90% of the total volume of said ball holder, and then sintering the cluster of plastic particles, wherein pores formed within said ball holder contain a lubricating agent.

14. The porous-plastic bearing according to claim 13, wherein said lubricating agent is a liquid lubricating oil.

15. The porous-plastic bearing according to claim 13, wherein said lubricating agent is a solid lubricating agent.

16. A bearing member comprising a cluster of sintered plastic particles, each one of the particles having a volume in the range of from about 0.004 mm$^3$ to about 4 mm$^3$, the bearing member having a porosity of from about 10% to about 30%, wherein pores formed within said bearing member contain a lubricating agent, and wherein said bearing member has a low porosity area at one portion of a load bearing surface of said bearing member, and a higher porosity area at another portion of said load bearing surface.

* * * * *